(12) United States Patent
Bram et al.

(10) Patent No.: US 7,343,364 B2
(45) Date of Patent: Mar. 11, 2008

(54) RULES-BASED SYSTEM ARCHITECTURE AND SYSTEMS USING THE SAME

(75) Inventors: Charles Bram, Fox Point, WI (US); John Emmerichs, Brown Deer, WI (US); Richard Wood, Bayside, WI (US); Christopher Parrott, Tattenhall (GB); James Kohn, Shorewood, WI (US)

(73) Assignee: eFunds Corporation, Scottsdale, AZ (US)

( * ) Notice: Subject to any disclaimer, the term of this patent is extended or adjusted under 35 U.S.C. 154(b) by 120 days.

(21) Appl. No.: 11/159,847

(22) Filed: Jun. 22, 2005

(65) Prior Publication Data

US 2006/0179028 A1 Aug. 10, 2006

Related U.S. Application Data

(60) Provisional application No. 60/649,905, filed on Feb. 4, 2005.

(51) Int. Cl.
*G06F 17/00* (2006.01)
*G06N 5/02* (2006.01)

(52) U.S. Cl. .......................................... 706/47; 706/46
(58) Field of Classification Search ............. 706/45–47
See application file for complete search history.

(56) References Cited

U.S. PATENT DOCUMENTS

| | | | |
|---|---|---|---|
| 4,025,905 A | 5/1977 | Gorgens | |
| 4,460,960 A | 7/1984 | Anderson et al. | |
| 4,630,196 A | 12/1986 | Bednar, Jr. et al. | |
| 4,724,521 A | 2/1988 | Carron et al. | |
| 5,204,939 A | 4/1993 | Yamazaki et al. | |
| 5,225,978 A | 7/1993 | Petersen et al. | |
| 5,487,134 A | 1/1996 | Ballard | |
| 5,644,770 A | 7/1997 | Burke et al. | |
| 5,720,033 A * | 2/1998 | Deo | 726/2 |
| 5,761,649 A | 6/1998 | Hill | |
| 5,768,480 A | 6/1998 | Crawford, Jr. et al. | |
| 5,862,325 A * | 1/1999 | Reed et al. | 709/201 |
| 5,870,719 A | 2/1999 | Maritzen et al. | |
| 6,088,717 A * | 7/2000 | Reed et al. | 709/201 |
| 6,345,288 B1 * | 2/2002 | Reed et al. | 709/201 |
| 6,415,275 B1 | 7/2002 | Zahn | |
| 6,473,748 B1 | 10/2002 | Archer | |
| 6,529,954 B1 * | 3/2003 | Cookmeyer et al. | 709/224 |
| 6,615,198 B1 * | 9/2003 | Aldrich | 706/47 |
| 6,757,710 B2 * | 6/2004 | Reed | 709/203 |
| 6,766,366 B1 | 7/2004 | Schafer et al. | |
| 6,865,566 B2 | 3/2005 | Serrano-Morales et al. | |

(Continued)

OTHER PUBLICATIONS

VIDRE—A Distributed Service-Oriented Business Rule Engine based on RuleML Nagl, C.; Rosenberg, F.; Dustdar, S.; Enterprise Distributed Object Computing Conference, 2006. EDOC '06. 10th IEEE International Oct. 2006 pp. 35-44.*

(Continued)

*Primary Examiner*—Michael B. Holmes
(74) *Attorney, Agent, or Firm*—Michael Best & Friedrich LLP

(57) ABSTRACT

Systems and methods for processing data. In one embodiments, a system for processing data can include a first rules engine configured to obtain the data, to obtain a first object including a rule identifier to contain the data, to generate an instance of a first rule based on the first object, and to execute the instance of the first rule passing the first object as input to the instance of the first rule, wherein the instance of the first rule configured to perform an action in order to process the data contained in the first object, and to modify the rule identifier included in the first object.

22 Claims, 43 Drawing Sheets

U.S. PATENT DOCUMENTS

| | | | |
|---|---|---|---|
| 6,868,441 B2* | 3/2005 | Greene et al. | 709/220 |
| 6,922,685 B2* | 7/2005 | Greene et al. | 707/1 |
| 6,996,570 B2* | 2/2006 | Noble et al. | 707/100 |
| 7,003,578 B2* | 2/2006 | Kanada et al. | 709/230 |
| 7,124,145 B2* | 10/2006 | Surasinghe | 707/102 |
| 2001/0029499 A1* | 10/2001 | Tuatini et al. | 706/47 |
| 2003/0065527 A1 | 4/2003 | Yeh et al. | |
| 2003/0130921 A1 | 7/2003 | Force et al. | |
| 2003/0222135 A1 | 12/2003 | Stoutenburg et al. | |
| 2003/0229605 A1 | 12/2003 | Herrera et al. | |
| 2004/0010463 A1 | 1/2004 | Hahn-Carlson et al. | |

OTHER PUBLICATIONS

A rule engine for query transformation in Starburst and IBM DB2 C/S DBMS Priahesh, H.; Leung, T.Y.C.; Hasan, W.; Data Engineering, 1997. Proceedings. 13th International Conference on Apr. 7-11, 1997 pp. 391-400.*
Reasoning over ontologies of on demand service Zhou, Y.; Zhao, Q.; Perry, M.; e-Technology, e-Commerce and e-Service, 2005. EEE '05. Proceedings. The 2005 IEEE International Conference on Mar. 29-Apr. 1, 2005 pp. 381-384.*
Design and implementation of a service-oriented business rules broker Rosenberg, F.; Dustdar, S.; E-Commerce Technology Workshops, 2005. Seventh IEEE International Conference on Jul. 19, 2005 pp. 55-63.*
The power of ruling the future home network Scheller, A.; Stolp, R.; Baier, R.; Consumer Communications and Networking Conference, 2004. CCNC 2004. First IEEE Jan. 5-8, 2004 pp. 668-670.*
Industry track: a rule engine for location based content syndication Horhammer, M.; Biswas, P.; Mobile Data Management, 2004. Proceedings. 2004 IEEE International Conference on 2004 pp. 88-93.*
Towards a distributed service-oriented business rules system Rosenberg, F.; Dustdar, S.; Web Services, 2005. ECOWS 2005. Third IEEE European Conference on Nov. 14-16, 2005 Page(s):11 pp.*
Business rules integration in BPEL—a service-oriented approach Rosenberg, F.; Dustdar, S.; E-Commerce Technology, 2005. CEC 2005. Seventh IEEE International Conference on Jul. 19-22, 2005 pp. 476-479.*
Exploiting Information Relationships for Access Control Hengartner, U.; Steenkiste, P.; Pervasive Computing and Communications, 2005. PerCom 2005. Third IEEE International Conference on Mar. 8-12, 2005 pp. 269-278.*
Automated Reasoning on Aspects Interactions Falcarin, P.; Torchiano, M.; Automated Software Engineering, 2006. ASE '06. 21st IEEE/ACM International Conference on Sep. 2006 pp. 313-316.*
Automatic generation of rule-based software configuration management systems Guozheng Ge; Whitehead, E.J., Jr.; Software Engineering, 2005. ICSE 2005. Proceedings. 27th International Conference on May 15-21, 2005 p. 659.*
Jess goes graphical [JessGUI] Jovanovic, J.; Gasevic, D.; Devedzic, V.; Intelligent Systems, 2004. Proceedings. 2004 2nd International IEEE Conference vol. 2, Jun. 22-24, 2004 pp. 462-467 vol. 2.*
A Web-based expert system for vehicle registration Demmin, A.T.; Du Zhang; Information Reuse and Integration, 2003. IRI 2003. IEEE International Conference on 2003 pp. 420-427.*
Can safety-critical software be flexible? Fraser, S.W.; Information Reuse and Integration, 2003. IRI 2003. IEEE International Conference on 2003 pp. 588-593.*
Increasing believability: agents that justify their actions Pisan, Y.; Nayak, A.; Fuzzy Systems, 2001. The 10th IEEE International Conference on vol. 3, Dec. 2-5, 2001 pp. 1347-1350.*
Time is the shadow of reactive behaviour Berndtsson, M.; Hansson, J.; Database Engineering and Applications Symposium, 2000 International Sep. 18-20, 2000 pp. 417-423.*
Distributing Internet services to the network's edge Weaver, A.C.; Condry, M.W.; Industrial Electronics, IEEE Transactions on vol. 50, Issue 3, Jun. 2003 pp. 404-411.*
Effective scheduling of detached rules in active databases Ceri, S.; Gennaro, C.; Paraboschi, S.; Serazzi, G.; Knowledge and Data Engineering, IEEE Transactions on vol. 15, Issue 1, Jan.-Feb. 2003 pp. 2-13.*
A Multi-level Policy Representation for Management Services in Maritime Networks St-Onge, Francis; Kidston, David; Labbe, Isabelle; Policies for Distributed Systems and Networks, 2007. POLICY '07. Eighth IEEE International Workshop on Jun. 13-15, 2007 pp. 96-108.*
Towards the Practical Use of Qualitative Spatial Reasoning in Geographic Information Retrieval Abdelmoty, A.I.; Smart, P.; Elgeresy, B.A.; Intelligent Systems, 2006 3rd International IEEE Conference on Sep. 2006 pp. 71-76.*
Solution Architecture for N-Tier Applications Shan, T.C.; Hua, W.W.; Services Computing, 2006. SCC '06. IEEE International Conference on Sep. 2006 pp. 349-356.*
Applying Distributed Business Rules—The VIDRE Approach Rosenberg, F.; Nagl, C.; Dustdar, S.; Services Computing, 2006. SCC '06. IEEE International Conference on Sep. 2006 pp. 471-478.*
Dynamo and Self-Healing BPEL Compositions Baresi, Luciano; Guinea, Sam; Software Engineering—Companion, 2007. ICSE 2007 Companion. 29th International Conference on May 20-26, 2007 pp. 69-70.*
A Framework for Learning to Personalize Converged Services Involving Social Networks Dinoff, R.; Tin Kam Ho; Hull, R.; Kumar, B.; Lieuwen, D.; Haobo Ren; Santos, P.; Adaptive and Learning Systems, 2006 IEEE Mountain Workshop on Jul. 2006 pp. 91-97.*
Automatic generation of rule-based software configuration management systems Whitehead, E.J.; Guozheng Ge; Software Engineering, 2005. ICSE '05. Proceedings of the 27th International Conference on May 15-21, 2005 Page(s):659-659.*
Finding Optimal Join Tree forMulti-Join Stream Queries in a Production System Gomes, J.S.; Heyong-Ah Choi; Distributed Computing Systems Workshops, 2006. ICDCS Workshops 2006. 26th IEEE International Conference on Jul. 4-7, 2006 Page(s):27-27.*
RBSLA A declarative Rule-based Service Level Agreement Language based on RuleML Paschke, A.; Computational Intelligence for Modelling, Control and Automation, 2005 and International Conference on Intelligent Agents, Web Technologies and Internet Commerce, International Conference on vol. 2, Nov. 28-30, 2005 pp. 308-314.*
Using Computerized Clinical Practice Guidelines to Generate Tailored Patient Education Materials Jones, B.; Abidi, S.S.R.; Ying, W.; System Sciences, 2005. HICSS '05. Proceedings of the 38th Annual Hawaii International Conference on Jan. 3-6, 2005 Page(s):139b-139b.*
A Web-based and integrated hospital information system Hongyan Li; Ming Xue; Ying Ying; Medical Information Systems: The Digital Hospital, 2004. IDEAS '04-DH. Proceedings. IDEAS Workshop on Sep. 1-3, 2004 pp. 157-162.*
RuleBAM: a rule-based framework for business activity management Jeng, J.J.; Flaxer, D.; Shubir Kapoor; Services Computing, 2004. (SCC 2004). Proceedings. 2004 IEEE International Conference on Sep. 15-18, 2004 pp. 262-270.*
Plenary session: driving forces in database technology Hagan, S.; Data Engineering, 2004. Proceedings. 20th International Conference on Mar. 30-Apr. 2, 2004 p. 3.*
Enabling context-aware and privacy-conscious user data sharing Hull, R.; Kumar, B.; Lieuwen, D.; Patel-Schneider, P.F.; Sahuguet, A.; Varadarajan, S.; Vyas, A.; Mobile Data Management, 2004. Proceedings. 2004 IEEE International Conference on 2004 pp. 187-198.*
Object lessons learned from an intelligent agents framework for telephony-based applications Yannakopoulos, D.; Ferretti, M.; Schultz, M.; Technology of Object-Oriented Languages and Systems, 1999. TOOLS 30. Proceedings Aug. 1-5, 1999 pp. 222-236.*

* cited by examiner

675

| MERCHANT BASED RULES | | ACTION | |
|---|---|---|---|
| CONDITION | LIMIT | INLINE | POST-AUTH |
| NUMBER OF TRANSACTION REVERSALS WITHIN [60 MINUTES] FROM SAME DEVICE | [3] | DENY TRANSACTION | DISABLE DEVICE |
| NUMBER OF DENIED TRANSACTIONS WITHIN [1 DAY] FROM THE SAME DEVICE | [3] | CREATE PROBLEM CASE AND NOTIFY | SUSPEND DEVICE |
| NUMBER OF CAPTURED CARDS WITHIN [60] MINUTES FROM THE SAME DEVICE | [3] | CREATE PROBLEM CASE AND NOTIFY | SUSPEND DEVICE |
| NUMBER OF FOREIGN CARDHOLDERS AT A DEVICE WITHIN [60 MINUTES] | [15] | DENY TRANSACTION | SUSPEND DEVICE |
| NUMBER OF TRANSACTIONS MANUALLY ENTERED WITHIN [60 MINUTES] FROM THE SAME | [5] | DENY TRANSACTION | DISABLE MERCHANT |
| TRANSACTION AMOUNT FOR 'CARD NOT PRESENT' TRANSACTION | [250.00] | DENY TRANSACTION | CREATE PROBLEM CASE AND NOTIFY |
| MCC CODE IN LIST | [LIST OF MCC CODES] | DENY TRANSACTION | CREATE PROBLEM CASE AND NOTIFY |
| NUMBER OF FAILING ON CC/CVC OR CVVS/CVC2 | [10] | DENY TRANSACTION | DISABLE DEVICE |

FIG. 18A

| CARD BASED RULES | | ACTION | |
|---|---|---|---|
| CONDITION | LIMIT | INLINE | POST-AUTH |
| NUMBER OF WITHDRAWALS WITHIN [7 DAYS] | [5] | CREATE PROBLEM CASE AND NOTIFY | CREATE PROBLEM CASE AND NOTIFY |
| CONSECUTIVE TRANSACTIONS DENIED DUE TO INSUFFICIENT FUNDS | [2] | CREATE PROBLEM CASE AND NOTIFY | DISABLE CARDHOLDER |
| CONSECUTIVE TRANSACTIONS MADE BETWEEN [22:00] AND [03:00' ON [WEEKDAYS] | [2] | DENY TRANSACTION | DISABLE CARDHOLDER |
| NUMBER WITHDRAWALS WITHIN [5 MINUTES] | [3] | DENY TRANSACTION | BLOCK CARD |
| AMOUNT WITHDRAWN IN LAST [2 DAYS] | [900.00] | DENY TRANSACTION | DISABLE CARDHOLDER |
| TRANSACTION AMOUNT FOR POS TRANSACTION | [750.00] | DENY TRANSACTION | DISABLE CARDHOLDER |
| NUMBER OF DIFFERENT MCC CODES FOR SAME CARDHOLDER WITHIN [4 HOURS] | [3] | DENY TRANSACTION | DISABLE CARDHOLDER |
| TOTAL WITHDRAWAL AMOUNT FOLLOWING A [10.00] AUTHORIZATION WITHIN [1 DAY] | [200.00] | DENY TRANSACTION | CREATE PROBLEM CASE AND NOTIFY |

| LICENSE KEY FILE |
|---|
| |
| LICENSE NAME: CORE |
| LICENSE MODE: EVALUATION (RESTRICTED) |
| LICENSE AUTHORIZED HOST(S): LOCALHOST |
| LICENSE EFFECTIVE DATE: FIRST USE |
| LICENSE EXPIRATION DATE: 30 DAYS FROM FIRST USE |
| EFFECTS: |
| -CORE COMPONENTS ACTIVATED IN RESTRICTED MODE |
| -ON FIRST ACTIVATION OF CORE COMPONENTS EXPIRATION DATE SET IN TOKEN |
| -ON FIRST ACTIVATION OF CORE COMPONENTS SET LOCALHOST NAME IN TOKEN |
| -CORE COMPONENTS VALID FOR 30 FROM FIRST ACTIVATION |
| -CONFIGURED NON-CORE COMPONENTS ACTIVATED IN UNRESTRICTED MODE |
| -ATM HANDLING COMPONENTS, FRAUD MANAGEMENT COMPONENTS, AND AUTHORIZATION COMPONENTS NOT ALLOWED TO ACTIVATE |
| -ATTEMPTS TO ACTIVATE CORE COMPONENTS AFTER EXPIRATION DATE REJECTED |
| -ATTEMPTS TO ACTIVATE CORE COMPONENTS ON NODES OTHER THAN LOCALHOST REJECTED |

FIG. 28A

| LICENSE KEY FILE |
|---|
| LICENSE NAME: CORE |
| LICENSE MODE: FULL (UNRESTRICTED) |
| LICENSE AUTHORIZED HOST(S): NODE1, NODE2 |
| LICENSE EFFECTIVE DATE: N/A |
| LICENSE EXPIRATION DATE: N/A |
| EFFECTS: |
|   -CORE COMPONENTS ACTIVATED IN UNRESTRICTED MODE |
|   -CORE COMPONENTS ONLY ALLOWED TO ACTIVATE ON ON NODE1 AND NODE2 |
|   -ATTEMPTS TO ACTIVATE CORE COMPONENTS ON NODES OTHER THAN NODE1 AND NODE2 REJECTED |
|   -CONFIGURED NON-CORE COMPONENTS ACTIVATED IN UNRESTRICTED MODE |
|   -ATM HANDLING COMPONENTS AND AUTHORIZATION COMPONENTS NOT ALLOWED TO ACTIVATE |
| LICENSE NAME: FRAUD MANAGER |
| LICENSE MODE: EVALUATION (RESTRICTED) |
| LICENSE AUTHORIZED HOST(S): NODE1, NODE2 |
| LICENSE EFFECTIVE DATE: FIRST ACTIVATION |
| LICENSE EXPIRATION DATE: 60 DAYS FROM FIRST ACTIVATION |
| LICENSED COPIES: 1 |
| EFFECTS: |
|   -FRAUD MANAGEMENT COMPONENTS ACTIVATED IN RESTRICTED MODE |
|   -ON FIRST ACTIVATION OF FRAUD MANAGEMENT COMPONENTS EXPIRATION DATE SET IN TOKEN |
|   -FRAUD MANAGEMENT COMPONENTS VALID FOR 60 DAYS FROM FIRST ACTIVATION |
|   -ATTEMPTS TO ACTIVATE FRAUD MANAGEMENT COMPONENTS AFTER EXPIRATION DATE REJECTED |
|   -ATTEMPTS TO ACTIVATE FRAUD MANAGEMENT COMPONENTS ON NODES OTHER THAN NODE1 AND NODE 2 REJECTED |
|   -ONE FRAUD MANAGEMENT COMPONENT (ONE COPY) ALLOWED TO BE ACTIVATE AT ONE TIME |

| LICENSE KEY FILE |
|---|
| LICENSE NAME: CORE |
| LICENSE MODE: FULL (UNRESTRICTED) |
| LICENSE AUTHORIZED HOST(S): NODE1, NODE2 |
| LICENSE EFFECTIVE DATE: N/A |
| LICENSE EXPIRATION DATE: N/A |
| EFFECTS: |
|   -CORE COMPONENTS ACTIVATED IN UNRESTRICTED MODE |
|   -CORE COMPONENTS ONLY ALLOWED TO ACTIVATE ON ON NODE1 AND NODE2 |
|   -ATTEMPTS TO ACTIVATE CORE COMPONENTS ON NODES OTHER THAN NODE1 AND NODE2 REJECTED |
|   -CONFIGURED NON-CORE COMPONENTS ACTIVATED IN UNRESTRICTED MODE |
|   -AUTHORIZATION COMPONENTS NOT ALLOWED TO ACTIVATE |
| |
| LICENSE NAME: FRAUD MANAGER |
| LICENSE MODE: EVALUATION (RESTRICTED) |
| LICENSE AUTHORIZED HOST(S): NODE1, NODE2 |
| LICENSE EFFECTIVE DATE: FIRST ACTIVATION |
| LICENSE EXPIRATION DATE: 60 DAYS FROM FIRST ACTIVATION |
| LICENSED COPIES: 1 |
| EFFECTS: |
|   -FRAUD MANAGEMENT COMPONENTS ACTIVATED IN RESTRICTED MODE |
|   -FRAUD MANAGEMENT COMPONENTS ONLY ALLOWED TO ACTIVATE ON NODE1 AND NODE2 |
|   -ON FIRST ACTIVATION OF FRAUD MANAGEMENT COMPONENTS EXPIRATION DATE SET IN TOKEN |
|   -FRAUD MANAGEMENT COMPONENTS VALID FOR 60 DAYS FROM FIRST ACTIVATION |
|   -ATTEMPTS TO ACTIVATE FRAUD MANAGEMENT COMPONENTS AFTER EXPIRATION DATE REJECTED |
|   -ATTEMPTS TO ACTIVATE FRAUD MANAGEMENT COMPONENTS ON NODES OTHER THAN NODE1 AND NODE 2 REJECTED |
|   -ONE FRAUD MANAGEMENT COMPONENT (ONE COPY) ALLOWED TO BE ACTIVATE AT ONE TIME |
| |
| LICENSE NAME: ATM HANDLING |
| LICENSE MODE: EVALUATION (RESTRICTED) |
| LICENSE AUTHORIZED HOST(S): NODE1 |
| LICENSE EFFECTIVE DATE: N/A |
| LICENSE EXPIRATION DATE: N/A |
| EFFECTS: |
|   -ATM HANDLING COMPONENTS ACTIVATED IN RESTRICTED MODE |
|   -ATM HANDLING COMPONENTS ONLY ALLOWED TO ACTIVATE ON NODE1 |
|   -ATTEMPTS TO ACTIVATE ATM HANDLING COMPONENTS ON NODES OTHER THAN NODE1 REJECTED |

| LICENSE KEY FILE |
|---|
| LICENSE NAME: CORE |
| LICENSE MODE: FULL (UNRESTRICTED) |
| LICENSE AUTHORIZED OS(S): SOLARIS |
| LICENSE EFFECTIVE DATE: N/A |
| LICENSE EXPIRATION DATE: N/A |
| EFFECTS: |
|   -CORE COMPONENTS ACTIVATED IN UNRESTRICTED MODE |
|   -CORE COMPONENTS ONLY ALLOWED TO ACTIVATE ON NODES SUPPORTED BY SOLARIS OPERATING SYSTEM |
| |
| LICENSE NAME: BASIC GATEWAY |
| LICENSE MODE: FULL (UNRESTRICTED) |
| LICENSE AUTHORIZED OS(S): SOLARIS |
| LICENSE EFFECTIVE DATE: N/A |
| LICENSE EXPIRATION DATE: N/A |
| LICENSED COPIES: 4 |
| EFFECTS: |
|   -BASIC GATEWAY COMPONENTS ACTIVATED IN UNRESTRICTED MODE |
|   -BASIC GATEWAY COMPONENTS ONLY ALLOWED TO ACTIVATE ON NODES SUPPORTED BY SOLARIS OPERATING SYSTEM |
|   -UP TO 4 BASIC GATEWAY COMPONENTS (4 COPIES) ALLOWED TO BE ACTIVATE AT ONE TIME |

FIG. 28D

RULES-BASED SYSTEM ARCHITECTURE AND SYSTEMS USING THE SAME

RELATED APPLICATIONS

The present application claims priority to U.S. Provisional Patent Application Ser. No. 60/649,905 titled "RULES-BASED SYSTEM ARCHITECTURE AND SYSTEMS USING THE SAME," filed on Feb. 4, 2005, the entire contents of with are herein incorporated by reference.

BACKGROUND OF THE INVENTION

System architecture can describe the organization and structure of a computer system. In complex computer systems, an architectural description can help identify and plan system components, sub-systems, and the corresponding communication and interaction of the components. The architecture of a computer system can influence and govern the design and functionality of the system.

Given the ever-changing dynamics of businesses, computer system architectures should be highly maintainable, evolvable, portable, and interoperable. In addition, system users often require computer systems that can be personalized, updated, and that can coexist and cooperate with other computer systems. These requirements often add to the complexity of a computer system.

In an effort to reduce system complexity, rules-based processing architectures were developed. Rules-based processing architectures attempt to separate business rules from business rule application. Traditional rules-based processing architectures include a computer application and a separate rules engine. The business rule application performs the actual processing work and uses the rules engine to control how the work should be processed. The rules engine provides facilities to determine when particular processing should occur, specific processing the application should perform, and which rule should be applied next, if any. The application then carries out the processing indicated by the rules engine.

SUMMARY OF THE INVENTION

Conventional rules-based processing architectures can simplify computer systems. However, conventional rules-based processing architectures separate the application (the actual processing code) from the rules. The rules engine uses the rules to instruct the application how or what to execute and process. In some situations, traditional rules-based systems require modifications to the rules, the rules engine, and/or the application in order to modify the computer system. Furthermore, since the rules are separate from the application (or processing code), it is often difficult to identify and trace relationships between rules and application in order to modify the functionality of the computer system. In addition, users of rules-based computer systems may not be allowed to modify the rules, the rules engine, and/or the application. Users may be required to request customized modifications from system developers, which is often costly and time-consuming.

Therefore, some embodiments of the invention provide rules-based system architecture. The system architecture can include a foundation system, a configuration subsystem, a monitoring subsystem, and applications. The foundation system provides system start up and shut down functionality and a platform-dependent interface. The configuration subsystem includes configuration data. The applications use rules engines to execute rule objects. The rule objects can use the configuration data to process data input to the system. The monitoring subsystem monitors the operation of the system.

Another embodiment provides a method of processing data including obtaining input data and creating an object of the input data. The object includes a rule identifier that specifies a first rule to apply to the object. The method also includes passing the object to a rules engine and generating an instance of the first rule. The rules engine executes the instance of the first rule and modifies the rule identifier included in the object to specify a second rule. The rules engine then generates an instance of the second rule and executes the instance of the second rule.

Additional embodiments provide a processing module. The processing module can include a container. The container can execute one or more rules engines. Each rules engine can execute a loop of rule objects.

Some embodiments of the invention can provide a system for processing data including a first rules engine configured to obtain the data, to obtain a first object to obtain the data, the first object including a rule identifier; to generate an instance of a first rule based on the first object; and to execute the instance of the first rule passing the first object as input to the instance of the first rule. The instance of the first rule is configured to perform at least one action in order to process the data contained in the first object, and to modify the rule identifier included in the first object.

Another embodiment of the invention can provide a method of processing data including obtaining the data with a first rules engine, obtaining a first object to contain the data, the first object including a rule identifier, generating an instance of a first rule based on the first object, executing the instance of the first rule passing the first object as input to the instance of the first rule, performing at least one action with the instance of the first rule based in order to process the data contained in the first object, and modifying the rule identifier of the first object.

Additional embodiments of the invention can provide a method of configuring a system that processes data including obtaining a base rule that, when executed and passed an object containing data to process, performs a first action in order to process the data, generating an override rule that, when executed and passed the object containing the data to process, performs a second action in order to process the data, and storing the override rule separate from the base rule.

BRIEF DESCRIPTION OF THE DRAWINGS

FIGS. 18A and 18B illustrate rules executed by the rules engine of FIG. 17 according to one embodiment of the invention.

DETAILED DESCRIPTION

Figure 1:
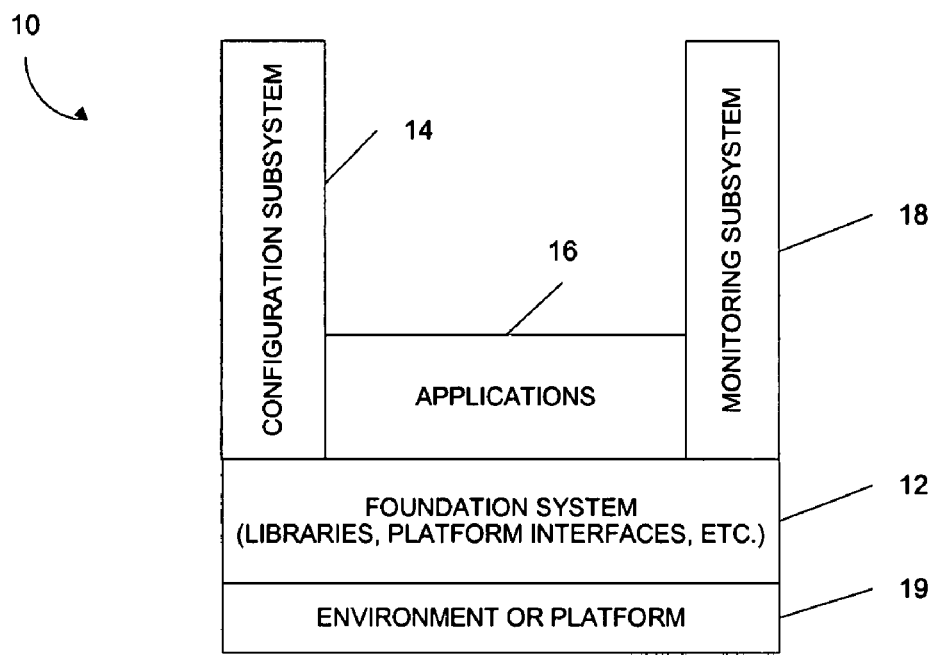
FIG. 1 schematically illustrates computer system architecture according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention include both hardware and software components or modules that, for purposes of discussion, can be illustrated and described as if the majority of the components were implemented solely in hardware. However, one of ordinary skill in the art, and based on a reading of this detailed description, would recognize that, in at least one embodiment, the electronic based aspects of the invention can be implemented in software. As such, it should be noted that a plurality of hardware and software based devices, as well as a plurality of different structural components can be utilized to implement the invention. Furthermore, and as described in subsequent paragraphs, the specific configurations illustrated in the drawings are intended to exemplify embodiments of the invention and that other alternative configurations are possible.

Embodiments of the invention provide a computer system having a novel architecture. In some embodiments, the computer system architecture defines a structure for financial transaction processing systems. It should be understood, however, that the structure illustrated and described below can be applied to various types of computer systems for use in various applications.

FIG. 1 schematically illustrates computer system architecture 10 according to one embodiment of the invention. In some embodiments, the computer system architecture 10 can be embodied as a financial transaction processing system (hereinafter "the system") 11. As shown in FIG. 1, the system 11 can include a foundation system 12, a configuration subsystem 14, one or more applications 16, and a monitoring subsystem 18. In some embodiments, the foundation system 12 includes libraries, hardware interface(s), and other platform-dependent system components. The foundation system 12 can execute and/or interface with an environment or platform 19. The environment 19 can include the hardware and/or software (e.g., an operating system) included in a processing device or component included in the system 11, such as a server. The foundation system 12 can include structures and standards for building the configuration subsystem 14, the applications 16, and/or the monitoring subsystem 18. In some embodiments, the configuration subsystem 14, the applications 16, the monitoring subsystem 18, and/or any additional applications and subsystems built on the foundation system 12 are platform-independent.

The applications 16 can include subsystems and applications included in the system 11 that perform functions of the system 11. For example, the applications 16 can include one or more components and applications that provide financial transaction processing. As previously stated, however, the applications 16 can include applications or components configured to provide various types of processing and functionality other than financial transaction processing.

Figure 2:
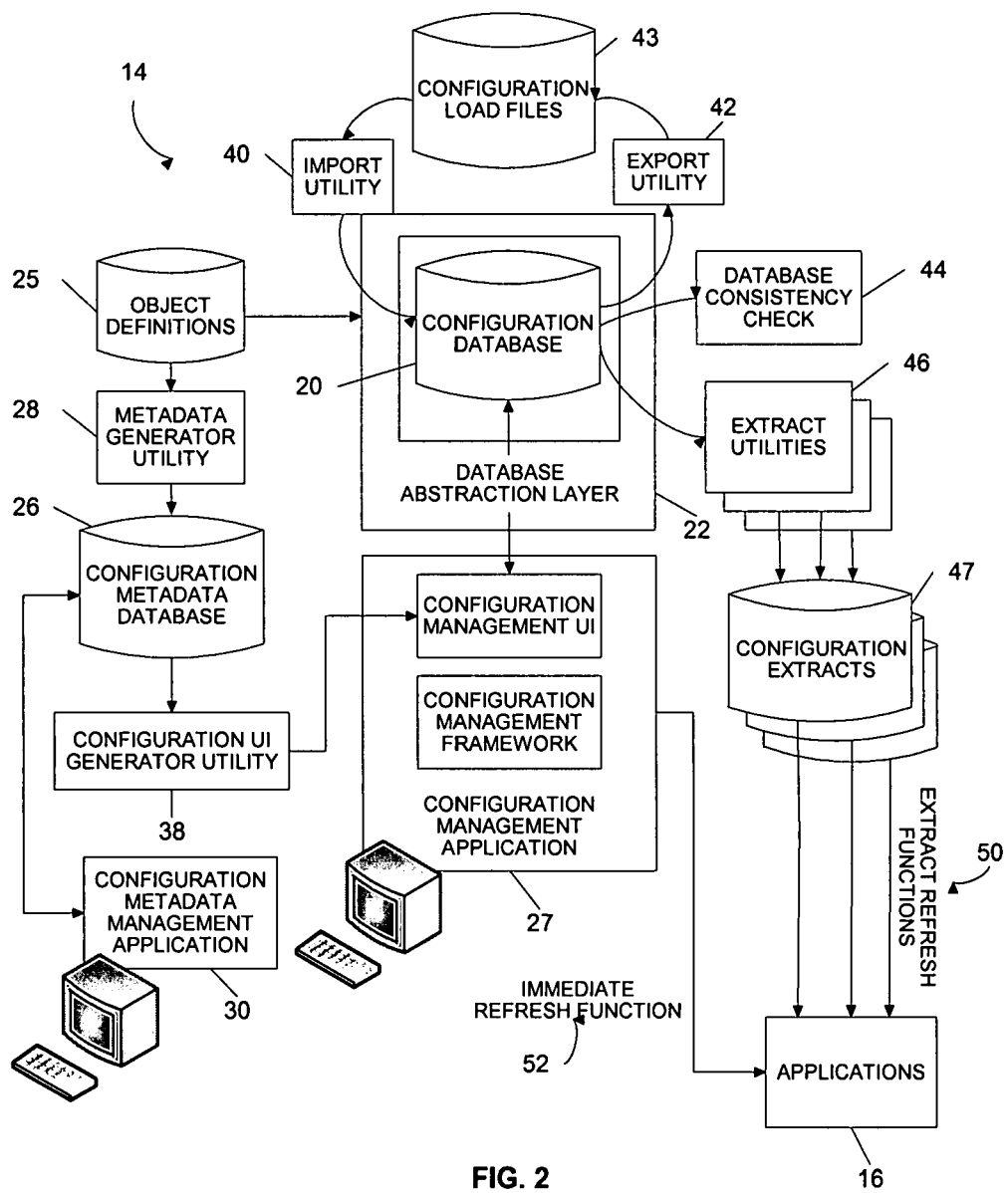
FIG. 2 illustrates a configuration subsystem defined in the computer system architecture of FIG. 1.

In some embodiments, the functionality of the system 11 (e.g., the functionality of the applications 16, the monitoring subsystem 18, and the configuration subsystem 14) can be configured and controlled by information stored in and managed by the configuration subsystem 14. As shown in FIG. 2, the configuration subsystem 14 can include a configuration database 20. The configuration database 20 can include a relational database that stores data used to configure and run the system 11. In some embodiments, the structure of the configuration database 20 can be designed to use relationships between different types of configuration data and to eliminate the storage of duplicate data. The configuration subsystem 14 can also include a database abstraction layer 22 that provides an interface between the configuration database 20 (where configuration data can be stored in rows and tables) and other components of the configuration subsystem 14 (where data can be managed as objects). The database abstraction layer 22 can convert data as needed from one format to another and can separate the logic of the configuration subsystem 14 from the details of the structure of the configuration database 20.

As shown in FIG. 2, the configuration subsystem 14 can include an object definitions database 25. The object definitions database 25 can define objects (or related data) that are stored in the configuration database 20. In some embodiments, the configuration subsystem 14 includes a configuration metadata database 26. The configuration metadata database 26 can include information (i.e., metadata) about the structure of the configuration data when viewed and manipulated as objects by a configuration management application 27 and/or other applications 16 of the system 11. A metadata generation utility 28 can create initial or default metadata based on the data stored in the configuration database 20 and/or information stored in the object definitions database 25. The default metadata can be stored to the configuration metadata database 26. The configuration subsystem 14 can also include a configuration metadata management application 30 that allows system users to modify the default configuration metadata. In some embodiments, changes to configuration metadata can be saved in a metadata database independent of the generated default metadata so that metadata changes are not lost if the metadata generation utility 28 updates the default metadata. Using the configuration metadata management application 30, system users can manipulate configuration metadata in order to change the way the configuration data management application 27 displays and obtains configuration data. For example, the configuration metadata can define what configuration data is to be displayed to a particular system user. In some embodiments, the configuration metadata management application 30 can include a web-based application.

The configuration data management application 27 allows system users to create, manage, and retire configuration data in order to build and maintain the system 11. In some embodiments, as described above, the configuration data management application 27 includes a web or browser-based application, and web pages or forms displayed with the configuration data management application 27 can be generated from the configuration metadata set by default with the metadata generator utility 28 and/or by a system user with the configuration metadata management application 30. In some embodiments, the configuration subsystem 14 can include a configuration user interface ("UI") generator utility 38 that uses the configuration metadata to generate a user interface, such as a web page or form to be displayed with the configuration management application 27. The configuration management application 27 can add configuration data from the configuration database 20 to the user interface and can display the user interface to a system user.

As shown in FIG. 2, the configuration subsystem 14 can include a data import utility 40 and a data export utility 42. The data import utility 40 can import configuration data from an external "load file" 43 into the configuration database 20, and the data export utility 42 can export data into an external "load file" 43 from the configuration database 20. In some embodiments, the data import utility 40 can check imported data for consistency and correctness before storing the configuration data in the configuration database 20. The configuration subsystem 14 can also include a consistency check utility 44 that verifies that data stored in the configuration database 20 is complete and consistent.

The configuration system 14 can include one or more extract utilities 46, which can include utilities to extract configuration data from the configuration database 20 in order to obtain configuration data needed by applications 16 of the system 11 ("configuration extracts 47"). The extract utilities 46 can convert configuration data from a format used in the configuration database 20 to a format used by individual components of the system 11.

The configuration subsystem 14 can also include an extract refresh or update function 50. In some embodiments, the extract refresh function 50 obtains and applies configuration extracts 47 for one or more applications during start-up of the system 11. The extract refresh function 50 can also refresh or update configuration extracts 47 for one or more applications 16 while the system 11 is running. Configuration extracts can be refreshed due to a manual console command, a timed event, etc. Similarly, the configuration subsystem 14 can include an immediate extract refresh or update function 52. In some embodiments, configuration data can require updating throughout the system 11 as soon as it is available. In these situations, the immediate extract refresh function 52 can provide updated configuration data to applications quickly without waiting for an updated configuration extract 47 to be created.

Figure 3:
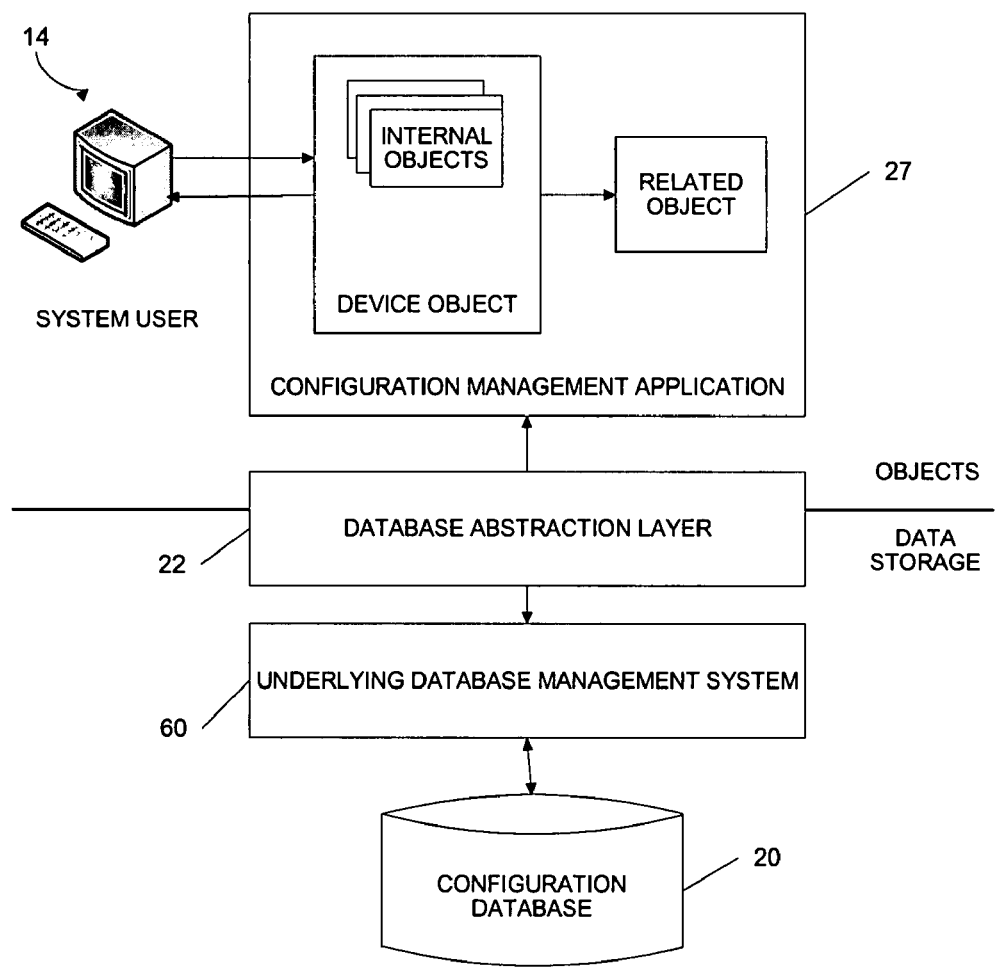
FIG. 3 illustrates object-orientated functionality of the configuration subsystem of FIG. 2 according to one embodiment of the invention.

FIG. 3 illustrates object-oriented functionality of the configuration subsystem 14 according to one embodiment of the invention. The configuration management application 27 includes an object-orientated configuration system that employs a rules-based workflow management feature or capability in order to attempt to control the actions of multiple system user roles with varying skill sets. System users can modify the functionality of the system 11 using customizable rules without changing the underlying or base programming code of the system 11.

The object-oriented nature of the configuration subsystem 14 and the corresponding configuration management application 27 allows system users to work with familiar business objects, such as financial institutions, devices (e.g. ATMs), and processing networks rather than working with the structure of an underlying database used to store the configuration data. In some embodiments, the configuration subsystem 14 is independent of and isolated from the details of how the data is stored on any database system.

Unlike most configuration systems that concentrate on data within a configuration repository, or an underlying data file, the configuration subsystem 14 concentrates on objects represented within the configuration system 14.

The system 11 may handle hundreds of different types of objects including objects representing financial institutions (e.g. banks), processing networks (e.g. Visa or MasterCard), devices (e.g. ATMs), transaction routing requirements, dispute cases, etc. Each type of object is defined by an object class that defines the data the object will use and the processing it can perform when generated or instantiated.

System users can be more familiar with objects processed within the system 11 than with the structure of underlying files used to store the information about objects. Therefore, an object-oriented configuration management system can be easier to understand than another configuration system that deals directly with the underlying data files.

Separating an object view of configuration data from the underlying data storage mechanism can be exemplified by the database abstraction layer 22, which separates the use of an underlying configuration management system 60 and the configuration database 20 from the configuration management application 27 that allows individual system users the ability to use different data storage facilities within a single standard configuration management application 27.

In addition to the physical objects described above (i.e., the objects defined in the object definitions database 25), the configuration subsystem 14 can store rules used in the system 11. By storing rules in the configuration subsystem 14, system users can modify processing logic of the system 11. In some embodiments, executable code for each rule resides outside the configuration subsystem 14, but the configuration data used by each rule, including the order in which rules are executed, can be controlled through the configuration subsystem 14. Thus, the objects described here can relate to the applications 16, transaction routing rules, workflow management, and other non-physical objects as well as physical objects as described above.

In some embodiments, the object definitions stored in the object definitions database 25 include programming code for validating and editing configuration data included in an object. Using the programming code for validating and editing configuration data, the configuration subsystem 14 can import and validate configuration data in batch operations, online operations, and in manual entry operations using substantially similar programming code (e.g., programming code based on the validation and editing programming code included in the object definitions) for data validation.

Many systems provide a manual process for system users to enter and edit configuration data. The configuration subsystem 14 also provides the ability to enter and edit configuration data for automated and online processes.

As described above with respect to FIG. 2, the configuration subsystem 14 may import configuration data through a batch-based process from external configuration load files 43, through real-time processing of online transactions, through manual operations by an external operator using a manual user interface (e.g., the configuration management application 27), and/or through other import means, which may become available in the future.

The configuration subsystem 14 verifies the consistency and accuracy of imported data regardless of how it is obtained. In some embodiments, the configuration subsystem 14 places data editing and validation rules within programming code of the objects that will ultimately contain and use the configuration data in the system 11. Each object can implement a validation process (a "validation method") that verifies that configuration data included in the object is consistent and accurate. If the validation method does not verify that configuration data included the object is consistent and accurate, the validation method can generate an error-reporting object that indicates incorrect data. The error-reporting object can also indicate how to fix incorrect data. In some embodiments, the configuration subsystem 14 does not store configuration data in the configuration database associated with an object, if the object does not validate the configuration data. Objects that include other objects (i.e., internal objects) can execute a validation method associated with each internal object and can combine any reported errors into a single error-reporting object. In some embodiments, objects can include internal objects to any level, and each object at each level can be responsible for validating its own data configuration with its own validation method.

To provide as much data validation as quickly as possible for system users entering and maintaining configuration data through a user interface (e.g., the configuration management application 27), the configuration system 14 can provide editing and validation information directly on the user interface so that the user interface can display error messages immediately. In some embodiments, each object can implement a validation requirements process (a "required validation method") that instructs a user interface, or another part of the configuration subsystem 14 requiring such validation information, how to perform required data validation operations and what errors to display when validation fails based on the validation method. The user interface builds data editing and validation as provided or instructed by an object into each page or form it displays so that errors can be identified directly on the user interface without waiting for the configuration subsystem 14 to send entered data back to an object within the configuration subsystem 14 for validation. Internal objects can also implement validation methods. In some embodiments, internal objects send their validation methods to a parent or broader object, and a highest parent object combines the validation methods into a single message that it can send to a user interface, or to another part of the system 11 that requires information on data validation.

In some embodiments, the user interface can provide multiple levels of data validation. A first level of data validation can check for error conditions directly on the user interface, and can allow system users to correct errors. A second level of data validation can execute one or more validation methods of one or more objects using the configuration subsystem 14. The validation methods recheck data initially checked on the user interface and performs additional checks. The second level of data validation can return errors back to the user interface for correction. Providing multiple levels of data validation can provide immediate data validation directly on the user interface and can provide additional validation as well as verifying that the validation performed by the user interface is correct before committing new or edited configuration data to the configuration database 20. Multiple levels of data validation can provide a fail-safe check on possible errors in the user interface and prevent errors in configuration data obtained from any source from being stored in the configuration database 20.

Figure 4:
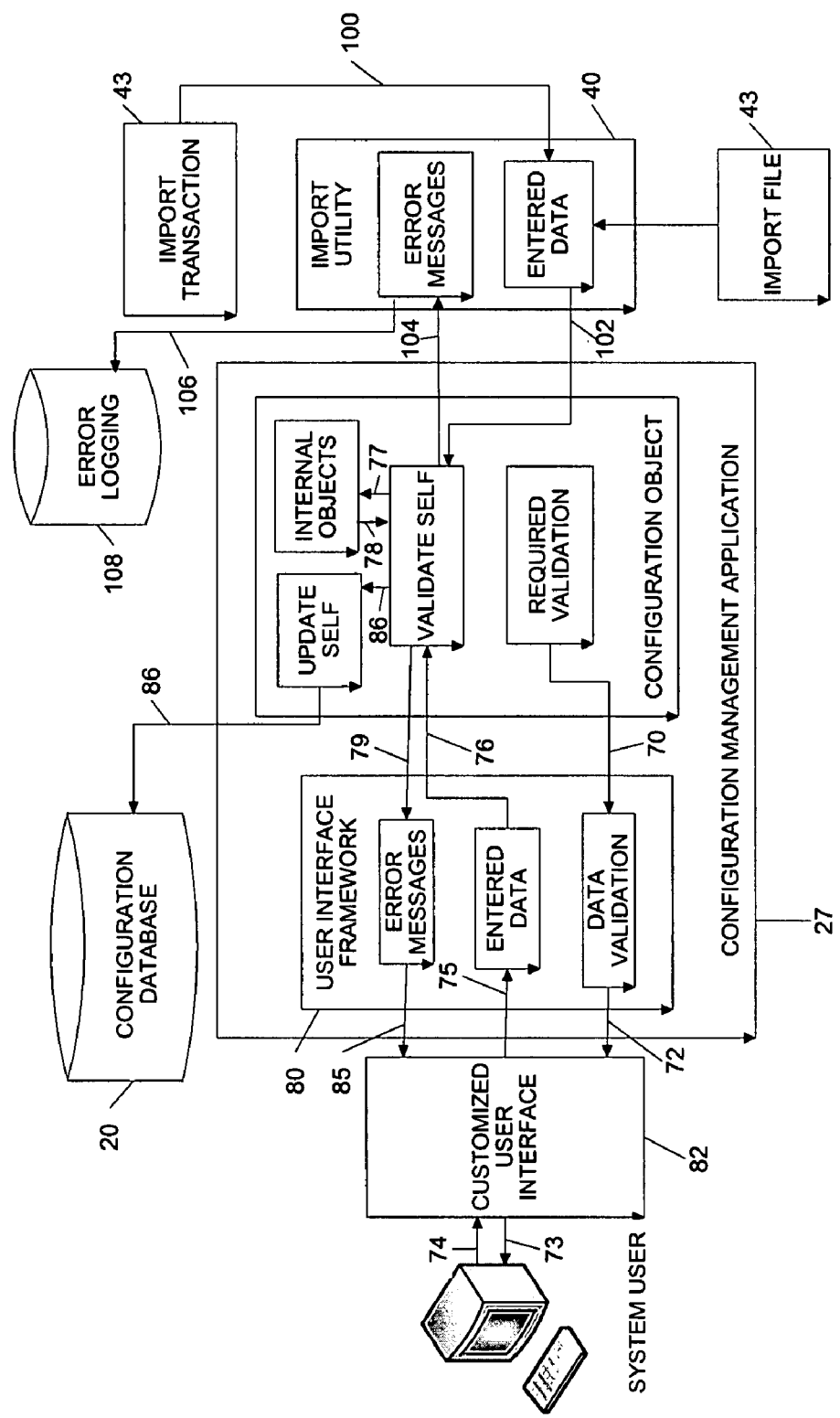
FIG. 4 illustrates a process of obtaining and validating configuration data from a manual entry process and an automated entry process according to one embodiment of the invention.

FIG. 4 illustrates a process of obtaining and validating configuration data from a manual entry process and an automated entry process according to one embodiment of the invention. Manual configuration data updates through the configurable user interface are shown on the left side of FIG. 4. At a first step of the manual entry process, the configuration subsystem 14 (e.g., the configuration management application 27) retrieves an object to update or creates a new object to be initialized (step 70). The configuration subsystem 14 also obtains validation information for the data included in the object. If the manual entry process includes updated configuration data, the configuration subsystem 14 sends current or existing configuration data included in the object.

At a second stop of the manual entry process, a user interface framework application or module 80 uses the validation information (and the current configuration data if application) to build a customized user interface 82 for the retrieved or created object (step 72). In some embodiments, the customized user interface can include a web page or a form displayable with a browser application.

In some embodiments, the user interface framework module 80 does not directly use the validation information (i.e., the validation method code) included in an object to edit entered configuration data, but implements its own programming code to implement validation requirements of the object. The user interface framework module 80 can also include logic to implement common validation required for objects. In some embodiments, the customized user interface 82 can also be configured to a particular role or security settings of a system user manually entering configuration data.

At a fourth step of the manual entry process, a system user interacts with the customized user interface 82 and provides configuration data (step 74). As described above, the customized user interface 82 can provide a first level of data validation. Any errors identified in the first level of data validation can be immediately indicated to the system user.

When entered configuration data passes the first level of data validation, the system user submits the configuration data entered in the customized user interface 82 (step 75). The entered configuration data is presented to the original object retrieved or created in the configuration subsystem 14 for a second level of data validation (step 76).

Objects can pass entered configuration data related to each internal object for validation (step 77).

Objects can combine the results of the validation methods of any internal objects with the results of its validation method and determine if the configuration data is correct (step 78).

If the configuration data is not correct, an object can pass an object containing one or more error messages to the user interface framework module 80 (step 79). The object containing the error messages can instruct a system user how to correct incorrect configuration data.

The user interface framework module 80 builds another customized user interface 82 that includes the previously entered configuration data and the error messages included in the returned object (step 85). The customized user interface 82 is then displayed to a system user (step 73). The system user corrects the identified errors and resubmits the entered configuration data (step 74). This process continues until the configuration data is validated at both the first level of validation and the second level of validation or until a system user stops attempting to update configuration data.

Once the validation methods within an object have validated the entered configuration data, the object updates its image (i.e., data) in the configuration database 20 (step 86).

Automatic configuration data updates through batch or online updates are shown on the right side of FIG. 4. In a first step of an automated entry process, a batch or online import utility 40 obtains configuration data (i.e., configuration load files 43) to add to or update to the configuration database 20 (step 100).

After the import utility 40 obtains configuration data, the incoming data is presented to existing objects or new objects for validation (step 102). Each object executes its validation method. An object with internal objects can pass configuration data related to each internal object to that object and each internal object can execute it own validation method.

An object combines the results of the internal objects' validation methods with the results of its own validation method and determines if the imported configuration data is correct (step 78).

If the imported configuration data is not correct, the object passes an object containing one or more error messages to the import utility 40 (step 104). The error messages included in the returned object can instruct a system user how to correct incorrect configuration data.

In some embodiments, the import utility 40 can disallow the update or addition of an object including errors. The import utility can log errors to an error log or database 108 (step 106).

Otherwise, once the validation methods within an object have validated the imported configuration data, the object updates its image (i.e., data) stored in the configuration database 20 (step 86).

As described above with respect to FIG. 2, a system user can use a configuration metadata management application 30 to configure customized user interfaces 82 displayed to system users in order to obtain and/or edit configuration data. A system user can edit and manage configuration metadata, stored in the configuration metadata database 26, in order to present certain data elements that the system user associates with one or more system user roles so that each system user manages only the configuration data for which they are responsible for.

Customized user interfaces 82 for manually entering and updating configuration data provide the ability to modify displayed fields and functions provided on a user interface each time the customized user interface 82 is displayed to a system user. For example, the fields and functions displayed by a customized user interface 82 can be controlled by a role or security profile of a system user. A role and security profile of a system user can indicate what permissions, privileges, and skill sets a system user has, and by user interface configuration rules, which permissions, privileges, and skill sets a system user can modify. Different customized user interfaces 82 for different system user roles can provide different customized user interfaces 82 to system users filling different roles. For example, an object representing an ATM device may contain data defining the business relationships between a financial institution supporting the ATM device, types of cards the ATM device supports, cash limits, and networks with which the ATM device can operate. The object may also contain data defining technical details of how the device is configured, such as communications protocols used to connect to networks, different types of bills the ATM device can dispense, availability of a deposit function, and details of instructions displayed on a screen of the ATM device. To provide configuration data for the device, a first system user (performing the role of a business analyst) can see a customized user interface 82 containing business elements of the device, a second system user (performing the role of a communications technician) can see a customized user interface 82 containing technical communication elements, and a third system user (performing the role of a device manager at a financial institution supporting the device) can see a customized user interface 83 containing elements needed to control a display or screen of the ATM device.

As described above, the configuration metadata management application 30 can allow system users to modify configuration metadata and/or rules in order to enable, disable, require, and/or hide individual fields and features on a particular customized user interface 82 displayed to a system user. By building customized user interfaces 82, as described above with respect to FIG. 4, a system user can remove a field or feature from a customized user interface 82 associated with one system user role and can enable a field or feature for a different system user role. The ability to disable and enable fields and/or features by changing the configuration metadata and/or associated rules, can allow system users to determine what fields and features they want to associate with each system user role without changing underlying programming code of the system 11.

In some embodiments, for objects, such as simple objects, a system user can create one or more customized user interfaces 82 (or web pages) from a single all-inclusive user interface. When entering configuration data for an object, such as objects representing an ATM device, a system user may deal with multiple objects at one time. For example, an object representing an ATM device can include an object representing canisters of bills to be dispensed and an object representing a depository for depositing cash and checks.

In some embodiments, customized user interfaces 82 can also be internalization and localization in order to provide international customized user interfaces 82.

Figure 5:
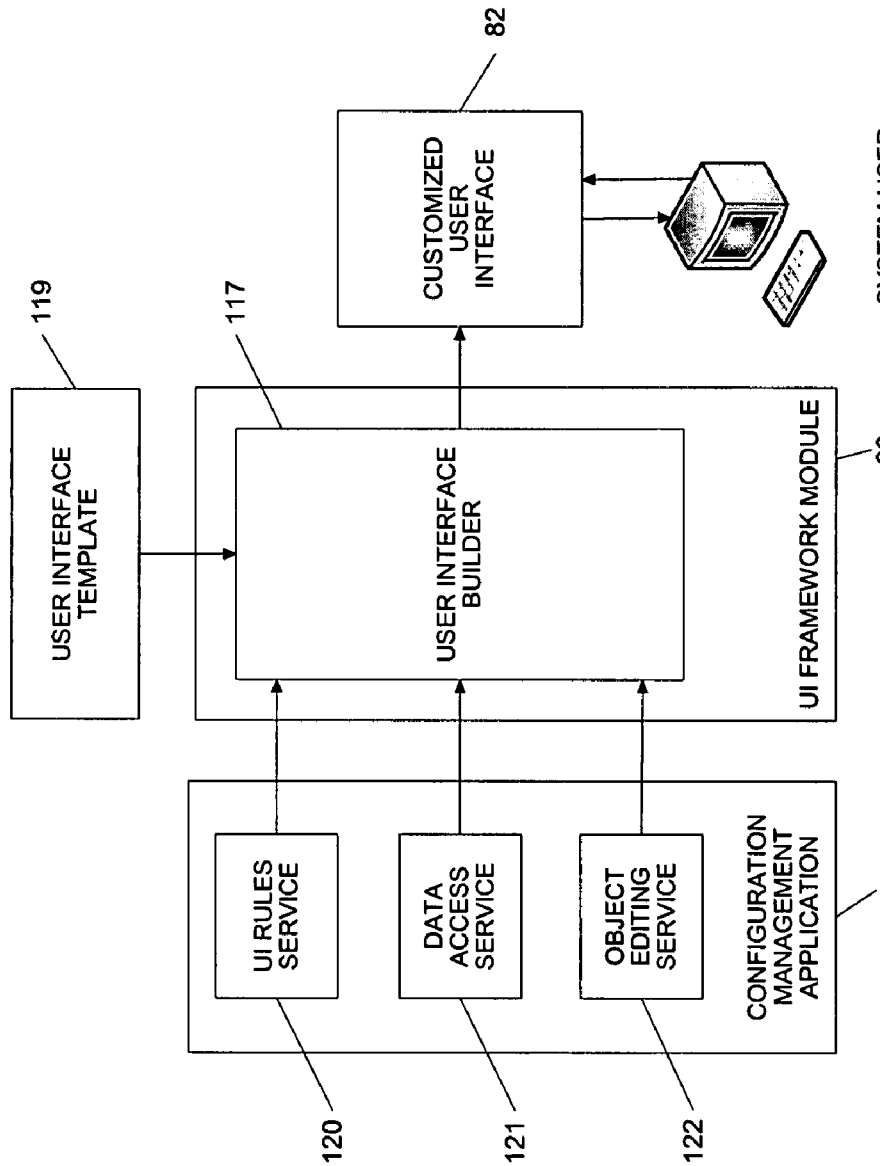
FIG. 5 illustrates a method of generating customized user interfaces with the configuration subsystem of FIG. 2 according to one embodiment of the invention.

FIG. 5 illustrates a method of generating customized user interfaces 82 according to one embodiment of the invention. As shown in FIG. 5, the user interface framework module 80 can build a customized user interface 82 (e.g., using a user interface builder module 117). In some embodiments, the user interface framework module 80 uses a user interface template 119 to create a customized user interface 82. The user interface framework module 80 can also use services provided from the configuration management application 27 and/or the configuration metadata management application 30 to build a customized user interface 82. For example, the user interface framework module 80 can use a user interface rule service 120, a data access service 121, and/or an object editing service 122.

Figure 6:
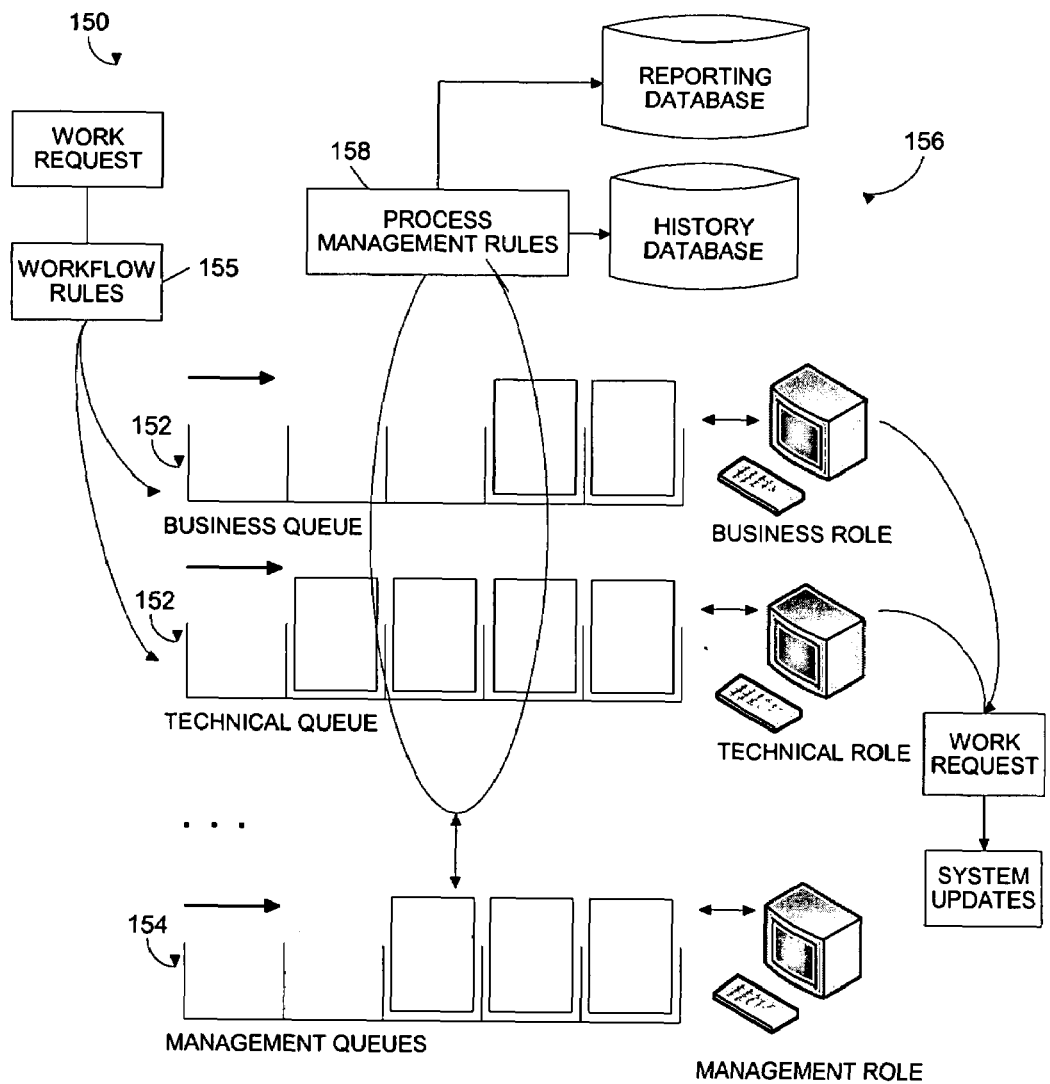
FIG. 6 illustrates a workflow management feature of the configuration subsystem of FIG. 2 according to one embodiment of the invention.

In some embodiments, the configuration subsystem 14 can include a workflow management feature that allows the system 11 to gather information from multiple system users independently, either at separate times or simultaneously, and to combine multiple entries into a complete picture of objects being configured. FIG. 6 illustrates a workflow management feature 150 of the configuration subsystem 14 according to one embodiment of the invention. The workflow manager feature 150 can include workflow controls, such as work queues 152, to align pending work with individual system users or roles, prioritize work, escalate scheduling problems, and report the configuration management process for analysis and history.

The workflow management feature 150 allows a system user to set workflow rules 155 when configuring the system 11. For example, a system user can set an order in which system users should perform configuration activities. Separate activities can be queued and prioritized for different system user roles as defined above, and may be processed in a specific order or simultaneously. Separate work queues 152 can schedule work for separate system user roles. In some embodiments, the workflow management feature 150 allows partial completion of configuration data for an object and tracks a process needed to complete configuration data of the object.

The workflow management feature 150 can include one or more process management queues 154 that handle the escalation of scheduling and/or other problems for review and resolution of workflow inefficiencies and errors. The workflow management feature 150 can also include reporting features 156 that can present a status of current configuration activities and/or tasks and can present information regarding the configuration subsystem 14 for analysis and history.

In some embodiments, system users can modify system user roles, the process management queues and related priorities and trigger conditions used to manage work, and reporting options by editing process management rules. The workflow management feature 150, in conjunction a security system of the system 11, can also allow system users to move configuration management functions to customers or their customers' customers, as appropriate, and to manage the process required to move the configuration management functions to a customer in order insure that configuration data is entered accurately and/or on time.

Some objects can contain configuration data that rarely changes from one instantiation of an object to another. To provide default or common information, the configuration subsystem 14 can provide "model objects." The model objects are not part of an active configuration repository of a system user but include a model of how to build a "standard" object. Model objects can be used to fill in commonly used values, and to default these values on user interfaces displayed to system users when manually entering configuration data. The configuration subsystem 14 can provide default values from model objects to pre-fill as much of standard manually entered data as possible. System users can change the default values of the model objects as needed. In some embodiments, system users can build model objects for any objects in the configuration database 20 and can set the default values.

Model objects can specify locked default values that should not be changed, and customized user interfaces 82 can be configured not to let system users change locked default values. In some embodiments, system users can create an "expert" role and provide a customized user interface 82 that displays locked defaulted values in order to allow changes to be made to locked default values by a system user fulfilling an "expert" role.

The configuration subsystem 14 can include processes to extract and package configuration data needed by applications 16, to update or "roll in" changes while the system 11 is running, to undo or "back out" changes if they cause problems, and to track changes and related upset for analysis and history.

Figure 7:
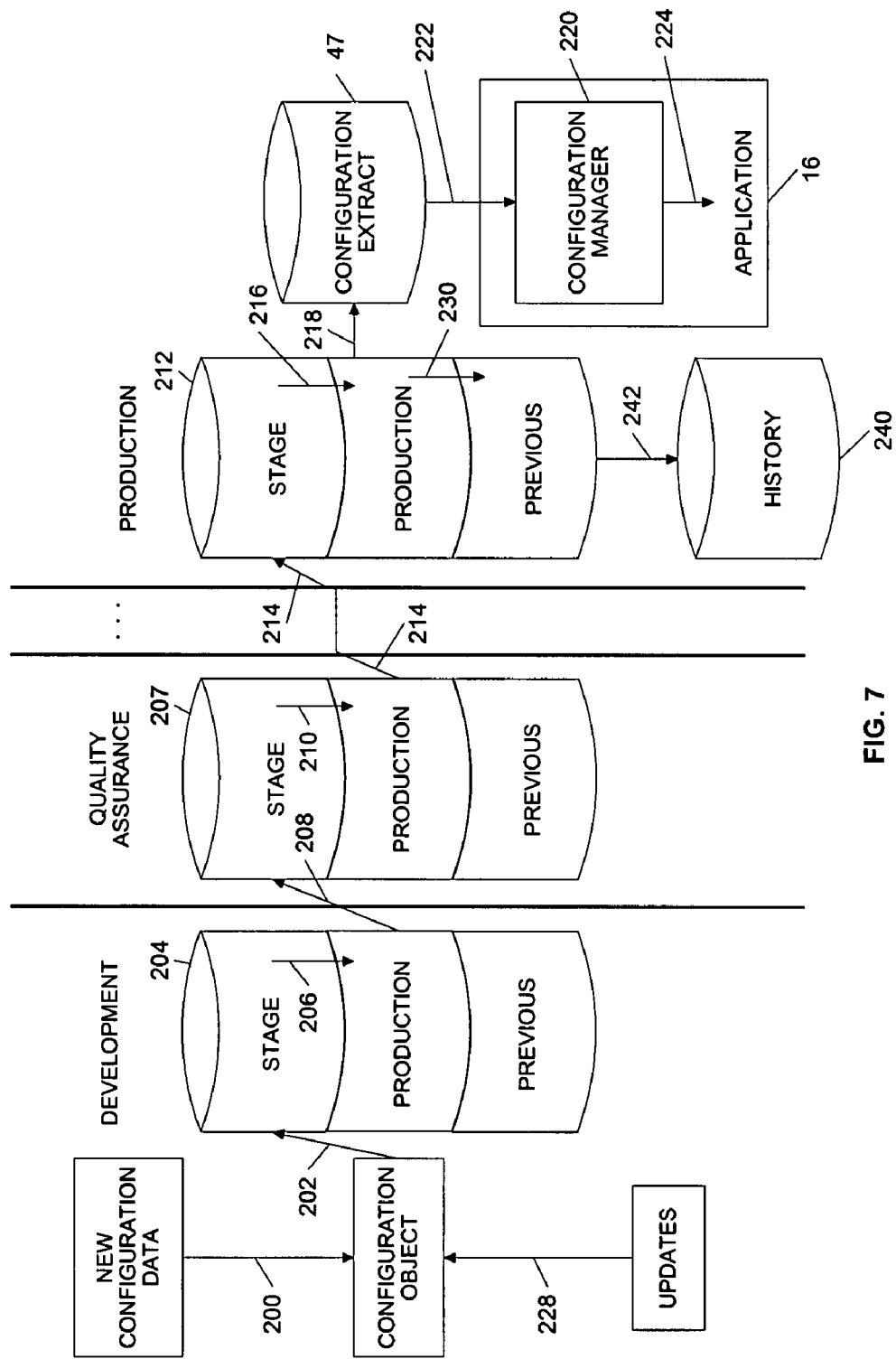
FIG. 7 illustrates a process of data life cycle management according to one embodiment of the invention.

In some embodiments, the configuration subsystem 14 provides features to manage a lifecycle of any given piece of data. FIG. 7 illustrates a process of data lifecycle management according to one embodiment of the invention.

A first step in a data lifecycle includes the creation of a new configuration object with new configuration data (step 200). A second step in the data lifecycle includes storing the configuration object using a managed change request that places the configuration object into a "staged" status in a development configuration repository 204 (step 202).

After the configuration object is staged, the configuration object is promoted to a "production" status in the development configuration repository 204 (step 206). Next, the configuration object is promoted to additional repositories, such as a quality assurance repository 207, an acceptance testing repository, and/or other repository associated pre-production processes (steps 208 and 210).

After any pre-production processes are performed, the configuration object is installed into a production repository 212 in a "staged" status (step 214). Next, the configuration object is promoted to a "production" status within the production repository 212 (step 216). Once the configuration object has a "production" status in the production repository 212, the configuration object can be extracted into one or more configuration extracts (step 218), which are tailored to the needs of various applications 16.

Once the configuration data is extracted into a configuration extract, the configuration object is loaded into a configuration manager module 220 (step 222), and the configuration data included in the configuration object is used productively within one or more applications 16 (step 224).

As applications 16 of the system 11 use the configuration data included in the configuration object, the configuration data can be updated (step 228). Updated configuration data can follow the data lifecycle as described in the above steps (i.e., step 202, 206, 208, 210, 214, and 216).

Once updated configuration data is promoted to a "production" status within the production repository 212, the previous or replaced configuration data can be promoted to a "previous" status (step 230). The previous configuration data can remain available in the production repository 212, and, in some embodiments, the previous configuration data can be rolled back into production (re-promoted to a "production" status) in order to help alleviate problems caused by the updated configuration data.

Configuration data with a "previous" status can also be deleted from the system 11. In some embodiments, configuration data with a "previous" status can be deleted and/or archived to a history file or database 240 as inactive configuration data when more recent configuration data is promoted to a "previous" status (step 242).

A configuration change request process can allow system users to move one or more independent or inter-related and dependent updates into an appropriate repository (e.g., development, quality assurance, production, etc.) at any given time. In some embodiments, configuration objects can include effective dates that allow system users to move configuration objects to a "production" status before they should be effective. The configuration objects can remain ineffective or inaction until their effective date.

The configuration subsystem 14 provides a standard application programming interface ("API") that applications can use to load and manage configuration data they use through common reusable code. In addition, the configuration subsystem 14 provides the ability to define any combination of configuration data in any way that may be appropriate for specific applications without being limited by the standard configuration API. The configuration subsystem 14 can provide standard formats for storing, retrieving, and using configuration data within applications of the system 11. In some embodiments, the configuration subsystem 14 also provides a set of programming "classes," which define objects needed to perform a set of standard configuration management functions within each application. The programming classes define a set of API definitions that applications can use to access configuration data without having to manipulate configuration data directly.

Figure 8:
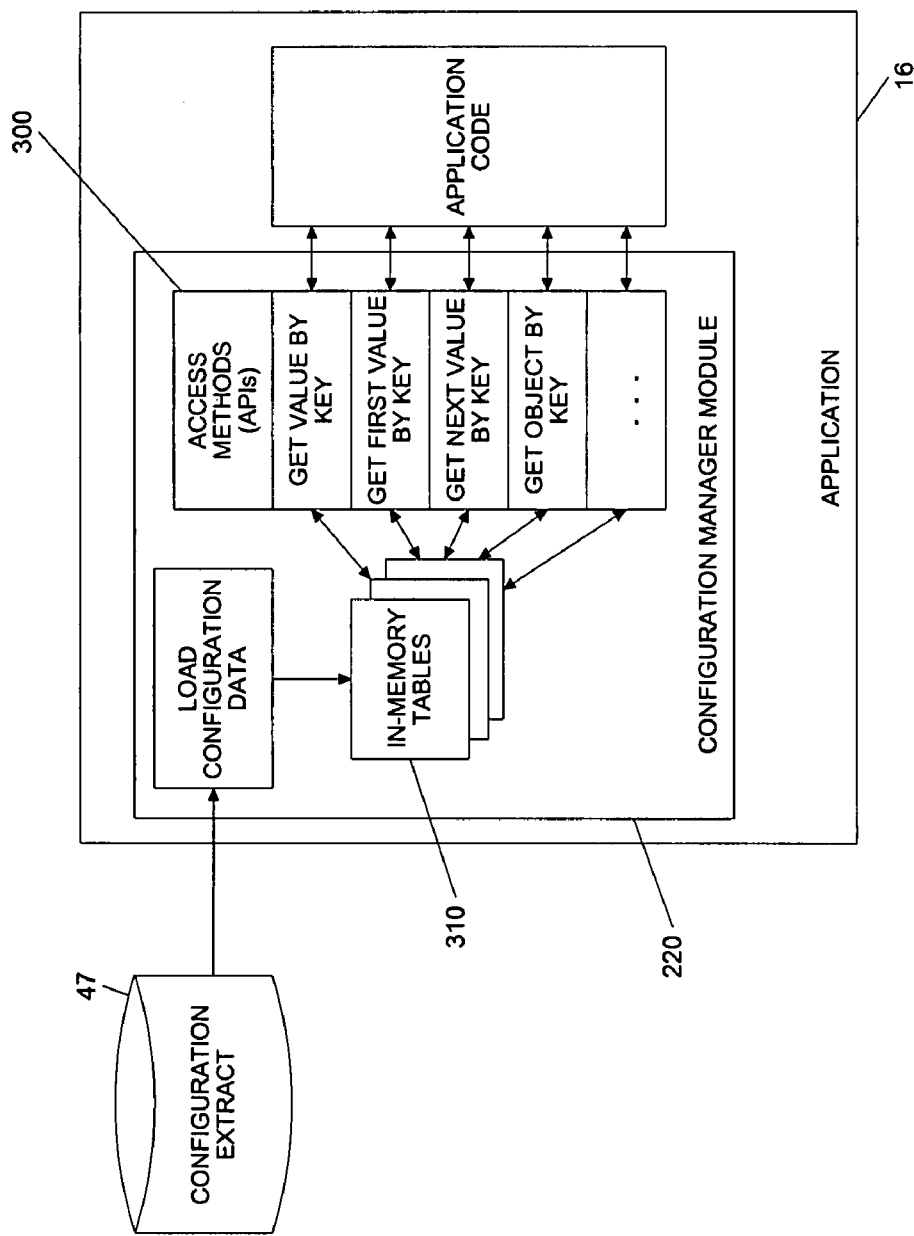
FIG. 8 illustrates an application included in the computer system architecture of FIG. 1 and configuration management application programming interfaces according to one embodiment of the invention.

FIG. 8 illustrates an application 16 and configuration management APIs 300 according to one embodiment of the invention. The configuration management APIs 300 provide a small, common, and/or reusable data management facility within the configuration manager module 220 of an application 16. An application 16 calls for and uses configuration data as needed using the configuration management APIs 300 without having to obtain knowledge about how the configuration data is stored or organized within the configuration subsystem 14 and/or the configuration manager module 220.

In addition to standard functions, the configuration subsystem 14 provides a mechanism for custom formatting and management of configuration data. For example, some configuration data is most useful when loaded into large or complex tables 310 within the memory of an application 16. Applications 16 that can make use of such specific data formatting and processing can also define a format and processing for configuration data as needed.

As shown in FIG. 1, the system 11 includes a monitoring subsystem 18. -The monitoring subsystem 18 can obtain and act upon information provided throughout the system 11. Monitoring processing rules, similar to transaction processing rules and workflow management rules, can enable the monitoring subsystem 18 to act directly upon many reported events and status changes without manual intervention. Escalation rules can enable the monitoring subsystem 18 to alert a system user and/or another monitoring system of conditions it cannot handle directly. In addition, the monitoring subsystem 18 can instruct a problem management subsystem 18 to track and manage ongoing problem cases. In some embodiments, workflow features (as describe above with respect to FIG. 6) can continuously monitor and escalate ongoing problem cases as necessary. In some embodiments, the system 11 can provide any or all of the features described above in response to an event depending on what associated monitoring rule objects require and/or perform. In some embodiments, the monitoring subsystem 18 can accept manually entered commands or command scripts from a command line interface. The monitoring subsystem 18 can process command scripts directly and/or can submit commands script to an operating system command interpreter.

The monitoring subsystem 18 can also include rules related to system status messages in order to keep track of the health of the system 11. If a status message causes a counter to pass a configurable threshold, the monitoring subsystem 18 can take corrective action or can escalate the condition for manual action as appropriate.

The monitoring subsystem 18 can also keep a history of the reported system conditions and events in order to display history information on demand, or as a baseline to compare against current conditions and trends. The system 11 can also use the historical data to set thresholds for proactive monitoring as described below.

Figure 9:
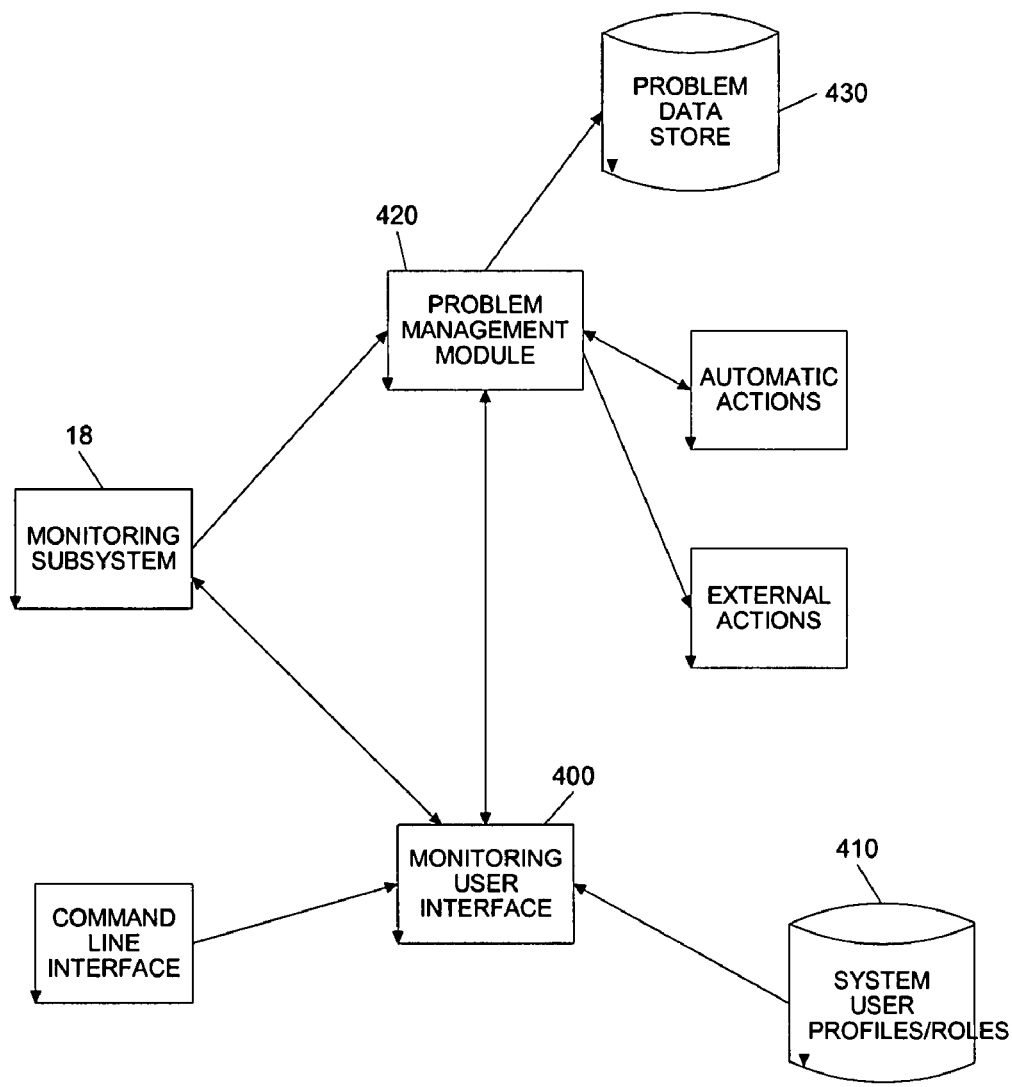
FIG. 9 illustrates functionality of a monitoring subsystem defined in the computer system architecture of FIG. 1 according to one embodiment of the invention.

FIG. 9 illustrates functionality of the monitoring subsystem 18 according to one embodiment of the invention. The monitoring subsystem 18 can consume messages, transactions, and events associated with the system 11 as input and can interpret the input and take actions accordingly. In some embodiments, the monitoring subsystem 18 can maintain a history of monitored statistics and events and can provide a monitoring interface user interface 400 to access current and historic data. In some embodiments, actions taken by the monitoring subsystem 18 can be configurable as described below.

The monitoring subsystem 18 can provide reactive monitoring that automatically detects an error or exception and notifies an appropriate party and/or takes a self-correcting action. In some embodiments, the monitoring subsystem 18 can provide proactive monitoring and can provide a "dashboard" that shows system status and can be accessed by system users. The dashboard can show a current status, which can include notifications occurring associated with a problem or exception and non-error messages. The dashboard can be displayed to a system user using a web application and/or a specific client application. The monitoring subsystem 18 can passively receive non-error messages generated by components of the system 11, such as transaction logs and/or event logs, which it can use to indicate a status or health of the system 11. The monitoring subsystem 18 can also actively interrogate applications 16 and/or components of the system 11 in order to determine a current state of the system 11.

In some embodiments, the monitoring subsystem 18 can generate one or more entities and one or more current monitored elements ("CMEs"). An entity can be associated with a component (e.g., a logical component or a physical component) being monitored (e.g., an ATM device or a group level identifier, such as a financial institution identifier) with the monitoring subsystem 18. An entity can include one or more attributes, such as a unique label for the entity, an entity type, a rule to start upon updating the entity, a timestamp of a last update of the entity, and a timestamp of initiation of the entity or a last reset of the entity. In some embodiments, the monitoring subsystem 18 can use one or more entity templates to create an entity. Each entity can include an entity type that links the entity to an entity template. Entity types (and corresponding templates) can be configured using the configuration subsystem 14 and/or the monitoring subsystem 18. In some embodiments, the monitoring subsystem 18 includes entity types (and corresponding template) linked to device entity types (and/or device model entity types), link entity types (e.g., internal links and external links), node entity types (i.e., physical or logical processing components of the system 11), process entity types, and business entity types (e.g., a financial institution).

Each entity can be associated with one or more CMEs. A CME can include an individual element or bucket of data. A CME can include one or more attributes, such as a unique label, data contained in the element or bucket, a rule to start upon updating the CME, a timestamp of a last update of the CME, and a timestamp of initiation of the CME or a last reset of the CME. In some embodiments, a CME can include a timer that alerts the CME of a lack of activity. A CME can generate an event when a timer expires. In some embodiments, the monitoring subsystem 18 can create a CME based on a CME template. Active CMEs used in the monitoring subsystem 18 can be included in a current monitored window ("CMW").

In some embodiments, an entity can be associated with a CME counter element. A CME counter element can store a numeric value that the monitoring subsystem 18 can set, add to, subtract from, reset, compare, and/or increment. An entity can also be associated with a CME consecutive element. A CME consecutive element can store a numeric value that the monitoring subsystem 18 can set, add to, reset, compare, and/or increment. An entity can also be associated with a CME rolling average element that stores a numeric value representing a mean average of one or more CME counters elements. The monitoring subsystem 18 can set, add to, reset, and/or compare the CME rolling average element. In some embodiments, a CME rolling average element includes an attribute that specifies a number of CME counter elements making up the mean average. The number of CME counter elements making up a mean average can be configured using the configuration subsystem 14 and/or the monitoring subsystem 18.

In some embodiments, an entity can also be associated with a CME status Boolean element that stores a Boolean status of an entity (e.g., an ATM device or a group of ATM devices) and a CME status level element that stores a status level as a percentage.

The monitoring subsystem 18 can provide monitoring of transactions, such as electronic financial transfer transactions. To obtain information about transactions, the monitoring subsystem 18 can subscribe to transaction log files (as described below with respect to FIG. 15).

In some embodiments, the monitoring subsystem 18 includes a message mapper. The message mapper can extract accepted or required data from incoming events, information, and log entries. The monitoring subsystem 18 can also subscribe to a monitoring event queue. In some embodiments, applications and components of the system 11 can include a local monitoring agent responsible for configurable system checks and forwarding events to the monitoring event queue. The monitoring subsystem 18 can also monitor change-of-status messages generated by devices and/or device managers, status messages generated by node agents, messages generated when new nodes and/or devices are added to the system 11, and events from devices or device managers that are received out of order.

When the monitoring subsystem 18 receives information about a transaction, the monitoring subsystem 18 can identify one or more entities and/or CMEs to be updated with the event information. The monitoring subsystem 18 can update the entities and/or the CMEs (and/or any associated elements, for example, the CME rolling average element), and can determine if any thresholds associated with the entities and/or the CMEs have been exceeded. In some embodiments, thresholds, such as a number of error messages that can be received from an ATM device, before a technician is notified, can be included in CMEs. Thresholds can include an age of a data timer (e.g., a timestamp of a last reset), an inactivity timer (e.g., a timestamp of a last update), a numerical range or limit, an enumerated type value check (e.g., "disconnected"), and/or a Boolean value.

The monitoring subsystem 18 can use a rules engine to execute rule objects (as described below with respect to FIGS. 16 and 17) to interpret incoming events and information. In some embodiments, the rule object can include one or more thresholds that a rule object can check when an entity and/or a CME is updated. As described above, an entity and a CME can include an attribute specifying a rule to execute when the entity or the CME is updated. The specified rule can perform threshold checking. If a threshold is exceeded, a rule object executed with the monitoring subsystem 18 can forward an event and/or a message to a third party, format and send a message or a command to an internal component of the system 11, reset a CME, archive CME data to a monitoring history database or log file, run a system configured script, generate a problem case, etc.

As described above, rule objects executed when an entity or a CME is updated can initiate actions. For example, a rule object can initiate the execution of an operating system script, the generation of a problem in a problem system, the sending of an internal message or an alert to another system component, the sending of an external message or an alert to another system, and/or the sending of a message or an alert to one or more system users. In some embodiments, messages can be sent to system users via a telephone system (e.g., sending a page or a fax) and/or via a network (e.g., sending an email). In some embodiments, messages and/or alerts can be sent to third party components and systems, such as simple network protocol management protocol ("SNMP") managers.

Rule objects executed with the monitoring subsystem 18 can include rules objects for storing entities and/or CMEs to a database, checking thresholds, rolling or archiving historical monitored events and/or information, resetting entity attributes, CME attributes, and/or CME elements, and performing script or command execution. In some embodiments, rule objects executed with the monitoring subsystem 18 can store entities, CMEs, and/or other information associated with the monitoring subsystem 18 (e.g., monitored events and resulting actions) to a database and/or log file.

As shown in FIG. 9, the monitoring subsystem 18 can include a monitoring user interface 400. The monitoring user interface 400 can display a "dashboard" indicating communications and software health. The "dashboard" can also display threshold values (e.g., approval rates over a link) and monitored entities. In some embodiments, a system user can configure the threshold values and/or the monitored entities displayed by the monitoring user interface 400 using the monitoring subsystem 18 and/or the configuration subsystem 14. In some embodiments, the monitoring user interface 400 can use system user profiles (i.e., roles and/or security settings) 410, to determine whether a particular system user should be allowed to configure threshold levels, monitored entities, and/or other monitoring configuration data.

The monitoring user interface 400 can also include a graphical system health/operations subsystem that provides filtered drill down capability. System users can also use the monitoring user interface 400 to scroll through filtered event lists. In some embodiments, event lists can include tokenized events or information and a system user can filter the event list based on token existence, token identifier, and/or token value.

The monitoring user interface 400 can also generate on-demand displays of statuses. In some embodiments, the monitoring user interface 400 can provide search capabilities that allow a system user to search and receive the status of a particular entity.

As described above, system users can use the monitoring user interface 400 to create, read, update, and delete monitored entities. The monitoring user interface 400 can also allow system users to create, read, update, and delete rules associated with monitored entities. In addition, the monitoring user interface 400 can allow system users to edit monitored entity scripts and/or commands executed according to the rules. As described above, the monitoring user interface can use system user profiles 410 to determine which configuration fuctionalities are available to a particular system user executing the monitoring user interface 400.

As also shown in FIG. 9, the monitoring subsystem 18 can include a problem management subsystem or module 420. The problem management subsystem 420 can use a problem data store 430 to track problem cases generated and managed with the monitoring subsystem 18. The problem management subsystem 420 can provide an API that allows the monitoring subsystem 18 to create problem cases. In some embodiments, the monitoring subsystem 18 generates a problem case for monitored conditions requiring external effort to resolve. A rules-based workflow manager capability of the configuration subsystem 14 (as described above with respect to FIG. 6) can monitor and trace a problem case to its resolution.

In some embodiments, the system 11 processes and manages context objects. A context object can include information needed to complete a specific transaction, case, or other element of work to be processed by the system 11. Context objects can be considered running or executing instances of a class or a type of object. Each class can contain definitions or data types and programming code for an object. For example, an automated teller machine ("ATM") class may define an ATM machine. The ATM class can define what types of data or information the ATM machine includes, such as the name or other identifier of a financial institution ("FI") that owns or manages the ATM. The ATM class can also define what an ATM machine can do and how it works. The ATM class can also contain the programming code needed to handle ATM processing and define the data that the programming code uses.

When an instance of a class is instantiated or generated ("an object"), each instance of the class includes one or more data types defined by the class, which are set to data specific to a particular object (e.g., a name of a FI managing an ATM machine). The instance of the class also includes the programming code or functionality defined by the class. For example, an object named ATM123 can be an instance of the ATM class and can define a specific ATM machine in a specific location. The ATM123 object can include ATM data related to a specific instance of an ATM and can provide processing as defined by the ATM class. In a single application or system there can be many instances of a class.

To generate a context object, the system 11 can extract information from incoming data and place it into an object called a context object. Incoming data can include requests for service from external devices and systems, such as an ATM or a financial institution network. Requests can include financial transactions, such as withdrawing cash from an ATM; manual requests from users who are querying the system for information; or requests for updates and/or modifications from operators running and/or configuring the system 11. The system 11 can encapsulate each request into a context object. In some embodiments, different types of context objects can be used for different types of requests. Each type of context object, however, can inherit a basic form and structure from a base context class. Therefore, once incoming data is encapsulated into a context object, the system 11 can process the context object regardless of a specific type or format of the original incoming data and the type of context object created to contain the incoming data.

While processing context objects, the system 11 can transfer a context object to another component or subsystem of the system 11. In some embodiments, data contained in a context object can also be transmitted to other external systems. The system 11 can use a format called a "tokenized message" to transfer context objects and other information. A tokenized message can include one or more self-defining "tokens." Each token can represent a unit of information. A system component or external application can obtain information from the tokenized message by examining individual tokens included in the message. In some embodiments, a system component or external application obtaining the tokenized message does not need to know the overall or complete structure of the tokenized message. A system component or external system can search tokens included in a tokenized message for tokens that identify needed or accepted data and can ignore tokens identifying unneeded or unaccepted data. Using tokenized messages can simplify system maintenance and updating since as new data elements are added to a tokenized message, additional code to handle the data change is minimized. For example, to include new data in a tokenized message, components that use the new data can be updated to identify and use the new data included in the message, and components that do not need the new data element can ignore the new data as they ignore other unaccepted tokens.

In some embodiments, the system 11 can also use tokenized messages to save a context object to a logging file and/or a trace file, to move a context object between processes or applications that are implemented in a different programming language (e.g., Java or C++), to send visual information to a user interface for display with a browser application, and/or to construct an configuration extract of configuration information for a specific portion of the system from the configuration subsystem 14.

In some embodiments, applications of the system 11 can use a logger object (an instantiation of a logger class) to write a context object (or other system information) to a log file. The logger object can provide an API that an application calling or instantiating the logger object can use to supply parameters and format a log entry. In some embodiments, a log entry includes a tokenized log entry. Log entries are added to a log file buffer and are written as the log entry buffer becomes full and/or after a predetermined amount of time. In some embodiments, a system user can configure the predetermined amount of time before log entries included in a log file buffer are written to a log file. Log entries can be written to a log file using a log output stream. In some embodiments, the log output stream can process log entries in either direction (i.e., starting with a first log entry in the log entry buffer or starting with a last log entry in the log entry buffer).

Each log buffer can include an entry including a byte length of its contents, a byte offset in a stream, a count of log entries in the buffer, and log entries. In some embodiments, the byte length of the contents of a log buffer can be included at both ends of a log buffer in order to support processing of a buffer stream in either direction. A log stream includes the contents of each file in a log set. A log stream can include a sequence of variable length log buffers.

In some embodiments, a log key includes an entry including a logger process name, a logger object name, a file sequence number, a buffer byte offset in a file, and an entry number in the buffer. The log key can be added to a context object to provide a reference to where a corresponding log entry can be found.

The logger object (or the corresponding log class) is configured to write to one or more log file sets. In some embodiments, the logger object is configured to write to one or more log file sets in parallel. Each file set includes a set of files in a directory. The logger object can concatenate a name of the logger object with a file sequence number in order to generate a name of a log file. For example, a logger object named "transactions" instantiated by a process or application named "switch2" generates file names "switch2transaction1.oel" or "switch22transactions9999999," depending on a file sequence number (i.e., the number of log files previously generated). The logger object can save the log files, with the generated names, to directories specified in each log file set.

A logger object can support one or more strategies for executing once instantiated by a calling application or process. In a first strategy, an asynchronous strategy, the calling application (or a thread of the calling application) continues processing after the logger object adds a log entry to a log file buffer. In a second strategy, a synchronous strategy, the calling application (or a thread of the calling application) is blocked until a log buffer that the logger objects adds a log file entry to is written or flushed. In a third strategy, an asynchronous secure strategy, the calling application (or a thread of the calling application) continues executing after the logger object adds a log entry to the log entry buffer, and the context object passed to the API is re-queued for further processing once the buffer has been flushed to all file sets.

Applications 16 can subscribe to logger objects. To subscribe to a logger object, an application 16 sends a subscription request to an application process associated with the logger object. In some embodiments, logger objects send details of its current state and buffers logged to each subscribing application (hereinafter "subscriber application"). The subscription request can indicate whether a subscriber applications process is to be treated as synchronous (i.e. equivalent to a file set, suspending the application process until a reply is sent), asynchronous (i.e. fire and forget), or follow-on (i.e. fire and forget but not until the buffer has been flushed to the file sets).

In some embodiments, log entries can be tokenized, and the tokenization method used to create log entries can support multiple versions so that sources and consumers (e.g., applications reading log file and subscriber processes) do not need to be at a same release level or version to communicate and can be software-language independent. Consumers of a tokenized log entry, whether a subscriber application or an application reading a log file, can recreate the logged object (and its contents) by unpacking the tokenized log entry. The format of the tokenized object can be recursive so that internal objects can also be unpacked.

In some embodiments, an application 16 of the system 11 is configured to run one or more logger objects. Configuration data for each logger object can specify a logger class, an API available to an application 16, a roll over size for each log entry or file, a size of a full log buffer, a maximum time to delay a log entry waiting for a log buffer to fill, and a directory path name for each file set.

On startup, a logger object can use a file sequence number one greater than a maximum file sequence number found in any file set. In some embodiments, if a write to a log file fails, a logger object can move to a next file sequence number. A logger object can also move to a next file sequence number if a log file is refreshed because of a failed disc or a network node is returned to service. In some embodiments, a file sequence number existing in each file set differs only in the last buffer written.

If a subscriber application fails (or is stopped), a logger object receives an error when sending a log buffer to the subscriber application. In some embodiments, if a logger object receives an error when sending a buffer to a subscriber application, the logger object removes the subscriber application from a list of subscriber applications maintained by the logger object. On recovery, a failed subscriber application can attempt to reconnect to the logger object. In some embodiments, a subscriber application can determine whether missed log entries should be recovered from log files and, if so, whether this is a background catch-up task or is done before processing new log data.

In some embodiments, a subscribe request remains as an outstanding request as long as the logger object is running, and a subscriber application can detect failed logger objects when it receives a response or failure reply to a previously-send subscribe request. A subscriber application can attempt to re-establish a connection with the failed logger object and can handle any recovery required.

In some embodiments, logger classes are provided as a Java API and/or a C++ API. A base logger class can include programming code for configuring a logger object, initializing file sets, creating thread objects for each file set and each subscriber application, managing a pool of log buffer objects, coordinating between thread objects and buffer objects, and responding to a command interface.

An event logger class is derived from a base logger class and uses asynchronous logging. Additionally, an event logger class can be configured to filter calling or instantiating application requests based on log level. The event logger class supports an AddEventObject method where an instantiating application identifies an event source and a unique event number along with the parameters relevant to the event. In some embodiments, consumers of log entries logged with the logger object can format log entries based on the unique event number, for example, in order to provide an internationalized message for a user.

A context logger class is derived from a base logger class and uses synchronous logging. The context logger class supports an AddObject method that is passed a context object to be logged. The context object can be updated with a key to a log entry. Each calling thread can wait to be notified that the log buffer has flushed before returning to an application that called or instantiated the logger object.

A trace logger class is derived from a base logger class and uses asynchronous logging. Additionally, the trace logger class can be configured to filter application requests based on a trace level. The trace logger class can also operate in a short mode, which limits the amount of detail required. The trace logger class supports an AddTraceObject method, which is passed a context object to be logged and details regarding why the context object is being traced. Optionally an application calling or instantiating the trace logger object can pass a list of field names as details to the AddTraceObject so that only a subset of a context object is logged if a logger object is operating in a short mode.

A context worker logger class is derived from a base logger class and uses asynchronous secure logging. The context worker logger class is configured with a name of a thread pool to handle processing. The context worker logger class supports an AddObject method that is passed a context object to be logged. The context object is updated with a key to the log entry. A list of context objects to forward is associated with a log buffer. When the log buffer is successfully flushed each listed context object is passed to the thread pool for further processing.

Figure 10:
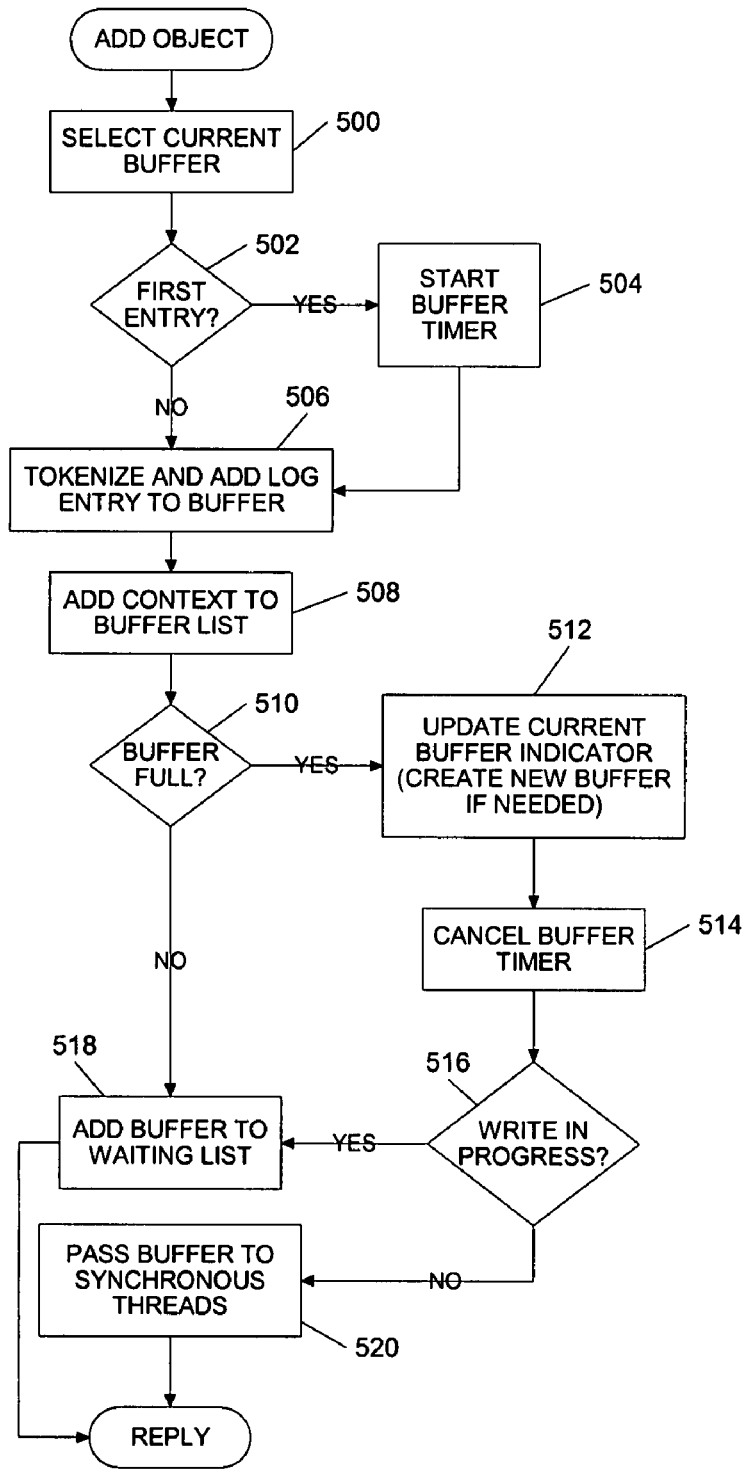
FIGS. 10-15 illustrate a method of interacting with a logger object according to one embodiment of the invention.

FIG. 10 illustrates a process performed when an application thread calls the AddObject method on a context worker logger object. As shown in FIG. 10 a context worker logger object can select a current buffer (step 500). If a log entry is a first entry in a buffer, the context worker logger object can start a buffer timer (step 504). The context worker logger object can then tokenize and add the tokenized log entry to the buffer (step 506). Next, the context worker logger object can add the context object to a buffer list (step 508). If the buffer is full (longer than a configured size) or the buffer timer has expired (step 510), the context worker logger object can update a current buffer indicator (step 512). In some embodiments, the context worker logger object can create a new buffer if needed.

After the context worker logger object updates the current buffer indicator, the context worker logger object can cancel the buffer timer (step 514). Next, the context worker logger object can determine if a buffer write is in progress (step 216). In some embodiments, only one buffer is used for writing at a time. A number of full buffers, however, can be queued waiting to be written.

If a write is in progress, the context worker logger object can add the buffer to a waiting list (step 518). If the buffer is full (step 510) and a buffer write is not in progress (step 516), the context worker logger object can pass the buffer to the synchronous threads (step 520).

Figure 11:
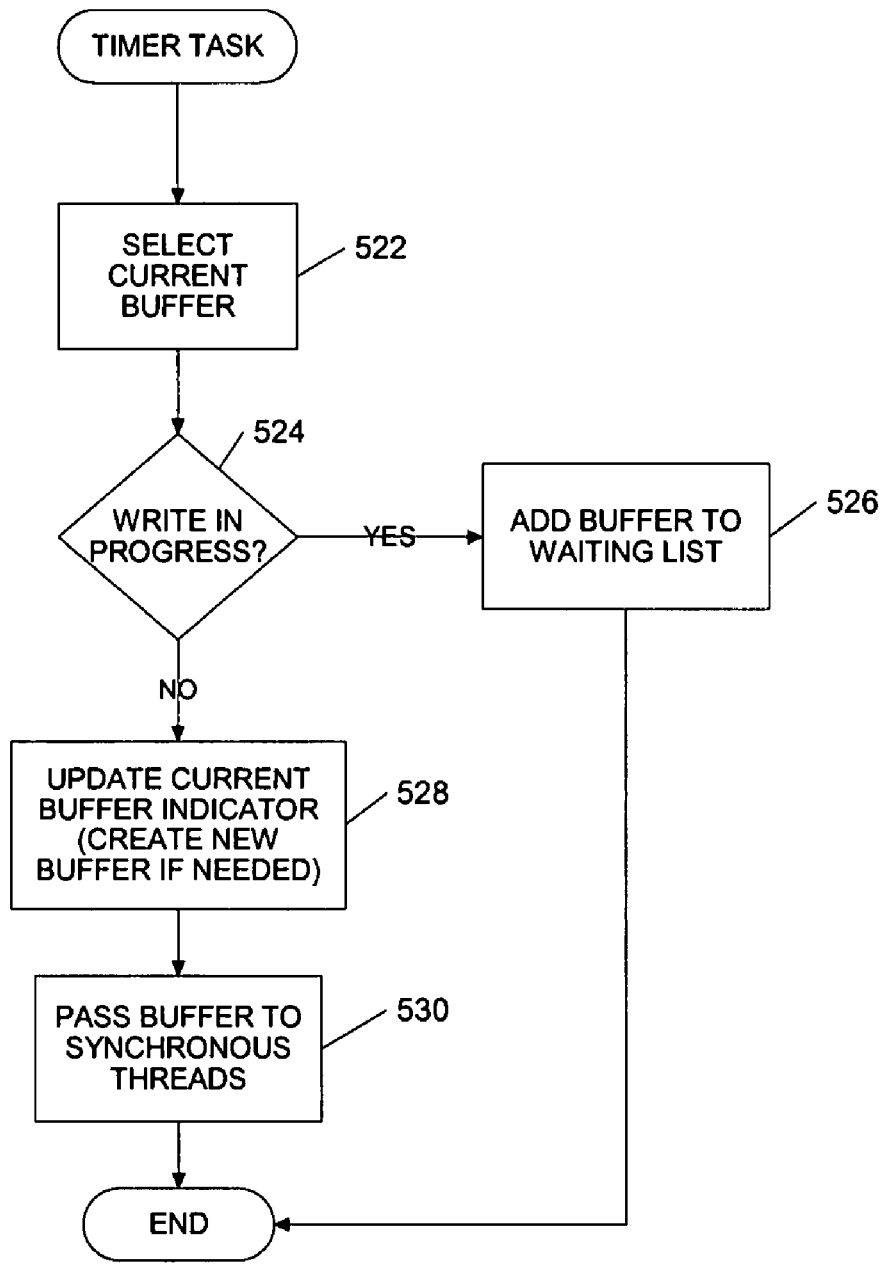

FIG. 11 illustrates a process performed when a buffer timer expires indicating that a buffer is ready for writing. Until previous buffer writes are completed, the buffer ready for writing can have new log entries appended to it. As shown in FIG. 11, a logger object can select a current buffer (step 522) and can determine if a buffer write is in progress (step 524). As described above with respect to FIG. 10, only one buffer can be writing at a time.

If a buffer write is in progress (step 524), the logger object can add the current buffer to a waiting list (step 526).

Otherwise, if a buffer write is not in progress (step 524), the logger object can update a current buffer indicator or create a new buffer if needed (step 528) and can pass the buffer associated with the expired timer to synchronous threads (step 530).

Figure 12:
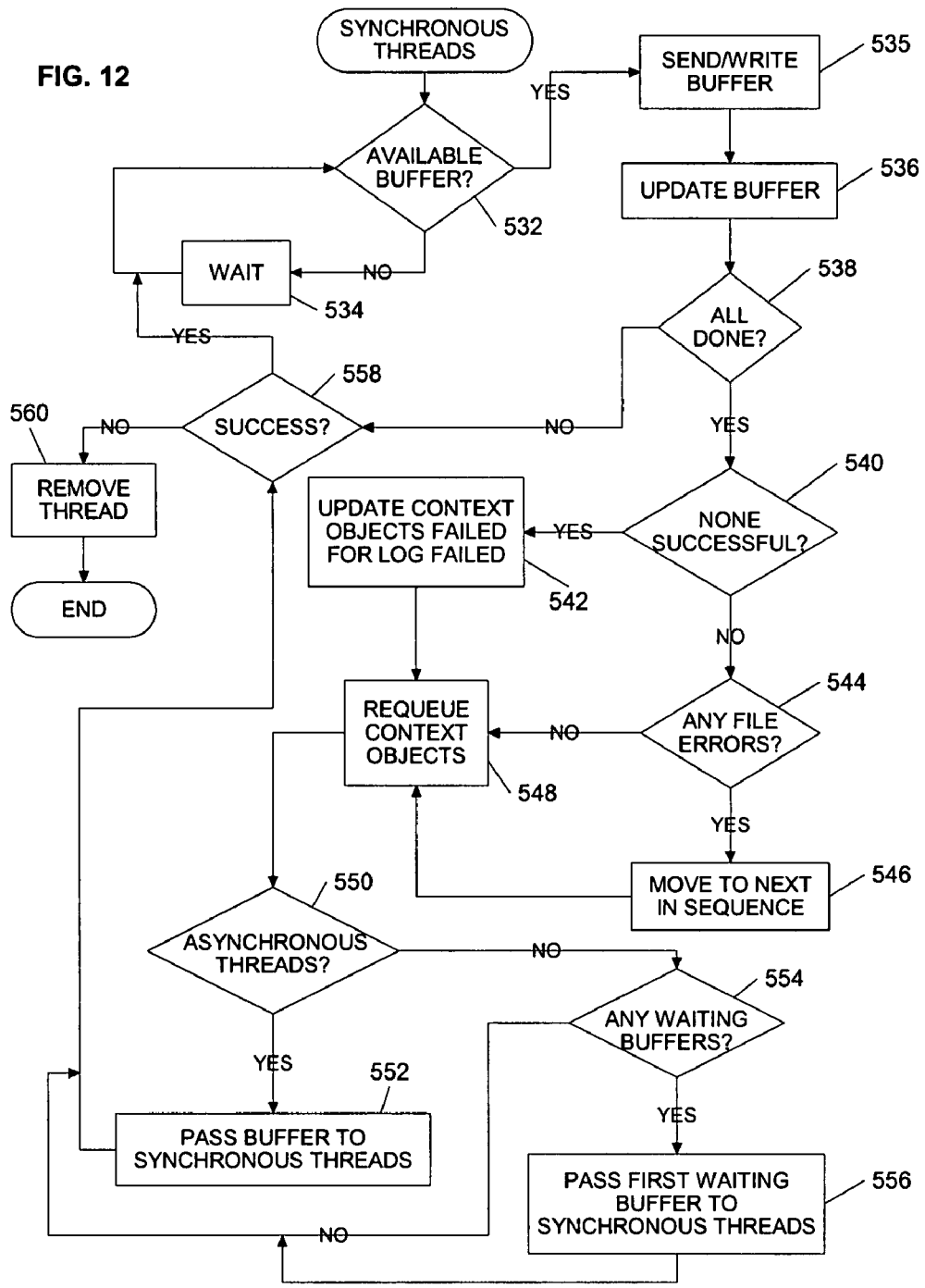

FIG. 12 illustrates a process of handling log file sets and/or synchronous subscriber applications using synchronous threads of a logger object. In some embodiments, the synchronous threads of the logger object wait to be notified of a buffer to write or send to a subscriber application. As shown in FIG. 12, a synchronous thread of the logger object can determine if a buffer is available for sending to a subscriber application or writing (step 532). If a buffer is not available, the synchronous thread of the logger object can wait a predetermined amount of time (step 534) and can then recheck for an available buffer (step 532).

Otherwise, if a buffer is available, the synchronous thread of the logger object can send the buffer or write the buffer (step 535) and can update the buffer in order to inform the buffer of the completed send or write (step 536).

In some embodiments, a last synchronous thread of the logger object to complete a buffer send or write performs post processing (step 538). For example, a last synchronous thread of the logger object can determine if a buffer was not written or sent (step 540). If the buffer was not written or sent, the last synchronous thread of the logger object updates context objects included in the buffer (step 542). Otherwise, if the buffer was written or sent, the last synchronous thread can determine if any log files failed (step 544). If any log file failed, the last synchronous thread can move to a next file sequence number (step 546).

As shown in FIG. 12, after the last synchronous thread determines if the buffer was written or sent (step 540) and determines whether any log files failed (step 544) (if applicable), the last synchronous thread of the logger object can re-queue context objects to a configured pool or queue for further processing (step 548).

Next, the last synchronous thread of the logger object can determine if there are asynchronous threads (step 550). If there are asynchronous threads, the last synchronous thread can pass a buffer to an asynchronous thread (step 552). Otherwise, if there are not any asynchronous threads, the last synchronous thread can determine if there are any waiting buffers (step 554). If there is a waiting buffer, the last synchronous thread can pass a first waiting buffer to synchronous threads (step 556).

As shown in FIG. 12, if a thread is not a last synchronous thread of the logger object (step 538) or if the above post-processing functions, as described above, were performed by a last synchronous thread, a synchronous thread of the logger object can determine whether the buffer send or write was successful (step 558). If the buffer write or send failed, the synchronous thread of the logger object exits (i.e., is removed) after updating a logger objects list (step 560). Otherwise, if the buffer write or send was successful, the synchronous thread of the logger object returns to check for available buffers (step 532).

Figure 13:
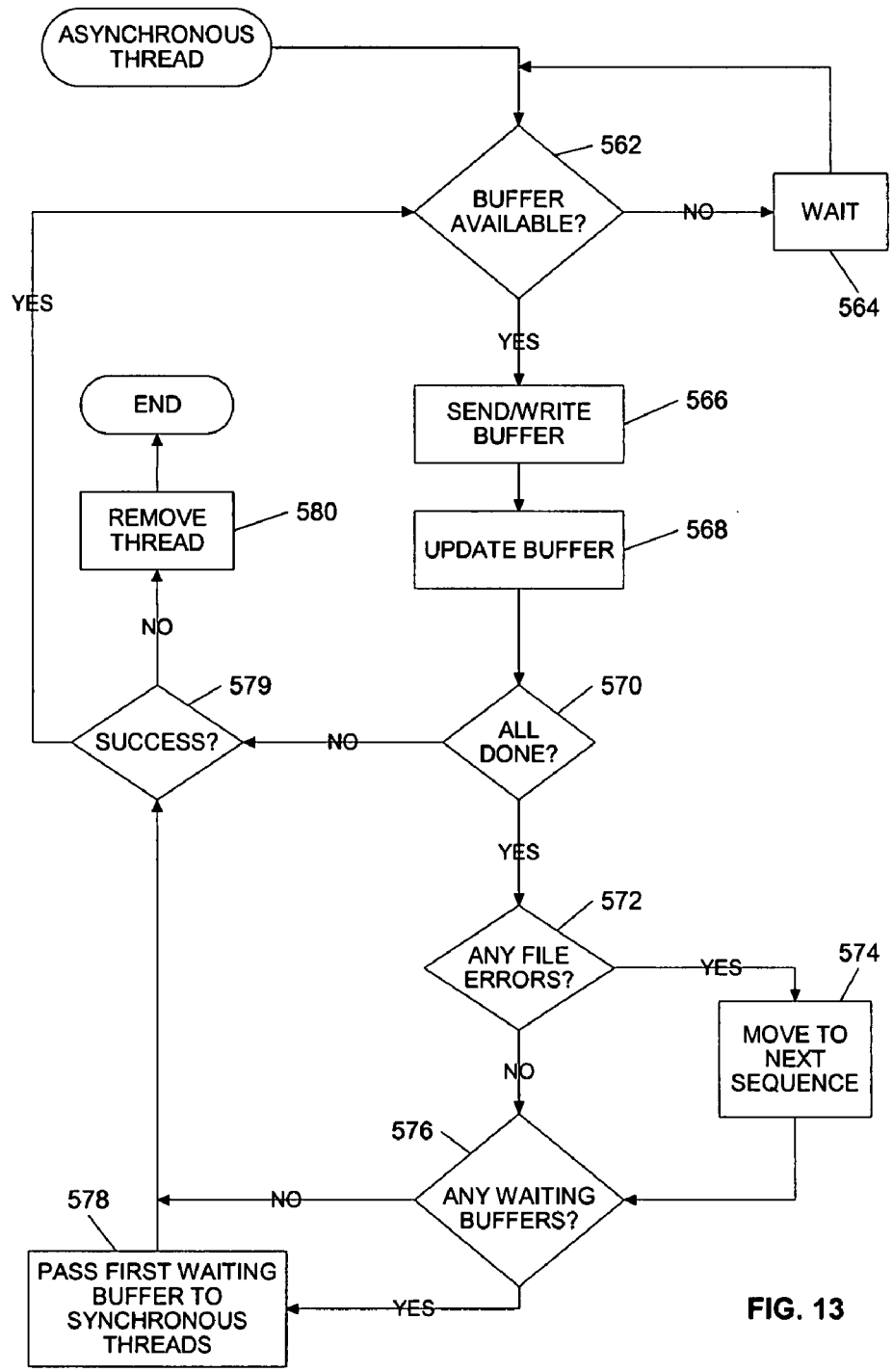

FIG. 13 illustrates a process of handling log file sets and/or asynchronous subscriber applications using asynchronous threads. In some embodiments, asynchronous threads wait to be notified of a buffer to write or send to a subscriber application. As shown in FIG. 13, a logger object asynchronous thread can determine if a buffer is available for sending to a subscriber application or writing (step 562). If a buffer is not available, the asynchronous thread can wait a predetermined amount of time (step 564) and can then recheck for an available buffer (step 562).

Otherwise, if a buffer is available, the asynchronous threads can send the buffer or write the buffer (step 566) and can update the buffer in order to inform the buffer of the completed send or write (step 568).

In some embodiments, a last asynchronous thread to complete a buffer send or write performs post processing (step 570). For example, a last asynchronous thread of the logger object can determine if log files failed (step 572). If any log file failed, the last asynchronous thread of the logger object can move to a next file sequence number (step 574).

As shown in FIG. 13, after the last asynchronous thread determines whether any log files failed (step 572), the last asynchronous thread can determine if there are any waiting buffers (step 576). If there is a waiting buffer, the last asynchronous thread can pass a first waiting buffer to synchronous threads (step 578).

As shown in FIG. 13, if a last asynchronous thread did not complete (step 570) and/or the above post-processing functions, as described above, were performed, an asynchronous thread of the logger object can determine whether the buffer send or write was successful (step 578). If the buffer write or send failed, the asynchronous thread of the logger object exits (i.e., is removed) after updating a logger objects list (step 580). Otherwise, if the buffer write or send was successful, the asynchronous thread of the logger object returns to check for available buffers (step 562).

An application 16 can be configured to subscribe to one or more logger objects associated with one or more processes. In some embodiments, an application can configure logger objects as a set. For example, a set can include, all logger objects named "transaction" on all processes in a category switch. A subscriber applicant creates a subscriber thread for each logger. A subscriber thread (part of a logger object API) can create a subscriber application object, can obtain a reference to an appropriate logger process publisher object, and can send a subscribe request. In some embodiments, a reply to a subscribe request is only received if there is an error. A logger object can also make call-back requests to the subscriber object (a reference to which is a parameter of the subscribe request). Call-back request can be handled by worker threads under control of inter-process communications software being used with the system 11.

Figure 14:
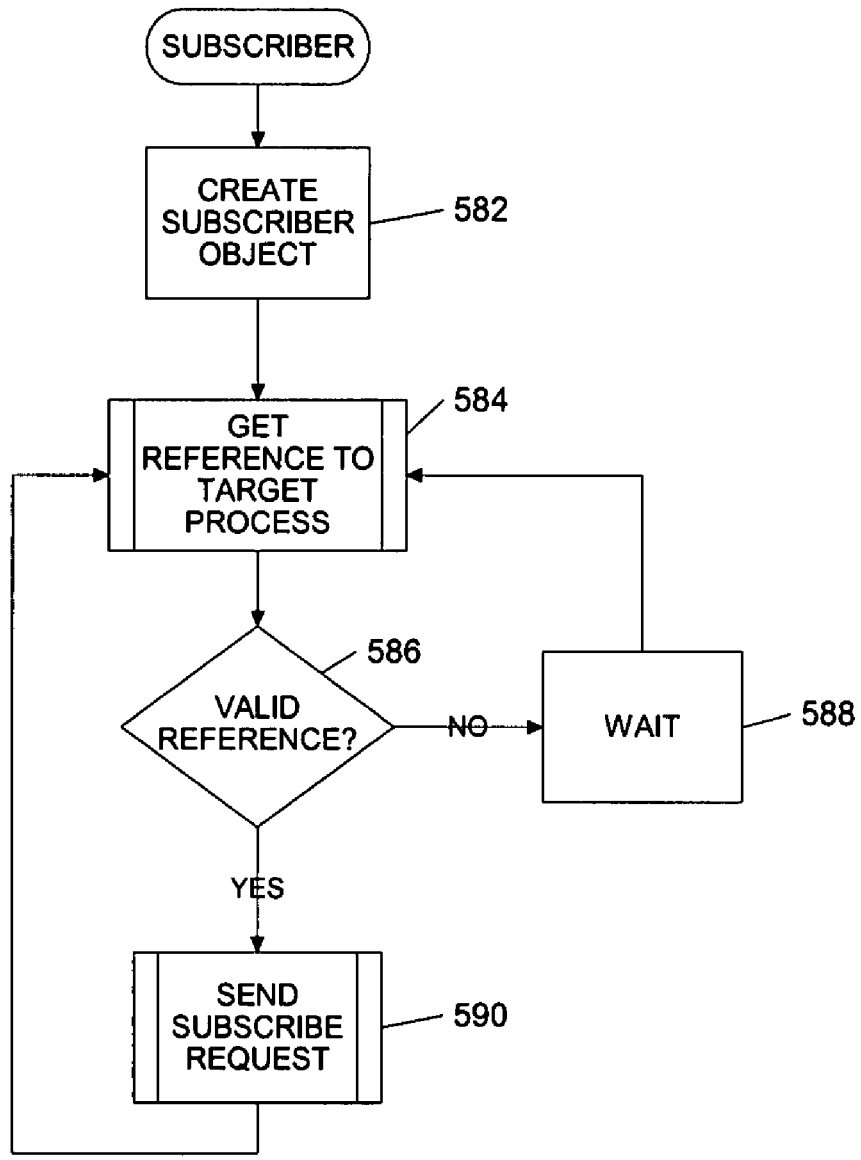

FIG. 14 illustrates a process of creating a subscriber application object implementing a subscriber interface and activating it. As shown in FIG. 14, a subscriber application thread creates a subscriber application object (step 582). Next, the subscriber application thread obtains a reference to a target process (i.e., publisher interface object of logger process) (step 584). In some embodiments, the subscriber application thread can determine whether the reference to the target process is valid (step 586). If the reference is not valid, the subscriber application thread can wait a predetermined amount of time (step 588) and can attempt to obtain a new reference to the target process (step 584).

Once the subscriber application thread obtains a valid reference to a target process, the subscriber application object sends a subscribe request to the target process (step 590). The subscribe request can indicate a logger object required and, in some embodiments, a call-back object reference. Receiving a reply to the subscribe request can indicate that the subscription has failed and should be retired (step 584).

Figure 15:
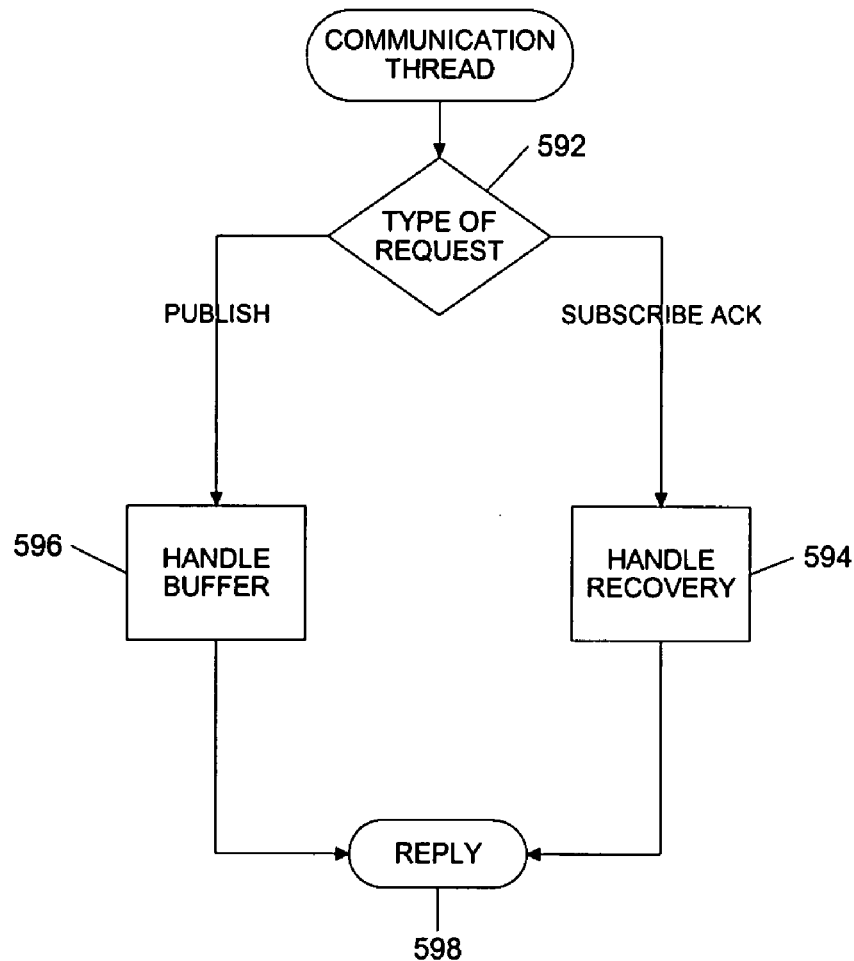

FIG. 15 illustrates a process of handling a call-back requests. As shown in FIG. 15, a communication thread can determine a type of call-back request (step 592). In some embodiments, communication threads are implemented in subclasses of the subscribing application thread in order to handle call-back requests.

If the communication thread determines that the call-back request includes a handle-recovery request (step 594), the communication thread can recover log entries missed while the logger object was disconnected (if applicable). Otherwise, if the call-back request includes a handle-buffer request (step 596), the communication thread can process entries contained in a received buffer. In some embodiments, processing entries contained in a received buffer includes queuing the buffer or entries to be handled by background tasks.

As shown in FIG. 15, the communication thread can inform the logger object that it can continue (step 598).

In some embodiments, each process in the system 11 is configured with an event logger object. The event logger object is used by the process to log events, such as communication failures, device status messages, auditing information etc. Each call to the event logger object can specify a level such as "ERROR," "WARNING," "INFO" or "DEBUG," and the event logger object can be configured to process only events with a level greater than or equal to a predetermined level, such as "WARNING." Event logger objects, however, can be modified by configuration or control in order to handle events with an "INFO" level and/or a "DEBUG" level. In some embodiments, an event logger object has a timer value which flushes buffers every few seconds.

The monitoring subsystem 18 can subscribe to event logger objects and, for each event received, can process rules in order to determine if any actions are required, such as which users to inform of the event.

In some embodiments, a database loader application may subscribe to the event logger object to capture events required for back office processing. Other applications may also subscribe directly to the event logger object. For example, an application 16 can subscribe to one or more processes in order to combine event logs from the one or more processes into a consolidated log file.

Subscriber applications can also use logs written by the monitoring subsystem 18 after applying rules in order to distill event information.

In some embodiments, logger objects capture transactions (i.e., context objects including data defining a transaction) being processed by the system 11 and can safely store transactions before replying to the transaction originator. Logger objects capturing transactional data ("context object logger objects") can be configured in a business transaction originating process and can have short buffer flush timer values. In some embodiments, database loaders subscribe to context object logger objects in order to update a main transaction database as a background task. In addition, the monitoring subsystem 18 can subscriber to context object logger objects in order to maintain statistics.

As described above, a context object can include data defining a transaction (hereinafter referred to as a "transaction"). A transaction can include request information and an indication of processing needed to respond to a request. For example, a transaction for a withdrawal from an ATM can include an indication of processing needed to receive a request for money from an ATM, to route the request to a FI associated with a card provided to the ATM, to receive an authorization from the FI, to authorize the ATM to dispense the money, to record a financial transaction for further processing, and to handle any errors that occur during processing. In some embodiments, once created, transactions last or are active for a few seconds, and except for recording transaction data for further processing at a later late or for logging purposes, can exist only within the memory of the computer system handling the transaction.

A context object can include a case. In comparison to a transaction, a case can include information needed to respond to a longer-term service request. In some embodiments, the longer-term requests can include manual processing and/or computer processing. For example, a case can include information needed to handle a dispute when someone receives less money than requested from a possibly malfunctioning ATM. The case can require documentation of the problem from the person asking for the adjustment, documentation of the problem from an FI managing the ATM, and/or documentation of the problem from an FI that issued the card provided to the ATM. In some embodiments, cases can take days or months to reach a resolution, and can require input from any number of people, system components, and systems while being processed.

In some embodiments, transactions and cases exist over different time periods, and can have different requirements. In both situations, however, a context object contains and manages access to information for an element of work processed by the system 11 (e.g., a case or a transaction).

If the system 11 encounters a problem while processing a transaction, the system 11 can generate a context object that includes a problem case. In some embodiments, the system 11 uses a problem management subsystem to generate a problem case. The context object including the problem case can be related to the context object including the transaction or the case that caused or generated the problem. The processing needed to complete the transaction or the case, therefore, can involve more than one context object.

As described above, some context objects exist in the system 11 for only a second or two, while other context objects can exist or are active in the system 11 for days or months. In some embodiments, context objects can be saved to log files or other disk storage at some point. Context objects can also be saved in persistent storage, such as disks. In some embodiments, storage mechanisms used to store context objects can use standard relational database management system ("RDBMS") technology to store the context objects in order to provide efficient searching and reporting. Individual context objects, however, can be reconstituted in an original context object form when opened or activated.

Figure 16:
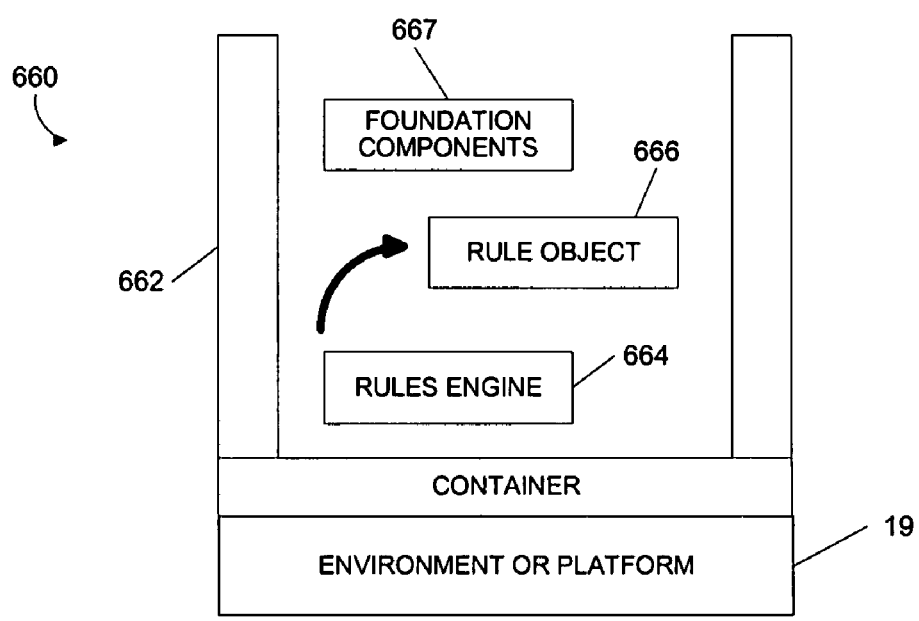
FIG. 16 schematically illustrates a processing module defined in the computer system architecture of FIG. 1.

As shown in FIG. 16, in order to process context objects, system components (e.g., the applications 16, the configuration subsystem 14, and the monitoring subsystem 18) can include one or more processing modules 660. Each processing module 660 can include a container 662. A container 662 can include a rules engine 664 that executes rules objects 666. The processing module 660 can also include foundation components 667. The foundation components 667 can include logic or application for initializing and executing the processing module 660. The foundation components 667 can include listeners or event handlers that intercept incoming data to a process device or system (i.e., the environment 19). In some embodiments, the foundation components 667 can include one or more communication facilities or interfaces that allow the processing module 660 to communicate or interact with other process modules 660, other system components, and/or other systems. For example, the foundation components 667 can include a common object request broker architecture ("CORBA") interface.

In some embodiments, the system 11 can include multiple processing modules 660 configured to execute rule objects 666 related to particular functions. For example, separate containers 662 or rules engines 664 can execute terminal management rule objects, transaction routing rule objects, transaction authorization rule objects, logging rule objects, and monitoring rule objects. In some embodiments, each container 662, regardless of the specific type or scope of the rule objects 666 it executes, can be configured to execute rules objects 666 using context objects as input. Each container 662 of the system 11, therefore, can have a similar structure, and the structure can be independent of the types of rule objects 666 that a container 662 executes.

In some embodiments, the processing module 660 performs a startup procedure. During a startup procedure, the processing module 660 can load a configuration extract, and, once configured with the configuration extract, the processing module 660 can wait for incoming messages. When an incoming message arrives, the processing module 660 creates a new context object (or uses a context object included in the incoming message) and passes the context object to the rules engine 664 for processing.

Figure 17:
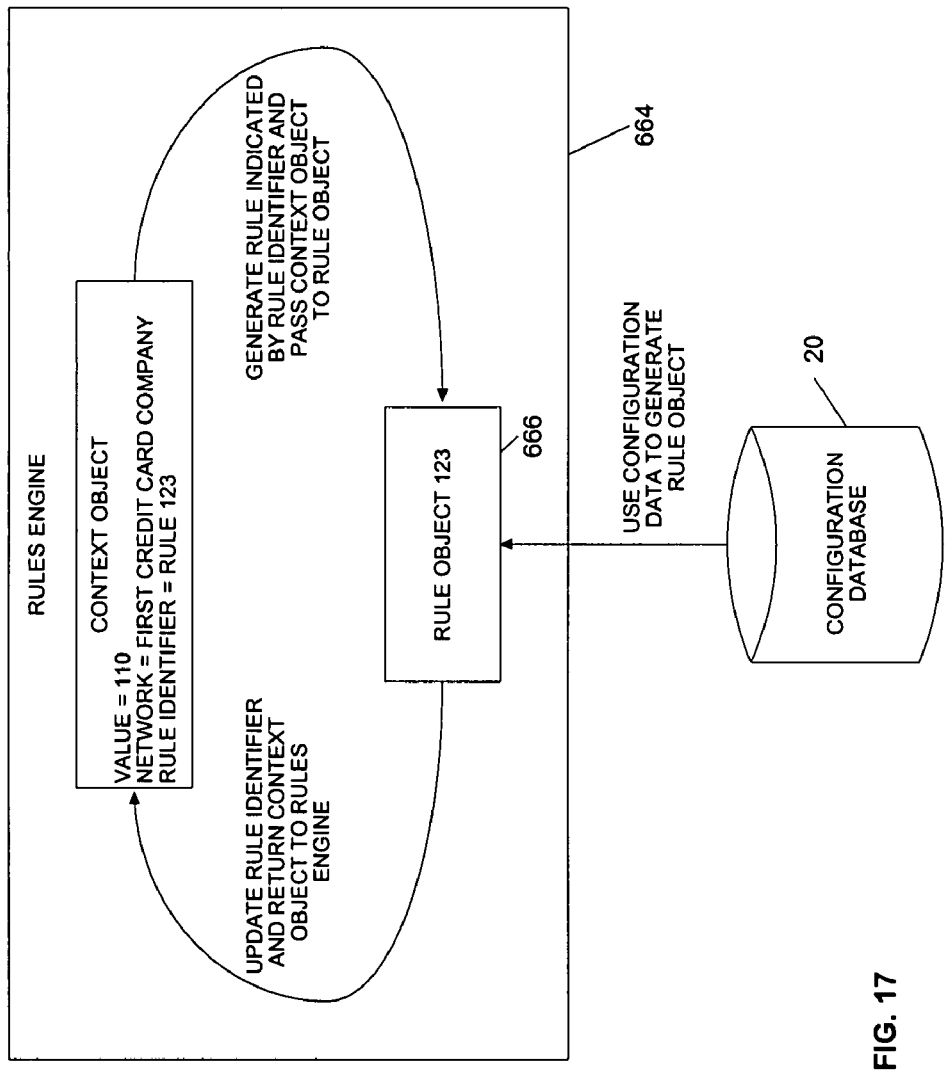
FIG. 17 illustrates a rules engine included in the processing module of FIG. 16.

As shown in FIG. 17, the rules engine 664 executes rule objects 666 in a loop. In some embodiments, the rules engine 664 starts by generating a first rule object 666 to execute based on data included in the context object. Once the rules engine 664 generates the first rule object 666, the rules engine 664 passes the context object to the first rule object 666 as input and the first rule object executes and performs the business functions or logic. The rule objects 666 executed with the rules engine 664 include the application logic, and, therefore, the act of executing a rule object causes the system 11 to execute logic contained within that rule object 666.

In some embodiments, while executing a rule object 666, a rule object 666 can wait for additional incoming data. Incoming data can include data from an external source or from another context object included in another part of the system 11. For external incoming data, rule objects 666 can create a context object including the incoming data. For internal incoming requests, the incoming data can already include a context object.

Each context object can include a rule identifier. The rule identifier can indicate a rule to execute. The rules engine 664 instantiates or generates a rule object 666 corresponding to the indicated rule and executes the rule object 666. Each executed rule object 666 modifies the rule identifier to indicate a next rule to execute. After a rule object 666 finishes executing, the context object is returned to the rules engine 664, which can generate another rule object 666 based on the rule identifier included in the returned context object. The rules engine 664 continues generating rule objects 666 until processing is complete. Processing can include passing a context object to other rule objects 666, other processing modules 660, or other components of the system 11 on the same computer as the rule object 666 or on another computer. In some embodiments, a rule object 666 can pass a context object to any component of the system 11 that can accept and process context objects.

To finish processing a context object, a rule object 666 can set the rule identifier of a context object to a predetermined termination value, such as "null." In some embodiments, when the rules engine 664 encounters a rule identifier set to a termination value, the rules engine 664 and/or the container 662 can return the context object to a caller (i.e., the system component or outside component that initially sent the incoming message). The rules engine 664 and/or the container 662 can also perform one or more post-processing functions, such as logging processing information. The processing module 660 can then wait for another incoming message.

Each rule can include one or more constraints or limits. Once instantiated as a rule object 666, the constraints or limits of the rule can be applied to data included in a context object or other requested data. Depending on the results of testing the constraint or limit, a rule object 666 can perform one or more actions. In some embodiments, the actions performed by a rule object 666 can include modifying data included in a context object. The actions can also include generating another context object (e.g., a context object including a case) or requesting additional data from another system, rule object, or context object. FIGS. 18a and 18b illustrate rules 675 according to one embodiment of the invention.

In some embodiments, network or switch managers can change constraints or limit values and/or actions defined in a particular rule without changing foundation code of the system 11. Over time, a set of rules can evolve into a network of interconnections where each rule knows what it is to do, but does not necessarily know how the system 11 got to its current condition.

Rule objects 666 can read and update data included in a context object in order to test a constraint or limit. For example, if one rule object ("Rule B") needs to know how a previous rule object ("Rule A") made a decision, Rule A can record decision information in the context object passed to Rule B. Rule B can then interrogate the decision information without having to duplicate any logic performed by Rule A. In this way, rules objects 666 can communicate indirectly. In some embodiments, context objects are the only source of information provided from one rule object 666 to another rule object 666.

Rule objects 666 can also retrieve information from the configuration subsystem 14. For example, many values that exception management rule objects use in their constraints can be stored in the configuration database 20. In addition, rule objects 666 can request information from components of the system 11. For example, a rule object 666 can request current threshold settings for various types of event processing from the monitoring subsystem 18.

Figure 19:
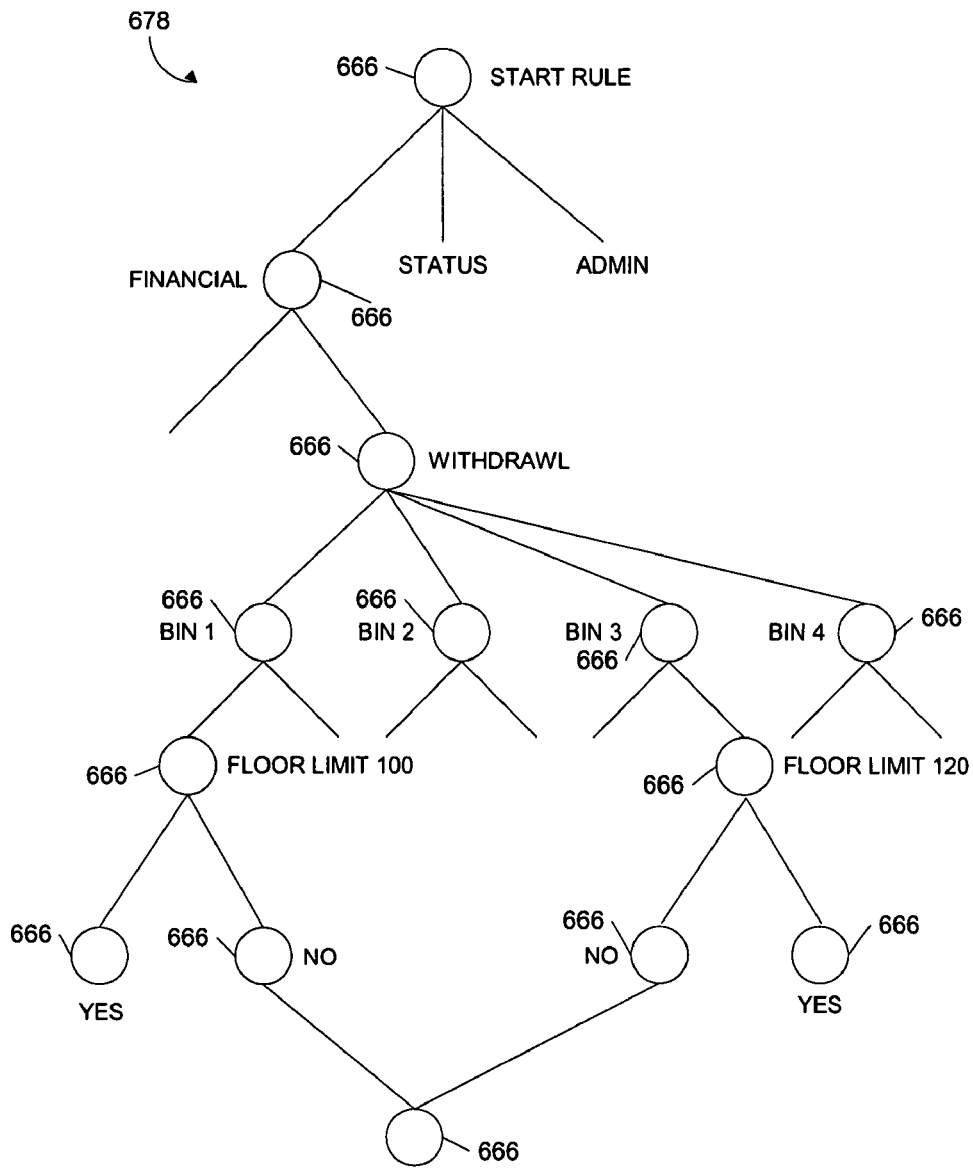
FIG. 19 schematically illustrates a chain of rules executed by the rules engine of FIG. 17 according to one embodiment of the invention.

After performing actions, a rule object 666 indicates what rule, if any, the rules engine 664 should execute next. As described above, a rule object can set a rule identifier included in a context object to an identifier of a next rule to execute, and the rules engine can generate a rule object corresponding to the indicated rule. As shown in FIG. 19, the rules engine 664 executes a first or start rule object 666 and continues to execute rule objects 666 (shown as circles in FIG. 19) as long a rule object 666 currently being executed indicates a next rule object 666 to process (next rule object 666 shown linked to a previous rule object 666 by a connecting line in FIG. 19). Similar to standard applications that execute subroutines or sub-functions, rule objects 666 can also generate their own instances of a rules engine 664 to activate nested rule loops.

If a currently executing rule object 666 does not indicate a next rule to process, the rules engine 664 has completed the requested processing and the processing module 660 can return the processed context object to a calling application or system component that sent the incoming message that initiated the processing. In some embodiments, the context object is returned to a rule object 666. The rule object 666 receiving the returned, processed context object can be part of another rules engine 664 included in the same container 662 as the rules engine 664 that processed the context object. The rule object 666 receiving the returned, processed context object can also be part of another rules engine included in another processing module 660. A processing module 660 can also generate another rules engine 664 to perform additional processing after a rules engine 664 completes processing a context object. The processing module 660 can also pass the context object to another processing module 660, container 662, application, or system component included in the system 11 or included in an external system.

As shown in FIG. 19, the processing performed on a context object can be represented as a chain or network of rule objects 670. The network of rule objects 670 can differ from one context object to another. As described above, a rule object 666 can also invoke nested processing by executing its own instance of a rules engine 664. In some embodiments, there is no limit to the maximum number of rule processing levels executing in the system 11 at any given time.

In some embodiments, the processing defined with a set of rule objects 666 can happen consecutively without interruption. The system 11 can also save a context object and can resume processing of the context object at a later date or time. In some embodiments, the system 11 can save context objects that are waiting on incoming data. The system 11 can also execute rule objects 666 to look through saved context objects to identify context objects that need attention and/or that are ready to resume processing. In some embodiments, rule objects 666 can include timeout conditions that can be compared against data included in stored context objects in order to determine whether a saved context object has timed-out or expired.

Figure 20:
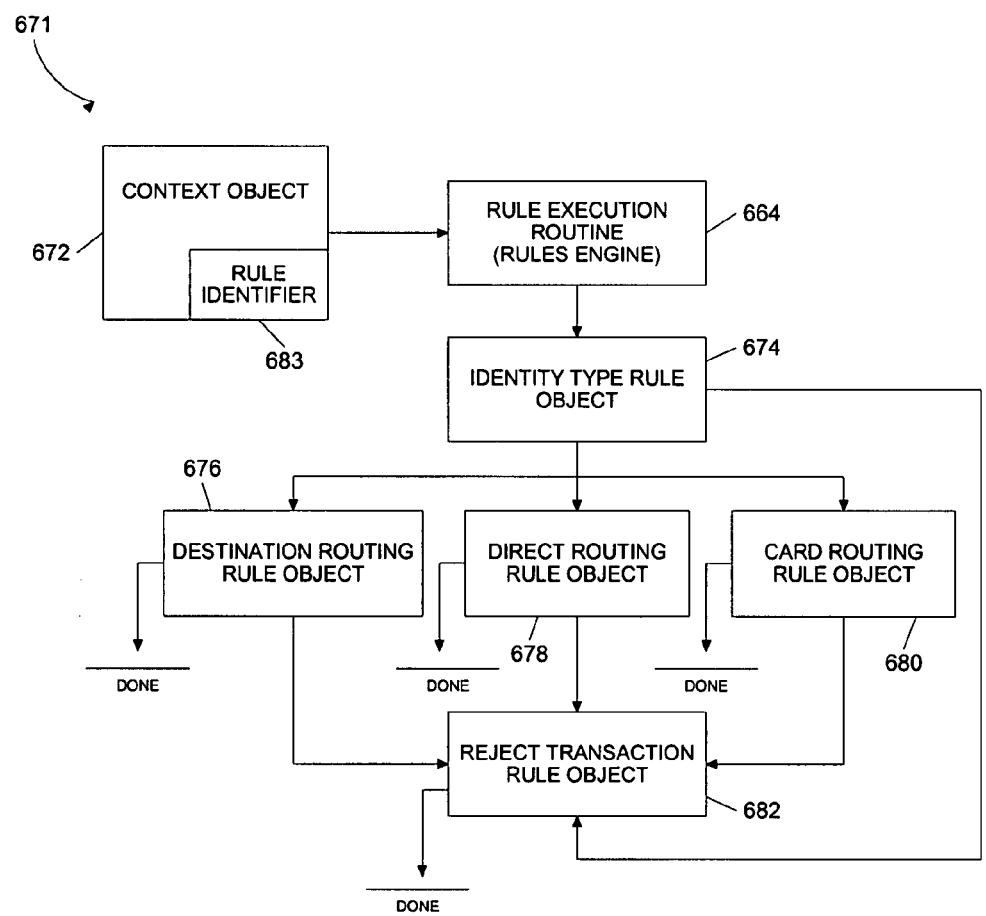
FIG. 20 illustrates a transaction routing routine performed by the rules engine of FIG. 17 according to one embodiment of the invention.

FIG. 20 illustrates a chain or network of rule object 671 used to route a context object or transaction 672 according to one embodiment of the invention. In some embodiments, the network of rule objects 671 can include multiple types of routing rules. For example, the network of rule objects 671 can include identify route rule objects 674, destination routing rule objects 676, direct routing type rule objects 678, card routing rule objects 680, and reject transaction rule objects 682. Identify route type rule objects 674 can look at the data included in the context object 672 and determine if the context object 672 should be routing using destination routing, direct routing, or card routing. Depending on the data included in the context object 672, identify route type rule objects 674 can pass control to an appropriate routing rule object. Identify route type rule objects 674 can also store an error message or an error identifier in the context object 672 and pass control of the context object 672 to a reject transaction rule object 682 if an error occurs while processing the context object 672.

Destination routing rule objects 676 can identify a destination routing identifier, can find an appropriate routing record, can verify that a personal access or account number ("PAN") has a proper length, and can update the context object 672 with a route to use. Destination routing rule objects 676 can also indicate that additional rule objects are not required to route the context object (i.e., by setting the rule identifier of the context object 672 to "null"). Destination routing rule objects 676 can also store an error message or an error identifier in the context object 672 and pass control of the context object 672 to a reject transaction rule object 682 if errors exist in the context object 672.

Direct routing rule objects 678 can identify a direct routing identifier, can find an appropriate routing record, can verify that a PAN has a proper length, and can update the context object with a route to use. Direct routing rule objects 678 can also indicate that additional rule objects are not required to route the context object 672. In some embodiments, direct routing rule objects 678 can also add an error message or an error identifier to the context object and can pass control of the context object to a reject transaction rule object 682 if an error exists in the context object 672.

Card routing rule objects 680 can find a card base record, can match network logos to a routing record, can check interchange values, and can check currency. Card routing rule objects 680 can also update the context object 672 with a route to use and an indication that additional rules are not required (i.e., processing is complete). In addition, card routing rule objects 680 can store an error message or an error identifier in the context object 672 and pass control of the context object 672 to a reject transaction rule object 682.

Reject transaction rule objects 682 can log an error based on an error message or error identifier stored in the context object 672. Reject transaction rule objects 682 can also mark the context object 672 as rejected, and can indicate that additional rules are not required (i.e., processing is complete) since an error occurred while processing the context object 672.

As shown in FIG. 20, the system 11 can pass the context object 672 (or a reference to the context object 672) representing a current transaction to the rules engine 664. The context object 672 can include a rule identifier 683 that indicates a rule to execute or apply. The rules engine 664 generates a rule object 666 corresponding to the value of the rule identifier 683 (an identify route type rule object 674 in the current example) and passes the context object 672 (or a reference thereto) to the generated identify route type rule object 674. Using the data included in the context object 672, the identity route type rule object 674 determines a next routing rule object to apply and sets the rule identifier 683 of the context object 672 to an identifier of the next routing rule. The identity route type rule object 674 can also store a "no route" error identifier in the context object 672 and set the rule identifier 683 of the context object 672 to an identifier of a reject transaction rule 682. After the identity route type rule object 674 execute, the rule object 674 returns control to the rules engine 664.

As shown in FIG. 20, the rules engine 664 continues to generate and execute a rule object 666 as identified by the rule identifier 683 after each rule object 666 completes execution. Each rule object 666 can modify, add, and/or delete information stored in the context object 672. For example, the destination routing rule objects 676, the card routing rule objects 678, and the card routing rule objects 680 can add routing information to the context object, and other rule objects 666 that receive the context object 678 can use the routing information to route the context object 672 accordingly. Each rule object 666 can also place a termination value, such as an empty or "null" value, into the rule identifier 683 of the context object. Setting the rule identifier value to a termination value can indicate that processing is complete.

If a rule object 666 encounters an error, a rule object can add an appropriate error message or error identifier to the context object 672 and can set the rule identifier 683 to an identifier of a reject rule object, such as a reject transaction rule object 682. The reject rule object can handle error conditions identified in the context object 672. In some embodiments, after handling any errors, a reject rule object can set the rule identifier 683 to a termination value in order to end the current processing.

In some embodiments, when the context object 672 is returned to the rules engine 664 with the rule identifier 683 set to a termination value, the rules engine 664 terminates. After the rules engine 664 terminates, the context object 672 is returned to the caller or instantiator of the routing routine. In some embodiments, the caller can include another rule object 666. For example, a rule object 666 (i.e., an obtain transaction routing rule object) can initialize and execute a rules engine 664 and the rules engine 664 can execute one or more rule objects 666 in order to obtain routing information.

Figure 21:
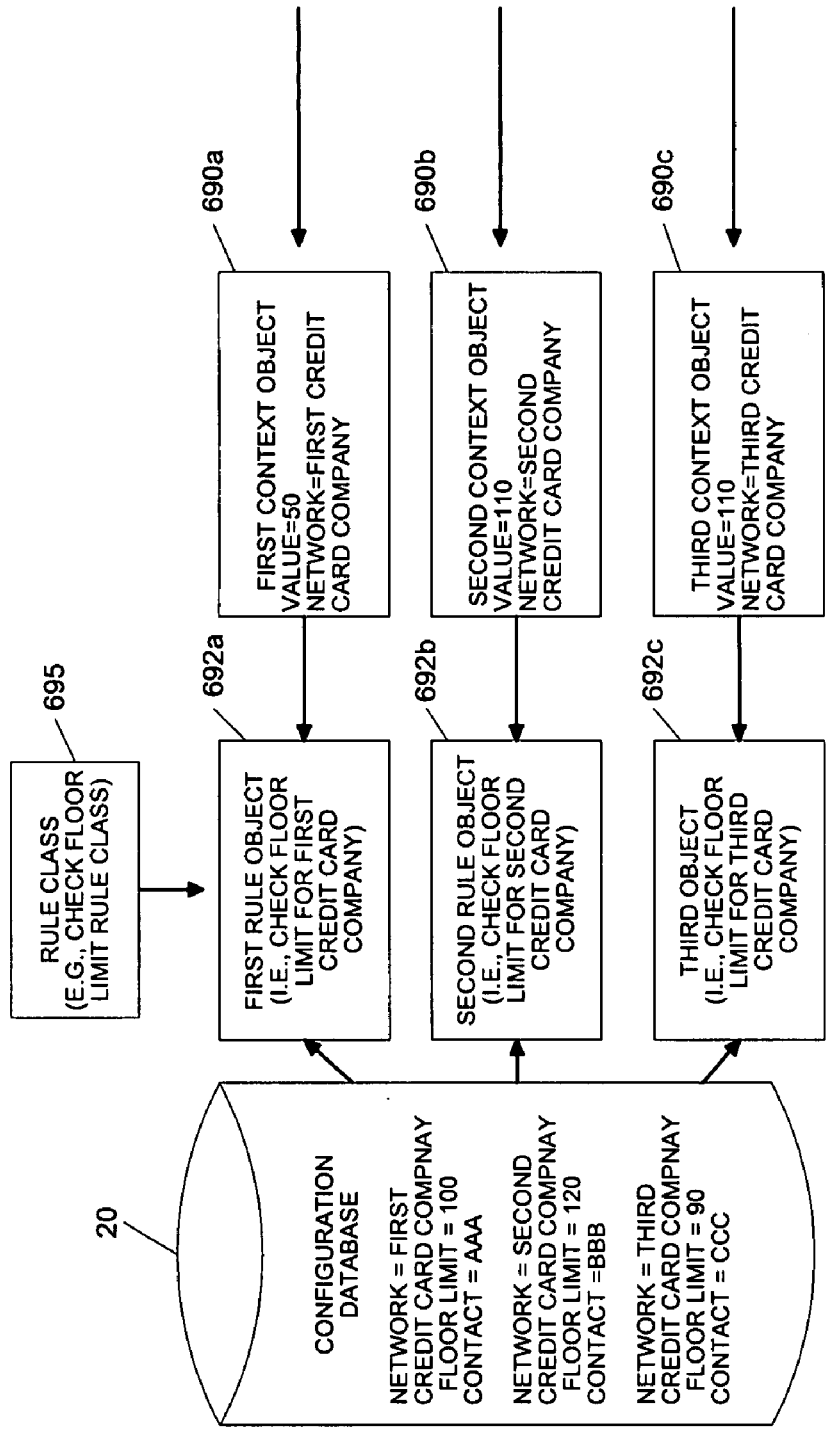
FIG. 21 illustrates a process of creating rule objects based on configuration data stored in the configuration subsystem of FIG. 2.

In some embodiments, rule objects 666 include data stored in the configuration database 20. As shown in FIG. 21, a rule object 666 can be generated (or include specify configuration data) based on data included in a context object. For example, as shown in FIG. 21, a first context object 690*a* can include data identifying a transaction associated with a first credit card company network, and the rules engine 664 can generate a first rule object 692*a* based on a rule definition or class 695 that includes values and conditions for checking a floor limit amount for transactions associated with the first credit card company. Similarly, if a second context object 690*b* specifies a second credit card company network different from the first credit card company network, the rules engine 664 can generate a second rule object 692*b* based on the same rule definition or class 695 that includes values and conditions for checking a floor limit amount for a transaction associated with the second credit card company. Therefore, to change the logic of the system 11 (e.g., add rules for a particular credit card company), system developers and system users can change the configuration data using the configuration subsystem 14 as described above. Using the configuration data, system developers and system users can also indirectly add new rules by adding configuration data for new types of rules that already exist in the system 11. For example, as described above, the system 11 includes a base "CheckFloorLimit" rule definition or class 695 and includes related configuration data for processing transactions associated with the first credit card company and a second credit card company. The system 11 can apply the configuration data to the base rule class 695 in order to generate a rule object 692*a* for transactions related to the first credit card company and a rule object 692*b* for transactions related to the second credit card company. To modify the system 11 to handle transactions from a third credit card company identified by a third context object 690*c*, system developers or system users can add configuration data for the third type of credit card company to the configuration database 20 using the configuration subsystem 14. The rules engine 664 can then apply the new configuration data related to the third credit card company to the base rule class 695 and generate a third rule object 692*c* to process the third context object 690*c*. Using the configuration data, rules objects are customized based on the data included in the context object being processed.

In addition to using rule objects 666 to process a transaction, the system 11 can use rule objects 666 to provide workflow assistance to help lead a system user through steps needed to perform a job. Workflow assistance can include providing work queues to help system users gather, prioritize, and manage work to be done. Work queue management can also allow authorized users to create and modify queues and to move work between queues. Work queue operators can process work requests on queues associated with an individual operator or by operator skill set. Workflow assistance can also include filtering operator options to display only valid actions for the current work request. For example, the interface used to select the next step and reason code for an exception management system ("EMS") case can show steps and codes that are valid for the current case being processed. The valid steps and codes can change from one work request to another work request.

Using the above workflow assistance and work request rules, the system 11 can automatically check aging conditions of work requests using rules. For example, the system can bring a specific unit of work to an operator's attention if a processing period is about to expire or has expired without the proper processing having been performed.

In some embodiments, workflow features use an identifying object, often called a "case," a "ticket", or a "job," to manage work requests. When a problem occurs, the system can create a ticket and can create a context object to hold the data associated with that ticket, including what happened and when. As described above, the system 11 can place an identifier of a first workflow rule to process, for example a "handle new problem" rule in this case, into the context object and can pass the work request, encapsulated as a context object, (or a reference thereto) to a rules engine. The rules engine can generate a rule object corresponding to the identified rule and can execute the rule object to process the context object. The rule objects can notify specific individuals about a problem, can attempt to solve a problem automatically, and/or can add information about a ticket to a work queue for a specific type of operator. If a rule object does not delete the ticket, the system 11 can store the context object in a database for additional use in the future. While in some, embodiments context objects including data defining transactions reside within the system memory for only a few seconds, context objects defining problems (and related rule objects) can be saved in a database file for days, weeks, or months as an active process.

If an operator works on a problem, the system 11 can update a ticket and any related stored data in order to indicate that work was performed. For instance, a user can add a comment to a ticket indicating that a service person has been called. Workflow rules can present the user with actions that are appropriate for a particular ticket at a particular time. Workflow rules can also validate that the actions performed by the system user were performed correctly.

The system 11 can keep track of pending tickets based on timeout values stored in context objects. The system 11 can set timers to expire if no action is taken by each timeout. When such a timer expires, the system can create a new context object with the original ticket data and can pass the new context object to a rules engine. In some embodiments, the new context object includes an indication of an initial rule identifier different from the initial rule identifier included in the first, timed-out context object. For example, the new context object can include an indication to an "initial timeout expiration" rule. The rule can attempt to escalate the problem, can notify additional people, and can place information about that escalation to the work queue of a problem supervisor.

The system can continue to track a ticket through any number of stages (usually called "states") with different deadlines depending on the severity and age of the problem as defined by the current workflow rules. In some embodiments, actions performed by a rule object or a system user can remove or modify an active status of a ticket.

At any given time, any number of tickets (including none) can be active in the system 11. In some embodiments, problem tickets can remain active for only a short time, and transaction exception cases can remain active for months. As long as the information about a case or a ticket remains on an active database file, the workflow systems can continue to manage them as defined by the workflow rules.

As described above, the system 11 can use rule objects 666 to process transactions flowing through the system 11 and/or workflow request surrounding the processing of short term or long term manual efforts. In some embodiments, rule objects 666 can also be used for tracing system activities. For example, system activities can change between development, problem identification, and normal productive use, and can be controlled system-wide through a set of tracing rules. System throughput can also vary as a changing volume of work is routed around equipment that is malfunctioning or heavily loaded. The process used to route work, within a single system component or between system components, can also be controlled by rules. The EMS can also use rules to ensure that the system 11 and system users follow rules published in a network's exception management procedure notebooks. In some embodiments, the EMS can use a different rule set for individual networks. Procedures can also change frequently, and rules can be updated frequently to keep up with the changes. Furthermore, cases created while previous rules were in effect must still use those previous rules, and the EMS can use multiple rule sets for each network with multiple effective dates (described below) so it can process each case correctly.

In some embodiments, system rules (e.g., transaction processing rules, workflow management rules, etc.) can be managed by a rules management subsystem or environment. Using the rules management subsystem, system developers and system users can establish rule sets. Separating rules into individual rule sets can make them easier to modify and control. Rules can differ by network, transaction type, or any number of different groupings. In some embodiments, process-specific rules allow system users to install a set of rules at a specific location, possibly on a single system component, while continuing to use existing rules in other components of the system 11. This can allow a limited execution of rules to be applied in a productive environment for final real-world validation prior to a full production installation.

A rules management subsystem can also provide rule status values (e.g., draft, stage, productive, and previous) that allows developers to create and test rules, roll rules into production, and roll rules back out of production as needed.

System developers and system users can use the rules management subsystem to set one or more effective dates for a rule. One effective date can control when a rule becomes effective and another effective date can control when a rule becomes obsolete (ceases to be effective) within the system. In some embodiments, effective dates can allow system users to roll-in rules before the system 11 can use them so operations can use low volume times to perform the roll-in process. In some embodiments, multiple rules can exist to perform similar functionality and each rule can have different effective dates that set the lifetime of the rule. In some embodiments, the system can choose an "active" rule to execute based on a date included in a context object being processed.

The rules management subsystem can also allow system developers and system users to establish override rules. A set of override rules can take precedence and can be processed or executed instead of another set of rules. Override rules can be used to add, modify, or eliminate features of an underlying or base rule set. Since override rules are established and stored as separate rules (rather than actually modifying the base rule set), system developers and system users can change the functionality of the system 11 without actually changing the base functionality of the system 11. In some embodiments, by establishing separate override rules, system updates only change the base functionality of the system 11 and system users do not have to retrofit their customizations back into the updated system 11 since the previously-established override rules still override the updated base rules.

Figure 22:
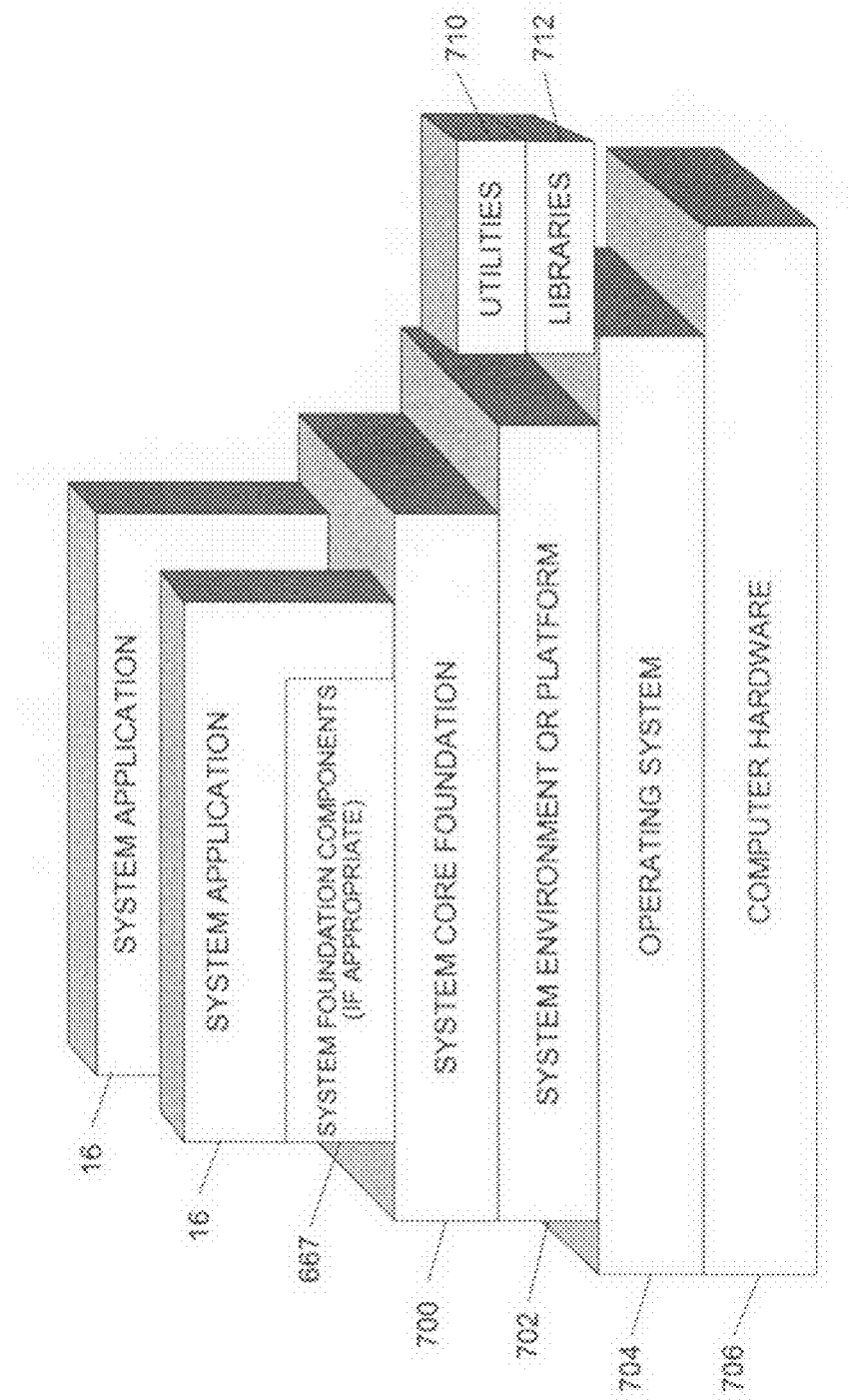
FIG. 22 schematically illustrates a structure of applications and subsystems embodying the computer system architecture of FIG. 1.

As shown in FIG. 22, system developers and system users can use the configuration subsystem 14 and the rules management subsystem described above to generate and run customized versions of system components (e.g., applications 16) by manipulating the rules and the related configuration data.

As shown in FIG. 22, the configuration subsystem 14 can be included in a system core foundation 700. The system core foundation 700 can provide system management, including startup, shutdown, and process restarting and security, which can include user authentication and authorization as well as component and communications security within the system 11. As described above, the system core foundation 700 can also provide the rules-based architecture used to control transaction processing, problem management, configuration, workflow assistance to users, etc. In addition, the system core foundation 700 can provide monitoring, configuration management, workflow management, reporting, logging, tracing, and auditing.

In some embodiments, the system can include subsystems that interact with each other and with the system core foundation 700 to perform functionality of the system 11. Subsystems built upon the system core foundation 700 can share similar technologies and architecture as the system core foundation 700, and, in some embodiments, depend upon the system core foundation 700 to provide foundation features, such as those listed above.

In some embodiments, the system core foundation 700, which establishes the structure of applications and system components included in the system 11, isolates application logic from the underlying operating system and computer hardware. In some embodiments, the system architecture can run on a variety of computer hardware and operating systems. The architecture can include a runtime environment 702 that interacts directly with an operating system 704 and computer hardware 706 to get the system 11 started and to restart processes that may fail. In some embodiments, the architecture supports core components of the system 11 (e.g., the monitoring subsystem 18 and the configuration subsystem 14) for a broad range of applications. The architecture can also support utilities 710 and libraries 712 of routines (e.g., configuration extract utilities 46 and additional time and date rules useable throughout the system 11) that support the core and application-unique components. In addition, the architecture can include application-unique components that provide specific application logic (e.g., a transaction routing subsystem).

Figure 23:
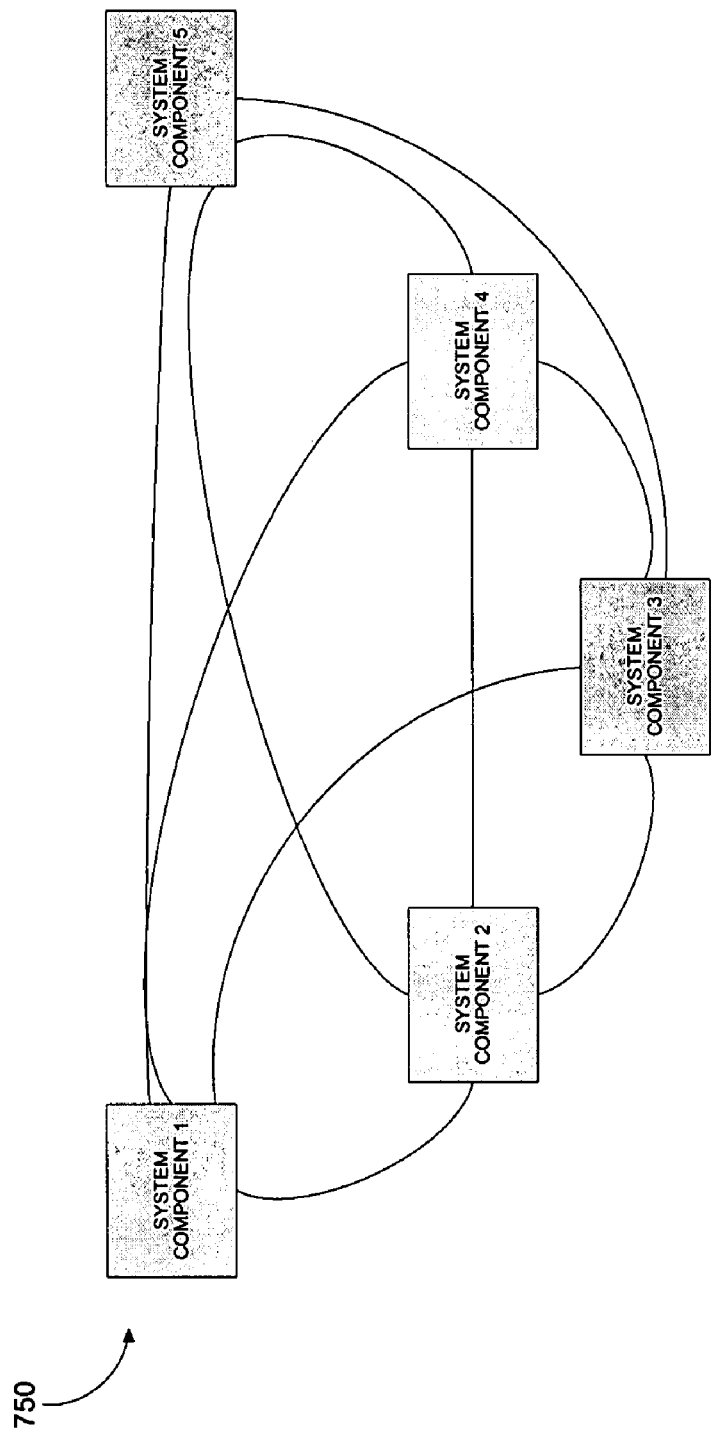
FIG. 23 illustrates an embodiment of the computer system architecture of FIG. 1 including heterogeneous system components.

The architecture can simplify the creation of new applications upon existing, well-tested foundation features, and can implement applications on a broad variety of computer systems. In some embodiments, the system core foundation 700 can provide a mechanism to support the system using various types of computer hardware. As shown in FIG. 23, since the system core foundation 700 supports various types of computer hardware, the system 11 can be run on a heterogeneous combination of computers and computer systems 750. In some embodiments, the system 11 can also work with a broad range of operating environments. To support multiple computer types and operating systems, the system 11 can execute on commonly used open system environments such as IBM z-series computers running Linux, IBM p-series computers running AIX/Linux, HP Non-Stop computer running OSS, HP Integrity computers running Linux/HP-UX, Sun computers running Solaris, and Intel server computers running Windows Server 68003.

To enhance portability between different types of computers, the system core foundation 700, the applications 16, the configuration subsystem 14, and/or the monitoring subsystem 18 can be written in a common or standard transportable language. For example, the system core foundation 700 and the applications 16 can be written in Java and/or C++. The system 11 can also use industry standard protocols, data formats and facilities such as Java, C++, JavaScript, Java 2 Enterprise Edition ("J2EE"), extensible markup language ("XML"), hypertext transfer protocol ("HTTP"), web services, Java Management Extensions ("JMX"), Java Database Connectivity ("JDBC"), etc, to further increase portability.

Figure 24:
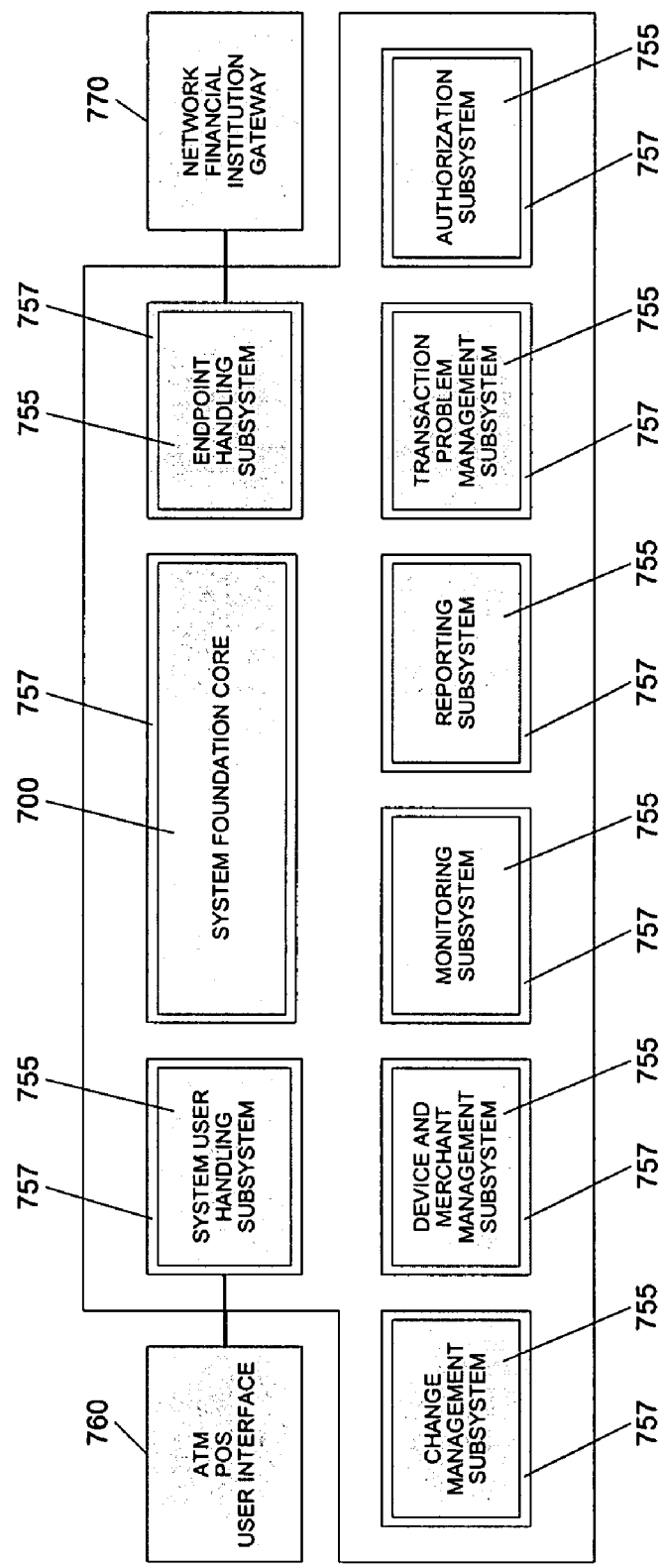
FIG. 24 schematically illustrates subsystems and a communication facility included in an embodiment of the computer system architecture of FIG. 1.

As shown in FIG. 24, the architecture of the system 11 can include multiple subsystems 755 that interact and communicate using a common communication facility 757. In some embodiments, the system 11 can run as many instances of each subsystem 755 as needed. The system 11 can also run one or more instances of a subsystem 755 on any computer or computer system (i.e., a node) included in the system 11. As described above with respect to FIG. 22, the system core foundation 700 and the runtime environment 702 can provide a common framework for establishing multiple applications 16.

In some embodiments, the common communication facility 757 is based on Java's standard communication components, such as CORBA. The communication facility 757 can allow subsystems 755 to communicate and pass context objects. In some embodiments, the common communication facility 757 includes a set of standard interfaces that allows the subsystems 755 to communicate with each other regardless of the inner structure, language, or other details of the internal subsystem or application components. In some embodiments, each subsystem 755 is considered a strong independent unit, which is loosely coupled to the rest of the system 11 through the common communication facility 757.

To facilitate communication, each subsystem 755 shown in FIG. 24, including the system foundation core 700, is wrapped in a common communication interface using the communication facility 757 to standardize communication between the subsystems. As also shown in FIG. 24, the subsystems 755 can communicate with customer touch points 760 and routing ending points 770 that are external to the system 11, such as ATMs and financial institution networks.

In some embodiments, the system 11 can include specialized third party hardware and software products, such as hardware security modules ("HSMs") and database management systems ("DBMSs"). The system 11 can wrap third party products in an abstraction layer that isolates the rest of the system from third party products. Using abstraction layers can allow third party products to change without requiring additional changes through the rest of the system 11. For example, a database abstraction layer can support several commercial relational DBMS products, and can handle the conversions between the relational structure of the underlying DBMS and the object oriented structure of the system 11.

As shown in FIGS. 23 and 24, the system 11 can include multiple subsystems 755. Furthermore, the system 11 can include multiple hardware components, and, in some embodiments, can interact with external systems. In some embodiments, in order to provide a single system view to system users such that a system user is unaware of the environment and/or structure of the system 11, the system 11 can use standard simple network managing protocols ("SN-MPs") to monitor and control the multiple subsystem and hardware components it includes as well as external systems added to or interacting with the system 11. For example, the system 11 can be combined with legacy or existing electronic funds transfer systems and both systems can be monitored and controlled seamlessly without a system user knowing which systems are included or interacting with the system 11 and/or which particular systems are processing work requests and/or transactions. The single system view can ease the migration from existing systems by allowing users to run both new and existing components as if they were a single system while individual components migrate from the-older systems to the current system 11.

In some embodiments, the system provides 11 an object-oriented configuration subsystem capable of providing separate interfaces to users filling different roles for the objects they work with. For example, business users can fill in the business values for a new ATM object managed by the system 11, while technical users fill in separate technical values for the same device object. To accomplish this, the configuration subsystem 14 can allow system users to define data element responsibility by a system user type.

When a system user modifies configuration data, the system 11 can provide the ability to introduce configuration changes non-disruptively, the ability to audit and report on all changes, and the ability to back out configuration changes to the previous run state if a run-time problem occurs. The system can also "stage" configuration data updates within the system so that updates can be made effective automatically at a specific date and time without any manual intervention. The system can also update one computer in a multi-node system with a configuration update for production verification before updating all nodes in the system. Some configuration changes made by system users need to be immediate (e.g., the real-time addition of a point-of-sale ("POS") device), and, therefore, are done non-disruptively.

Workflow features can also allow system users to add change requests to the system to add, change, or delete configuration data, and to track the execution of work for each appropriate role (e.g. technical and business data management). For example, the system 11 can provide different forms for technical specialists to define the technical description of items, such as external terminals, than forms for business specialists to define the business descriptions of the same terminals. Late or missing completion of such work can be detected and escalated for configuration managers as needed.

In some embodiments, the configuration subsystem 14 is itself configurable. The configuration subsystem 14 can execute a set of rule objects as described above to provide and manage configuration data. System users can configure the configuration subsystem 14 by controlling the rules and configuration data as described above.

In some embodiments, the system 11 provides browser-based user interfaces so that system users with an acceptable web browser, such as a standard extensible markup language ("XML") enabled web browser, can access features of the system, which are allowed by the system user's security profiles, from any location that provides connectivity to the system 11. The system 11 can also include some non-browser interfaces for performance reasons. The system can allow system users to distribute functions that are often performed at a central site to system users and remote users through the browser-based interfaces. For example, a switch manager can delegate user security administration to the local level by defining local security managers. Client organizations can also manage their own configuration data through a browser-based user interface.

Browsers, such as Microsoft's Internet Explorer and Mozilla's Firefox, provide the ability to manage extensible markup language ("XML") documents and manipulate XML data within an XML document object model ("DOM"). Information expressed using XML is called a "XML Document," and is organized into a hierarchy of objects called a XML DOM. Software tools exits that allow information to be added to an existing XML DOM, extract information from an existing XML DOM, and manipulate data stored within an XML DOM.

Browsers also process JavaScript instructions. JavaScript is a programming language run on a browser to manipulate an XML DOM and/or to modify an HTML document as a user works with the browser.

Browsers also process extensible stylesheet language transformations ("XSLT") directly on the browser as built-in features. XSLT facilities transform information from one format (or language syntax) to another format. For example, XSLT facilities can combine data stored as XML with a HTML page or form or an extensible HTML ("XHTML") page or form in order to provide a page or form to display the data. XSLT facilities produce HTML fragment which is spliced into an HTML page or form for display.

Figure 25:
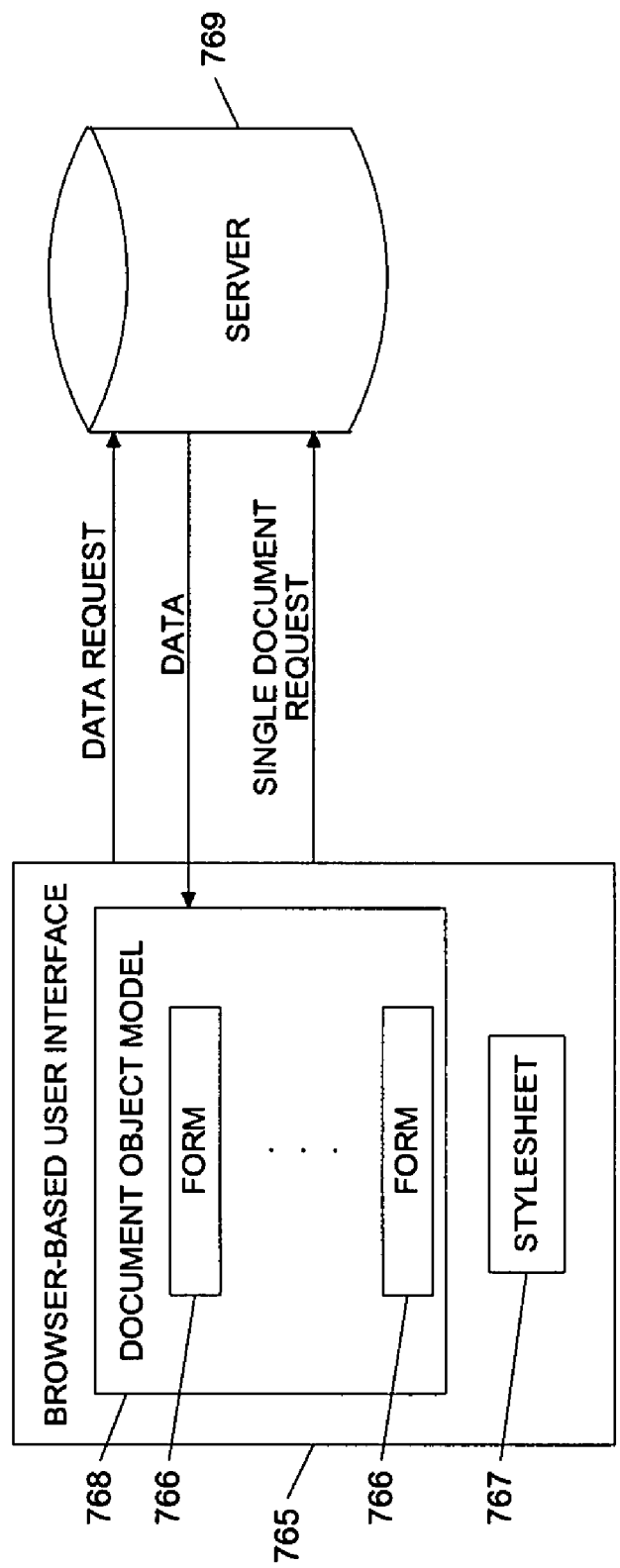
FIG. 25 illustrates functionality of a browser-based user interface according to one embodiment of the invention.

FIG. 25 illustrates functionality of a browser-based user interface 765 of the system 11 according to one embodiment of the invention. The browser-based user interface 765 provided to system users (e.g., for providing and updating configuration data) displays one or more "forms" or pages 766 of information. In some embodiments, the browser-based user interface 765 displays XML forms. The browser-based user interface 765 can format forms 766 with an associated style sheet 767, such as a XSLT, that reformats forms 766 into a browser-displayable language, such as hypertext markup language ("HTML"). In some embodiments, the browser-based user interface 765 user uses supporting data such as language dependent text, configuration dependent option lists, etc. to format forms. The browser-based user interface 765 can hold forms in a form repository 768 such as an XML DOM. Only data not held in the form repository 768 (or defined as dynamic) is requested from a server or browser cache that provides the forms. The browser-based user interface 765 maintains configuration data in a single form repository 768, which is loaded with the browser-based user interface 765 the first time it is needed. The form repository 768 includes multiple browser forms.

For example, the browser-based user interface 765 requests XML data (from the server 769) it needs to display each form 766 and stores the XML data in the XML DOM 768. Once the form 766 is loaded with the browser-based user interface 765, the browser-based user interface 765 uses the appropriate XML form 766 definition included in the XML DOM 768, and the XML data (received from the server 769), and the XSLT 767 associated with the form 766 to create a form 766 to be displayed with the browser to a system user.

Once data entered into a form 766 has been validated using a first data validation level, as described above, the browser-based user interface 765 sends a request, containing data entered by a system user, to the server 769. In some embodiments, the request is sent as a single "document," such as an XML document, rather than the standard individual data elements normally used to return separate data elements. The server 769 generates a reply, and the browser-based user interface 765 processes the reply in order to display a next form 766.

In some embodiments, the browser-based user interface 765 includes XML and/or XSLT representations of common HTML display controls, such as lists and grids. The browser-based user interface 765 can provide the ability to process data within these representations or controls through the use of JavaScript. Using these display controls, a system user can scroll through data, resort data, and reorganize data directly on the browser without requesting additional data or processing from a web server. The XML and/or XSLT representation of common HTML display controls and dynamic HTML ("DHTML") facilities stored in a single XML DOM 768 can provide a fast and rich browser-based user interface 765 to a system user. DHTML facilities can provide HTML manipulation with JavaScript to provide an active and programmable browser-based user interface 765.

When displaying a form 766, the browser-based user interface 765 can respond to events according to configuration rules in order to produce popup menus, new forms, drag and drop functionality, service requests, and other actions.

As described above, the browser-based user interface 765 uses XML to store multiple forms 766 within a browser XML DOM 768 and populates the forms with data from a server 769 without having to retransmit formatting and display information each time the browser displays a form 766. In some embodiments, the browser-based user interface 765 provides common XML-based display controls within the forms in the XML DOM 768 that use XML and DHTML in a XML DOM-based environment. In summary, the browser-based user interface 765 only needs to exchange data with a server 769 and handles data display requirements directly once the XML DOM 768 is loaded in the browser with the required form 766 definitions.

In some embodiments, user interfaces displayed with the system 11 are internationalized to include the use of local languages, icons, and colors. User interfaces can also support both left-to-right and right-to-left languages with double-byte character sets capable of displaying Asian, Arabic, Hebrew, and other non-Latin languages. In addition to providing standard browser interfaces, the system browser-based interfaces can also be capable of handling drag and drop element manipulation, interactive graphs and charts, and true graphical displays.

As described above, system users can also define many details of the configuration subsystem 14, including the user interfaces, by manipulating metadata that describes the contents of each page without having to develop and install new page layouts.

Figure 26:
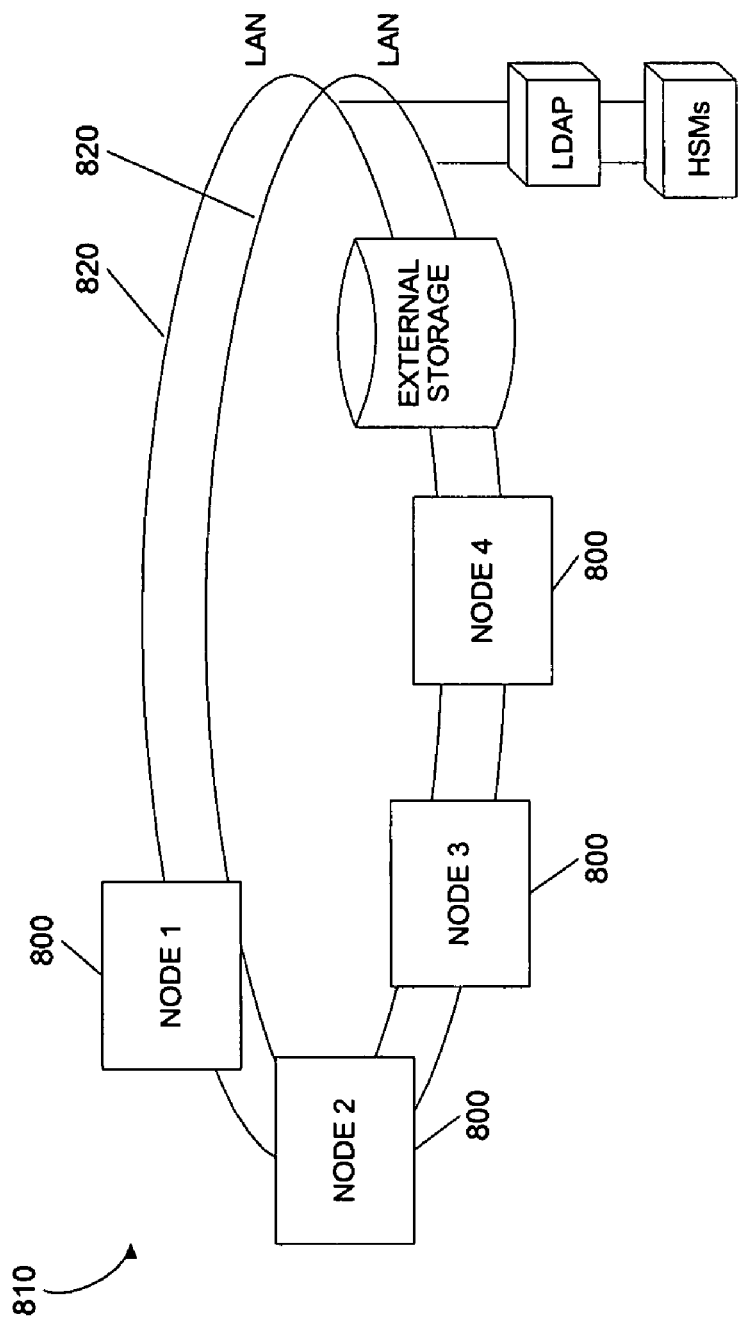
FIG. 26 illustrates an embodiment of the computer system architecture of FIG. 1 including a multiple node cluster and secondary communication links.

In some embodiments, the system 11 is designed to run on one or more clusters of various types of computers, including heterogeneous clusters made up of different types of computers running different operating systems. Each individual computer is called a "node." Multiple clusters can run simultaneously at multiple locations to provide mutual backup options for a single system. As shown in FIG. 26, nodes 800 within a cluster 810 can communicate through multiple independent networks 820, such as local area networks ("LANs") so that the failure of one network does not disrupt the operation of the cluster 810.

In some embodiments, the entire system 11 is configured on each node 800 in a cluster 810. Some embodiments of the system 11 can also dedicate specific system functions to specific nodes 800 included in a cluster 810. Executing the system 11 on a cluster 810 of several interconnected nodes 800 can allow the system 11 to accomplish several critical performance and reliability requirements. For example, utilizing multiple nodes 800 can provide load-balancing routines that can improve overall performance by routing incoming traffic to the least busy node 800. System users can also temporarily expand a system's capacity to handle peak loads by configuring new nodes 800, normally used for other purposes, to be part of the system 11. Likewise, system users can remove nodes from or add nodes to a running system 11 without interrupting the running application to perform upgrades or to reconfigure the system 11 for changing requirements. In some embodiments, a cluster 810 can automatically route all incoming traffic away from a failing (or failed) node 800 allowing the system 11 to continue processing while someone fixes and/or replaces the failed node 800. In addition, the use of multiple nodes 800 allows the system 11 to perform continuously at a high level of performance regardless of needs to handle hardware failures, system upgrades, and software updates.

An alternate strategy to a multi-nodal structure is to use a single node with fault-tolerant computer systems, such as the HP Non-Stop or Stratus ftServer computers, that provide internal redundant components and software recovery facilities to provide the reliability and continuous availability that the system is designed to utilize.

As illustrated and described above with respect to FIG. 27, each node 800 can execute a number of processes. In some embodiments, each subsystem can include a virtual machine, such as a Java Virtual Machine, to execute multiple processes. A virtual machine can appear as a single process to a node's operating system, but can run various processes simultaneously. Individual processes that could become a single point of failure for a node 800 can be duplicated on that node 800 to ensure throughput.

A "node agent" 850 is a process executed by a node 800 that listens for input from within or from outside the node 800. The node agent 850 can start processes within the node 800. In some embodiments, an operating system of a node 800 starts one or more node agents 850 as standard processes when the node 800 is started or booted up. The node agents 850 can remain running as long as the node 800 remains running. Node agents 850 for a single node can be "separated" as much as possible to ensure availability of a node 800. For example, node agents 850 can be connected to separate network segments and/or can be running on different processing units. Once started, an operating system of a node 800 monitors each node agent 850, and restarts a node agent 850 if it fails. In some embodiments, using two node agents 850 ensures that at least one node agent 850 is available when needed. Since node agents 850 can be started when a node 800 is started, node agents 850 can allow a cluster 810 of nodes 800 to automatically start required system processes on a new node 800 that joins the cluster 810 when the cluster 810 is initially started or after the cluster 810 has started.

In some embodiments, in order to communicate with other nodes, an operating system of a node starts a communication facility as a standard process when the node is started. The communication facility remains running as long as the node 800 remains running. Once started, the operating system monitors the communication facility and restarts the communication facility if it fails.

Figure 27:
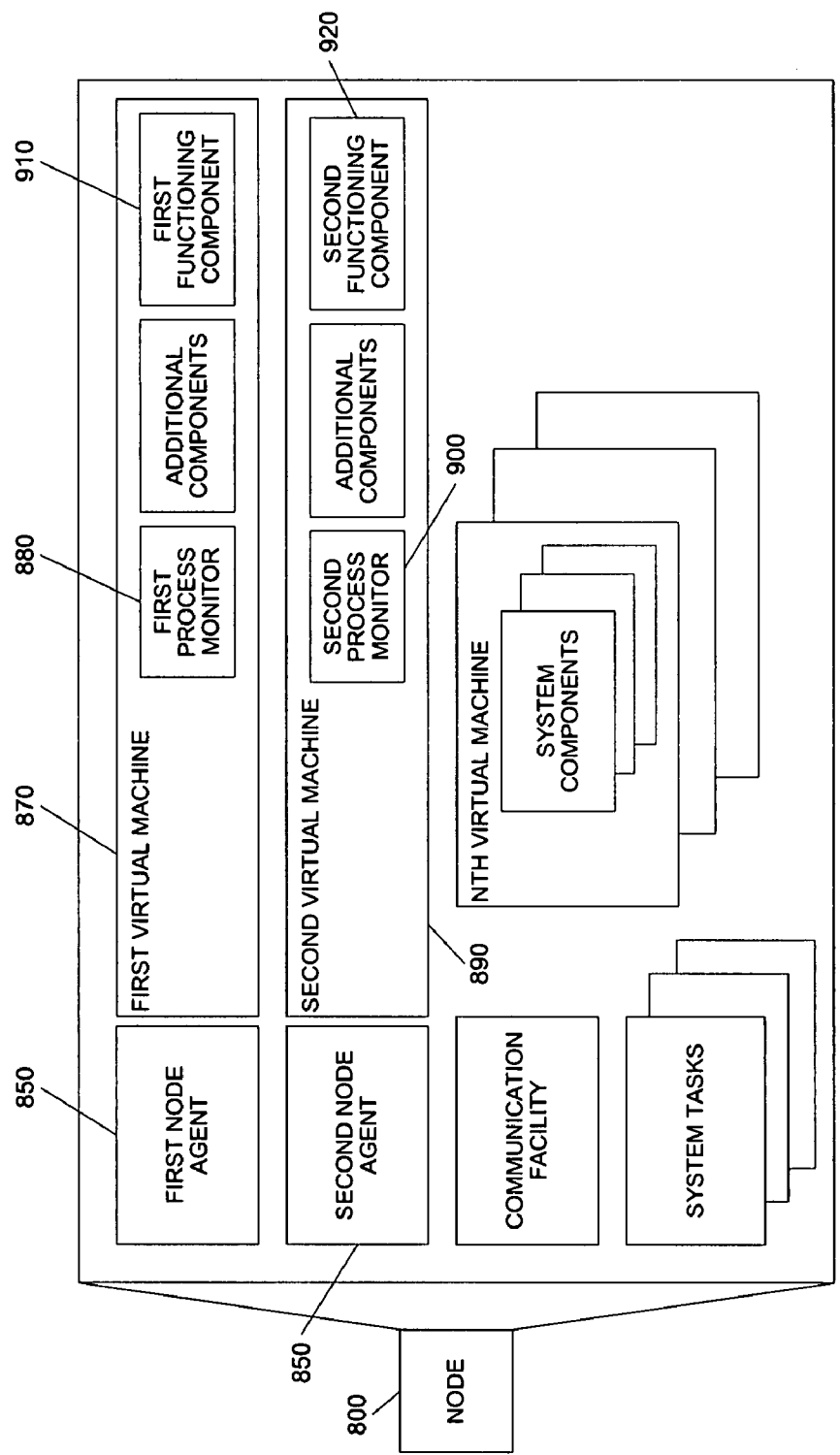
FIG. 27 illustrates processes executed by a node included in an embodiment of the computer system architecture of FIG. 1.

As shown in FIG. 27, an operating system of a node 800 starts a first virtual machine ("VM #1") 870 as a standard process when the node 800 is started. The first virtual machine 870 remains running as long as the node 800 remains running and can be configured to start a first process monitor ("PM #1") 880, which is responsible for reading the configuration data for a node 800 and for starting additional processes on a node 800.

The first process monitor starts a second virtual machine ("VM #2") 890, which starts a second process monitor ("PM #2") 900. The first virtual machine 870 uses the first process monitor 880 to monitor the second virtual machine 870, and the second virtual machine 900 uses the second process monitor 900 to monitor the first virtual machine. In this way, the first virtual machine 870 and the second virtual machine 890 ensure that at least one virtual machine is available when needed and can be present to start the other virtual machine if it fails.

To monitor each virtual machine and process monitor, the first process monitor 880 and the second process monitor 900 can start a "functioning" process 910 and 920 within the first virtual machine 870 and the second virtual machine 890, respectively, in order to indicate to the system 11 that a process monitor and a virtual machine is functioning. The first process monitor 880 watches the functioning process 920 started in the second virtual machine 890, and the second process monitor 900 watches the functioning process 910 started in the first virtual machine 870 in order to make sure a virtual machine is available to start processes. In some embodiments, the first process monitor 880 and/or the second process monitor 900 monitor statuses of other virtual machines on other nodes.

The first process monitor 880 and/or the second process monitor 900 can use configuration data for their node to start additional processes in a node 800. In some embodiments, the first process monitor 880 and/or the second process monitor 900 are also configured to start additional processes in other nodes.

The first process monitor 880 and/or the second process monitor 900 can load a licensing subsystem. Each additional subsystem or process started with one of the process monitors 880 and 900 checks the validity of its own configuration data, and verifies with the licensing subsystem that authorization exists to run a subsystem or process. Any subsystem or process requiring configuration data or rules that are not licensed can be restricted from being started.

Figure 28:
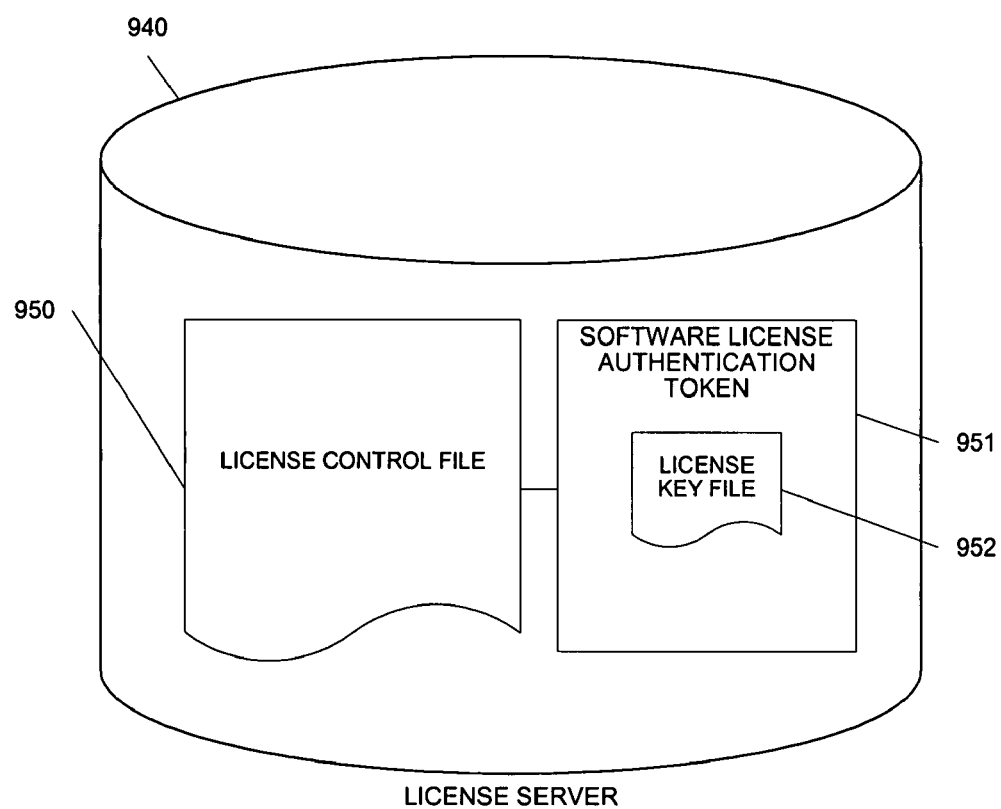
FIG. 28 illustrates a license control file and a license key file according to one embodiment of the invention.
Figure 28E:
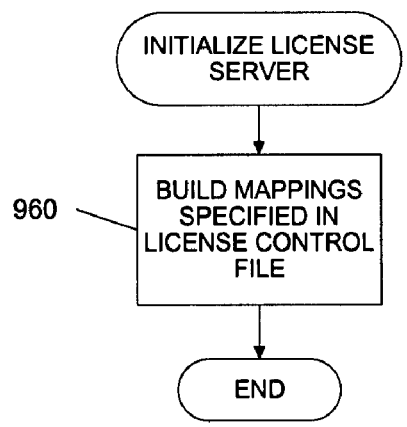
Figure 28F:
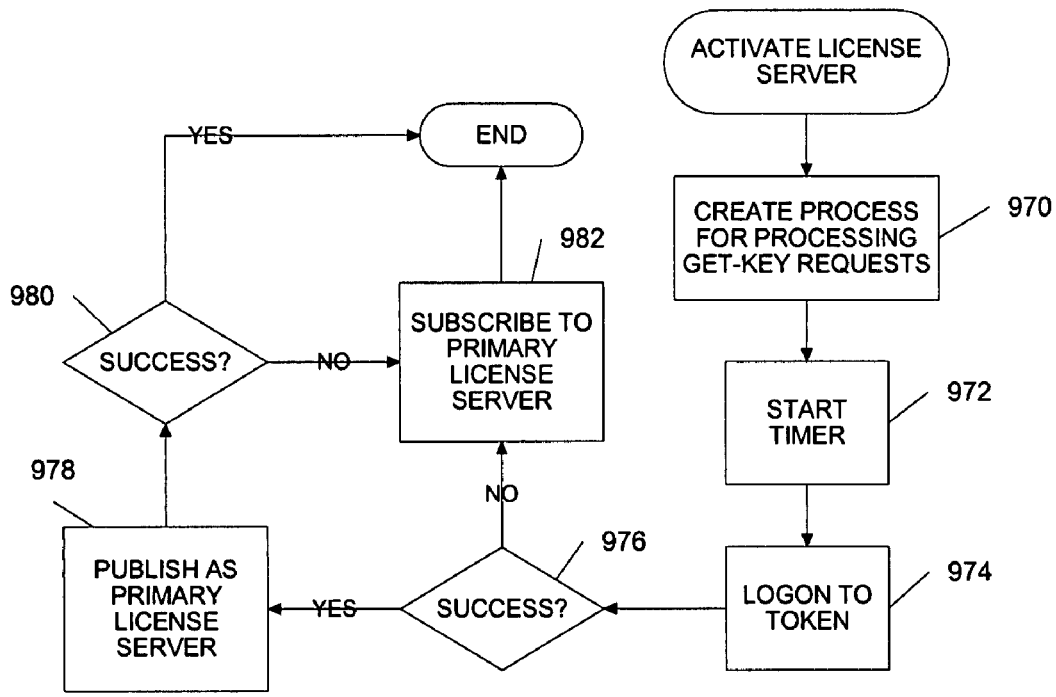
Figure 28G:
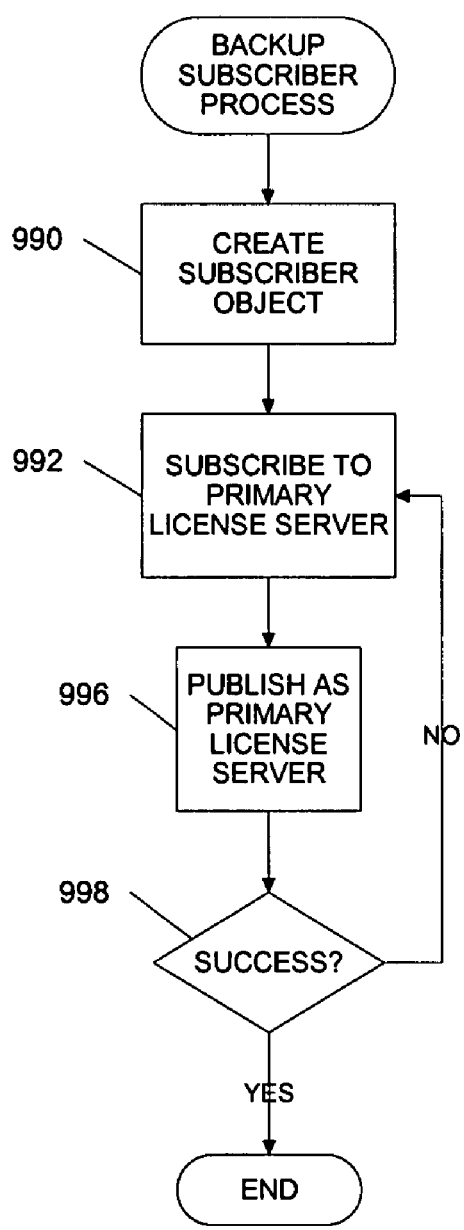
Figure 28H:
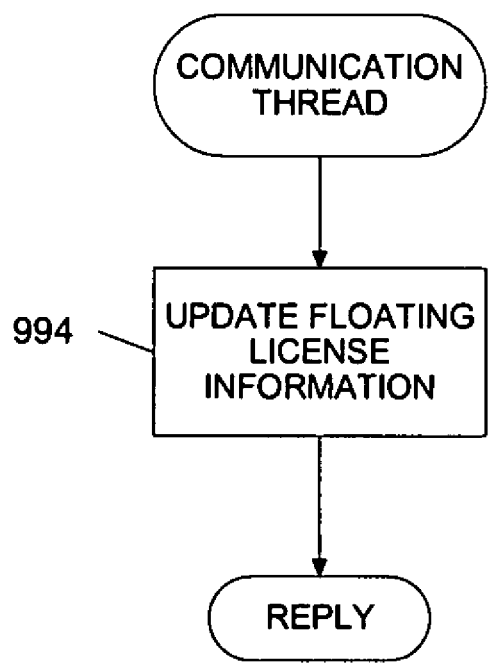
Figure 28I:
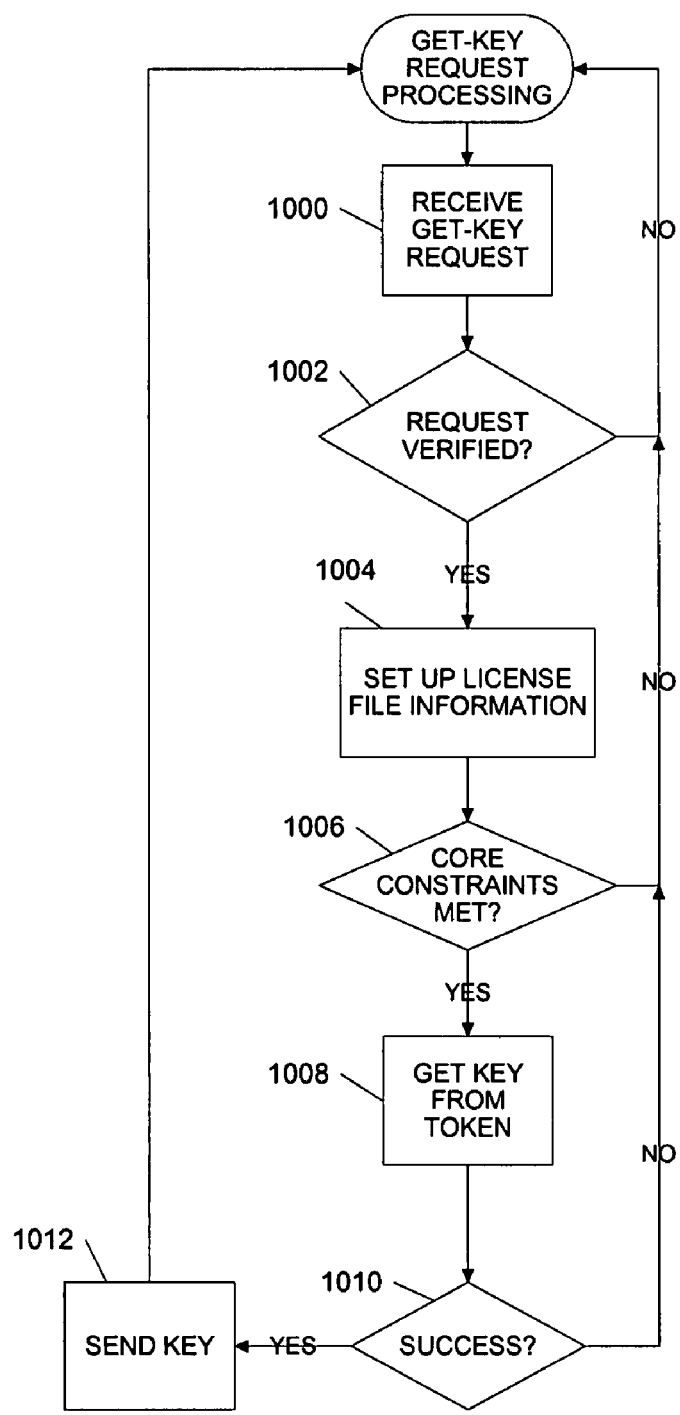
Figure 28J:
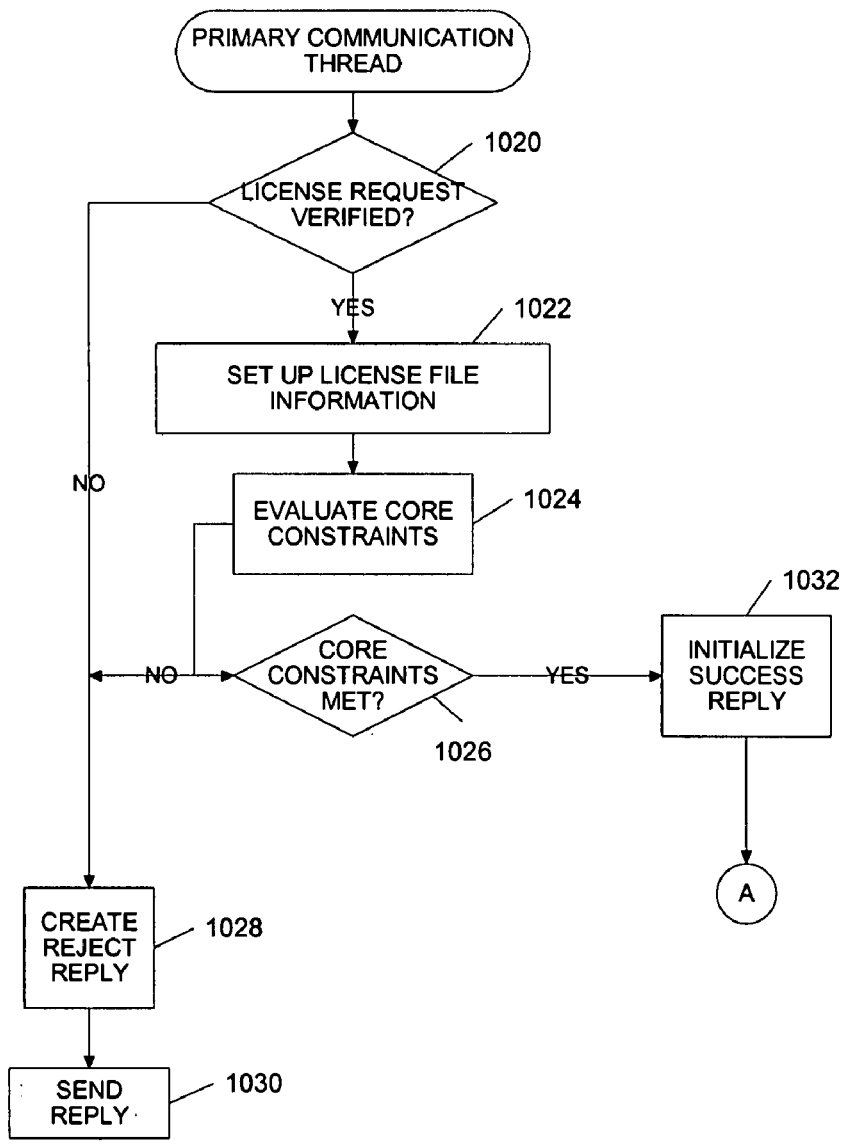
Figure 28K:
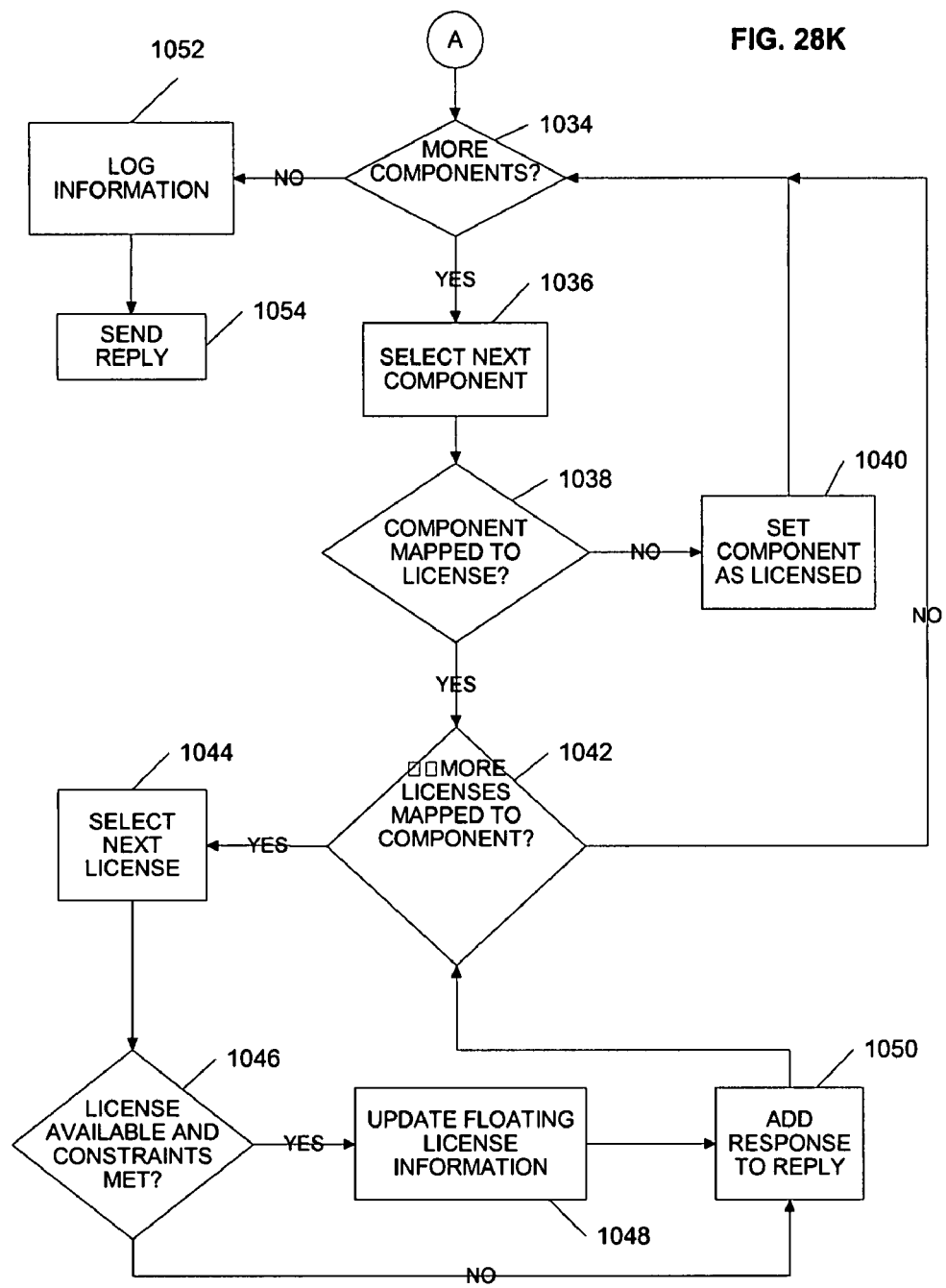
Figure 28L:
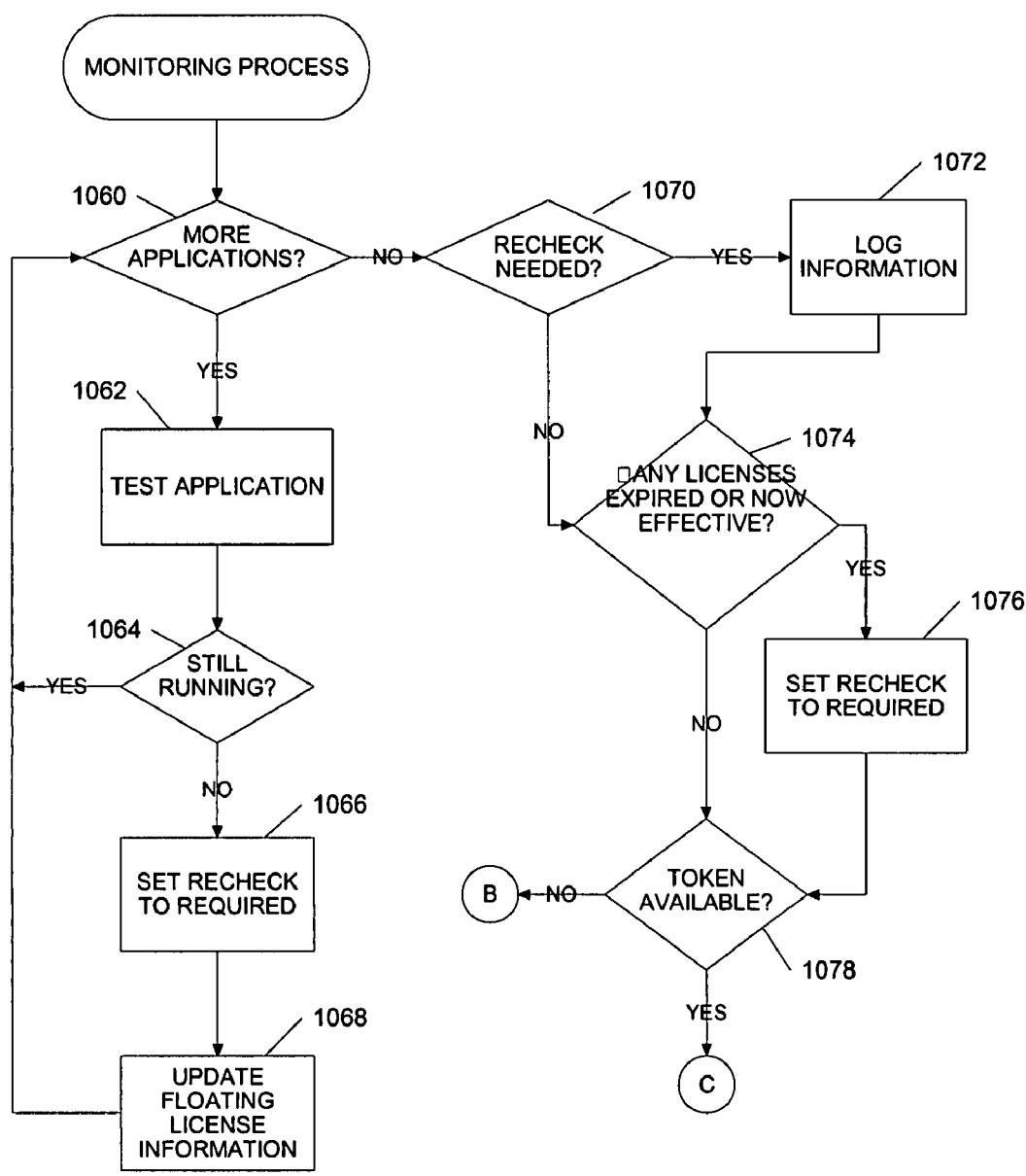
Figure 28M:
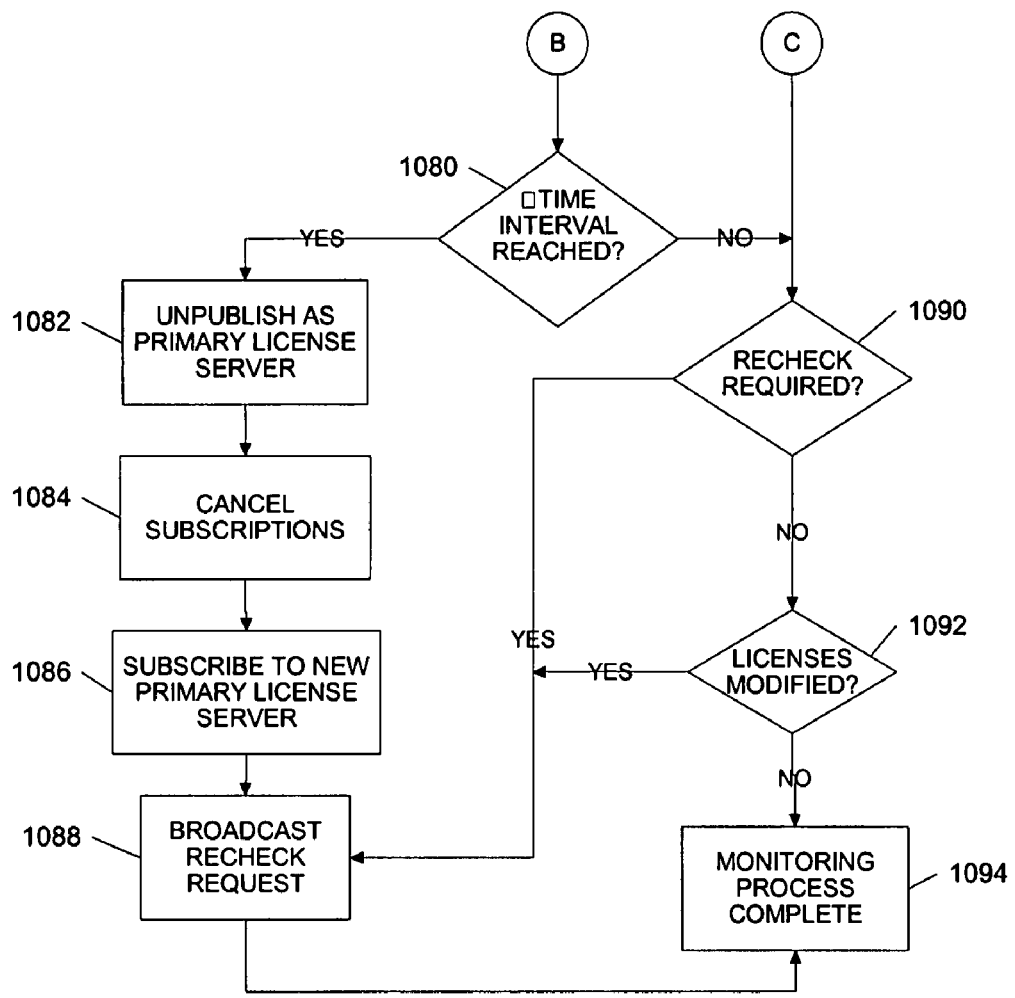

In some embodiments, system users obtain complete copies of the system 11 (i.e., code for all possible functionality provided with the system 11). System users also obtain a license control file and a license key file. FIG. 28 illustrates a license control file 950 and a license key file 952 according to one embodiment of the invention. The license control file 950 specifies what functions are associated with particular licenses. In some embodiments, the license control file 950 includes one or more license files. Each license file can be associated with a licensable component of the system 11. The license key file 952 provides authorization to apply certain license files. Using the license key file 952, the system 11 can start subsystems or processes that a system user has purchased or is authorized to execute, while disabling subsystems or processes that a system user has not licensed and, therefore, cannot execute. In some embodiments, license control files 950 and/or license key files 952 are encrypted to prevent cheating. Licenses can also be tied to a system user's specific configuration so that system users cannot share licenses, and distributors cannot serve multiple system users with a single license. By customizing licenses and separating licenses for individual components, licenses can be created that expire on various schedules and have different prices.

To purchase additional subsystems or features of the system 11, a system user obtains an updated license key file 952 that will enable additional features of the system (i.e., applies additional license files). In some embodiments, a license key file 952 is transmitted over a network, such as a local area network ("LAN") or the Internet, to a system user.

Licenses can be time-bound (i.e., include a license effective date) and each license can include actions for the system 11 to take if the license expires. Actions can include shutting down the subsystems or process, shutting down the system 11, and posting renewal reminders on consoles or terminals of the system 11. Additional components can also be added to the system 11 and configured before a license effective date. For example, system users can obtain demonstration licenses with relatively short expiration spans. In some embodiments, the system can provide current license status information to a system user and/or a system provider for billing purposes.

In some embodiments, upon attempted activation of a subsystem or process, a node checks the license control file 950 and the license key file 952 in order to determine if the subsystem or process can be activated. By delaying validation until attempted activation, system users can load updated license key files 952 in order to add new functionality to the system 11 while the system 11 is running.

Figure 29:
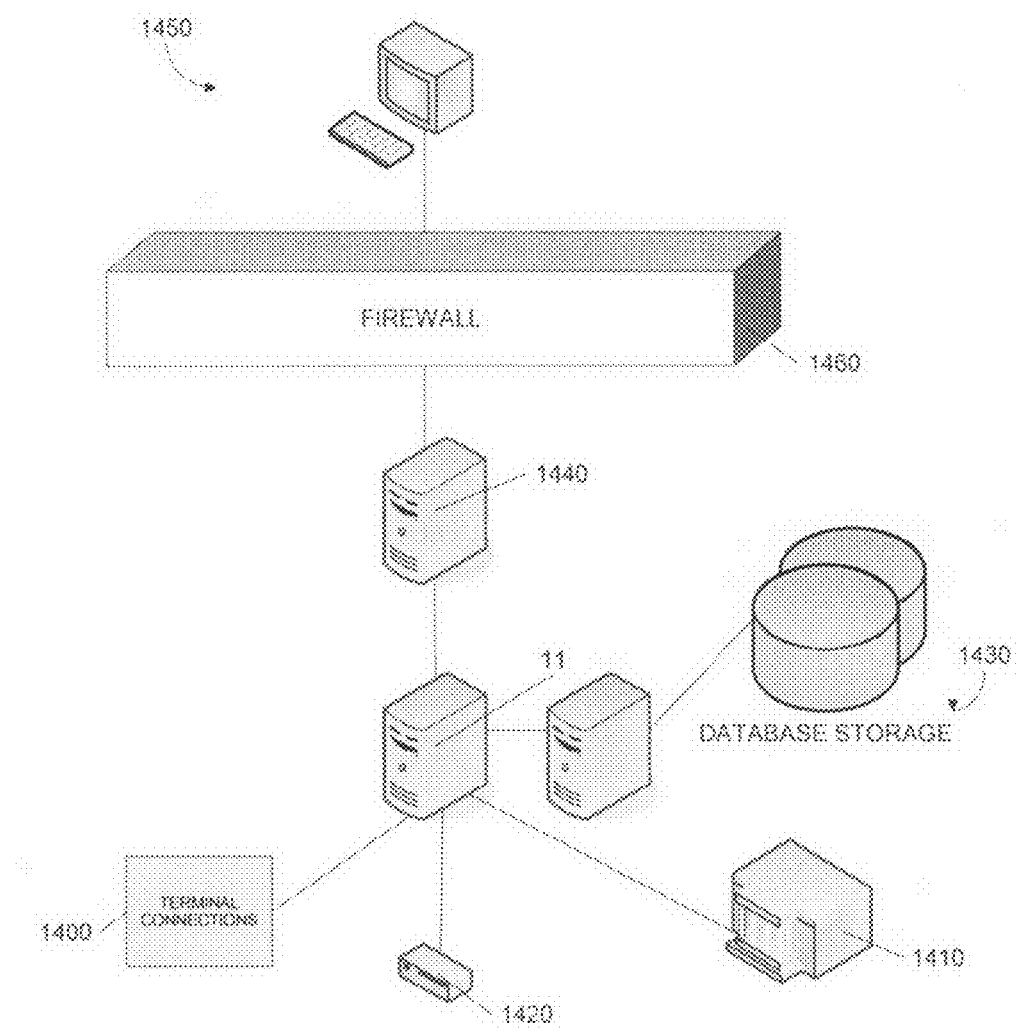
FIG. 29 illustrates an embodiment of the computer system architecture of FIG. 1 including a single server.

As shown in FIG. 29, the system 11 can run on a computer (server) and can connect to terminals 1400, institutions 1410, HSMs 1420, and/or any other equipment it needs. Online storage and database files 1430 can use a server's standard storage or network addressable storage and can usually employ a redundant array of independent disks ("RAID") configuration to provide fault tolerance and the ability to replace failed drives on the fly. For small systems, DBMSs, such as Oracle, DB2, or SQL Server, can run on a cluster of multiple separate servers (e.g., 2) that provide fail-over support, or a single fault tolerant server. A database abstraction layer within the system 11 can allow an application 16 to work with different types of database management systems.

In some embodiments, a separate web application server, such as BEA Web Logic or IBM WebSphere, and web server, such as Apache, Web Logic, or WebSphere can run on a separate web server computer 1440. The web server computer 1440 provides a user interface to a browser running in an end user's remote computer 1450. A firewall 1460 can protect the web server from unwanted external intrusions. A second firewall (not shown) can protect the system components from a web server environment.

In some embodiments, system users can execute two active versions of the system 11. A first system version (a testing system) can be used for initial installation and testing of new software releases. A second system version (a production system) can be used to run tested and configured applications.

Figure 30:
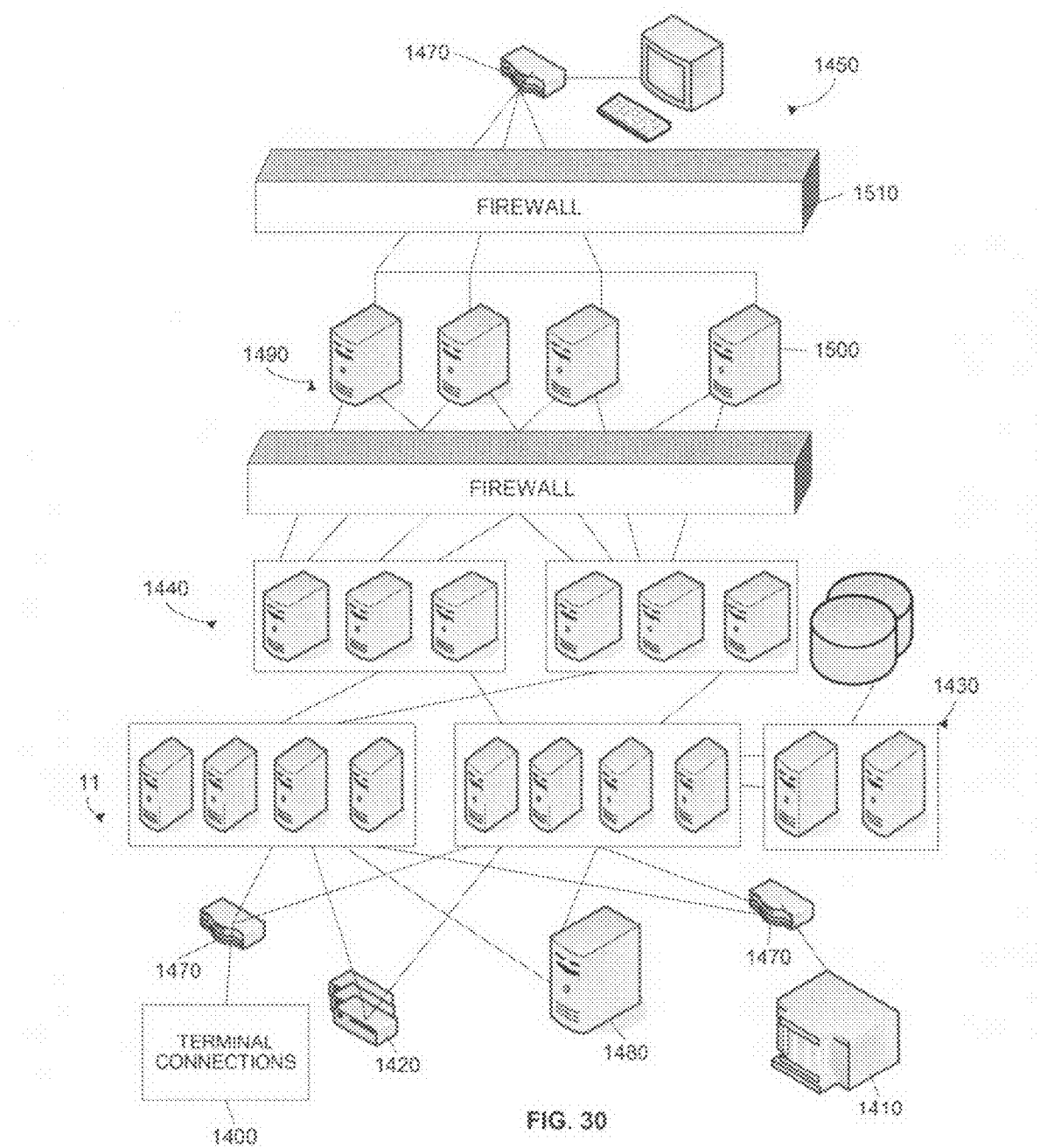
FIG. 30 illustrates an embodiment of the computer system architecture of FIG. 1 including multiple cluster servers.

As shown in FIG. 30, the system 11 can run on multiple servers clustered in order to provide automatic fail-over for failed servers. Multiple clusters, usually on multiple networks, can provide additional fail-over protection.

Various types of system end points can be connected to the system through routers 1470, which help balance the workload between the available servers. Common resources, such as HSMs 1420, can be grouped into available pools and used as needed. Pooled resources can take up work when individual resources fail.

Local storage can use network addressable storage or storage array networks ("SANs") 114680, usually in a RAID configuration that is fault tolerant, and supports online drive replacement for failed components.

Database servers 1430 can be grouped into their own highly reliable database cluster, or can make use of special fault tolerant equipment. The database servers 1430 can include fault tolerant servers.

As shown in FIG. 30, a series of separate web application servers 1440 can provide system user interface processing. These servers can run application server software, such as IBM WebSphere, BEA WebLogic, Macromedia Jrun, JBoss, etc. The web application servers 1440 can be clustered to tolerate failures among the web application servers 1440.

Individual web pages can be provided to each end user through standard web server computers 1490 running web server software, such as IBM WebSphere, BEA WebLogic, or the Apache web server. The web server computers 1490 can be protected by a site security system 1500, such as those provided by Netegrity Siteminder, and can be connected to a network, such as the Internet or another network facility, through routers that distribute the processing load evenly among the available web servers.

Firewalls 1510 and 1520 can protect the web server computer in a user-facing data management zone, and can further protect the system servers and the database servers 1430 from outside intrusions.

Disaster recovery addresses the problem of keeping the system 11 running through a disaster which can disable a data processing center managing the system 11. The system 11 can address disaster recovery by supporting a geographically distributed configuration that can run in multiple processing sites simultaneously. In some embodiments, the system 11 uses various approaches to provide multi-site processing such as hot backups, cold backups, and variations in between, which are commonly called warm backups.

In some embodiments, the most effective way to provide continuous processing is to distribute the physical location of the system 11 over multiple sites with enough duplication at each site to be capable of incorporating the load of any other site. The system 11 can execute at multiple sites (e.g., two sites) with sufficient redundancy to insure that either site can continue processing effectively when the other site fails. System sites can continuously process transactions and can synchronize database files on a continuous basis, usually through a primary/secondary database relationship. The system 11 can provide facilities in order to ensure that critical information in log files are automatically duplicated at remote sites.

If components within one site fail, redundant facilities within that site can provide immediate backup for the failed component. If one entire site fails, however, the second site can continue processing without interruption. This approach to availability is similar to the way the Internet distributes its backbone servers around the globe. One or more of these installations can be down for maintenance, broken, under attack by a malicious agent, or otherwise out of commission, but the Internet can still continue to function. If enough components are unavailable, response time for the end user can start to suffer, but the system 11 can still process as much traffic as possible.

An end point connected only to components that have failed can see a true system failure, and, therefore, end points can be connected to the system 11 at multiple geographic locations, preferably through different communications facilities. Some in-flight transactions can be lost when a site fails, but they complete normally when retried.

Unlike hot backups, cold backups provide backup processing facilities at a secondary processing site, but do not use those facilities until the primary site fails. This approach can cause a noticeable system outage while the backup site is configured for productive operation and the system is brought on line. However, once the backup site is operational, it can support system processing while the primary site remains unavailable.

The system 11 can support a broad range of hot to cold backup configurations depending on the required level of system availability and the resources available for the backup environment. In addition to setting up a proper configuration for system recovery and continuous operation, system users can modify and maintain the recovery configuration to meet changing conditions and maintenance schedules.

In some embodiments, in order to provide a continuously available system, the system 11 can allow system users to dynamically add or remove processing nodes 800 (application server computers) without disrupting the system's operation. The system 11 can detect new nodes 800 automatically or through configuration data changes identifying the new node's identity and address. The normal load balancing facilities then can automatically feed new work to an added node 800 without manual intervention. The system 11 can also detect failed nodes 800 and can automatically take them out of the currently active system. To remove an actively running node 800, a system user can shutdown the node manually in order to properly finish any work in progress. The system 11 can then take the node out of the currently active system just as it would for a failed node 800.

Removing and adding nodes 800 allows systems managers to maintain equipment, upgrade the existing hardware, maintain the current version of an operating system, perform standard database maintenance, and keep the system 11 up to date and running smoothly with regularly scheduled maintenance. Removing and adding nodes 800 allows managers to add nodes when data processing volume required of the system 11 increases and to remove nodes when data processing volume required of the system 11 decreases without disrupting current transaction flow.

In some embodiments, the system 11 provides continuous availability even when updates are made to nodes 800. In order to support updates to the system 11 by updating one node 800 at a time, the system 11 can run some nodes using a "current" version of an application (e.g. V1.0) and some nodes using a "next" version of the application (e.g. V1.1). This ability to run a current application version and a next application version at the same time is known as "N, N+1" processing, where N stands for any version of the system, and "N+1" stands for the next version to be installed.

In some embodiments, new features available only in the N+1 version are not usable until the entire system 11 has been updated, but the current version can run correctly and uninterrupted during the update process. In addition to providing continuous availability during an application update, this feature makes it easy to verify that an update does not disrupt the system's existing functions by allowing system users to update just a single node 800, or even a single process, for production verification before updating the rest of the system 11. In some embodiments, version updates, including configuration data changes, programming changes, database changes, etc., are N, N+1 compatible.

Various features and advantageous of the invention are set forth in the following claims.

The invention claimed is:

1. A system for processing financial data, the system comprising
a computer-implemented first rules engine configured to obtain the data, to obtain a first object to contain the data, the first object including a rule identifier; to generate an instance of a first rule based on the first object; and to execute the instance of the first rule passing the first object as input to the instance of the first rule,
the instance of the first rule configured to perform at least one action in order to process the data contained in the first object, and to modify the rule identifier included in the first object.

2. The system of claim 1 wherein the first rules engine is further configured to generate an instance of a second rule based on the rule identifier included in the first object and to execute the instance of the second rule passing the first object as input to the instance of the second rule.

3. The system of claim 1 wherein the first rules engine is further configured to generate the instance of the first rule based on the rule identifier included the first object.

4. The system of claim 1 wherein the first rules engine is further configured to generate the instance of the first rule using configuration data stored in a configuration database, the configuration data associated with the data contained in the first object.

5. The system of claim 1 wherein the instance of the first rule is further configured to generate a second rules engine.

6. The system of claim 1 wherein the instance of the first rule is further configured to modify the rule identifier of the first object to indicate a second rule.

7. The system of claim 1 wherein the instance of the first rule is further configured to modify the rule identifier of the first object to indicate a terminal value.

8. The system of claim 1 wherein the instance of the first rule is further configured to modify the data contained in the first object.

9. A computer-implemented method of processing financial data, the method comprising:
    obtaining the data with a first rules engine;
    obtaining a first object to contain the data, the first object including a rule identifier;
    generating an instance of a first rule based on the first object;
    executing the instance of the first rule passing the first object as input to the instance of the first rule;
    performing at least one action with the instance of the first rule based in order to process the data contained in the first object; and
    modifying the rule identifier of the first object.

10. The method of claim 9 further comprising generating an instance of a second rule based on the rule identifier included in the first object and executing the instance of the second rule passing the first object as input to the instance of the second rule.

11. The method of claim 9 wherein generating an instance of a first rule based on the first object includes generating an instance of a first rule based on the rule identifier included in the first object.

12. The method of claim 9 wherein generating an instance of a first rule based on the first object includes generating an instance of a first rule based on the first object using configuration data associated with the data contained in the first object.

13. The method of claim 9 wherein modifying the rule identifier of the first object includes modifying the rule identifier to indicate a second rule.

14. The method of claim 9 wherein modifying the rule identifier of the first object includes modifying the rule identifier to indicate a terminal value.

15. The method of claim 9 further comprising modifying the data stored in the first object.

16. A computer-implemented method of configuring a system that processes financial data, the method comprising:
    obtaining a base rule that, when executed and passed an object containing data to process, performs a first action in order to process the data;
    generating an override rule that, when executed and passed the object containing the data to process, performs a second action in order to process the data; and
    storing the override rule separate from the base rule.

17. The method of claim 16 wherein obtaining a base rule includes obtaining a base rule that when executed tests a first constraint against the data in order to determine the first action to perform.

18. The method of claim 17 wherein generating an override rule includes obtaining an override rule that when executed tests a second constraint against the data in order to determine the second action to perform.

19. The method of claim 18 wherein generating an override rule includes generating an override rule that when executed performs a second action that is substantially the same as the first action.

20. The method of claim 16 further comprising obtaining, with a rules engine, an object including data and a rule identifier that indicates the base rule and generating an instance of the override rule with the rules engine.

21. The method of claim 20 wherein generating an instance of the override rule includes obtaining configuration data associated with the data contained in the object.

22. The method of claim 16 further comprising updating the base rule without modifying the override rule.

* * * * *